(12) United States Patent
Lian et al.

(10) Patent No.: US 12,441,695 B2
(45) Date of Patent: Oct. 14, 2025

(54) SUBSTITUTED THIADIAZINONE DIOXIDE AND PREPARATION METHOD THEREFOR, HERBICIDAL COMPOSITION, AND APPLICATION THEREFOR

(71) Applicant: Qingdao Kingagroot Chemical Compound Co., Ltd., Qingdao (CN)

(72) Inventors: Lei Lian, Qingdao (CN); Rongbao Hua, Qingdao (CN); Xuegang Peng, Qingdao (CN); De Zhao, Qingdao (CN); Qi Cui, Qingdao (CN)

(73) Assignee: Qingdao Kingagroot Chemical Compound Co., Ltd., Qingdao (CN)

( * ) Notice: Subject to any disclaimer, the term of this patent is extended or adjusted under 35 U.S.C. 154(b) by 880 days.

(21) Appl. No.: 17/630,210

(22) PCT Filed: Sep. 1, 2020

(86) PCT No.: PCT/CN2020/112747
§ 371 (c)(1),
(2) Date: Jan. 26, 2022

(87) PCT Pub. No.: WO2021/043114
PCT Pub. Date: Mar. 11, 2021

(65) Prior Publication Data
US 2022/0289699 A1  Sep. 15, 2022

(30) Foreign Application Priority Data

Sep. 2, 2019  (CN) .................. 201910822098.1
Aug. 25, 2020  (CN) .................. 202010861293.8

(51) Int. Cl.
 *C07D 285/16* (2006.01)
 *A01N 43/88* (2006.01)
 *C07D 413/04* (2006.01)

(52) U.S. Cl.
CPC .......... *C07D 285/16* (2013.01); *A01N 43/88* (2013.01); *C07D 413/04* (2013.01)

(58) Field of Classification Search
CPC ..... C07D 285/16; C07D 413/04; A01N 43/88
USPC ......................................................... 544/11
See application file for complete search history.

(56) References Cited

U.S. PATENT DOCUMENTS

| | | |
|---|---|---|
| 3,920,641 A | 11/1975 | McKendry |
| 3,940,389 A | 2/1976 | McKendry et al. |
| 3,989,507 A | 11/1976 | McKendry |
| 4,155,746 A | 5/1979 | McKendry et al. |
| 4,158,559 A * | 6/1979 | Stubenrauch .......... A01N 43/88 544/11 |
| 5,013,659 A | 5/1991 | Bedbrook et al. |

FOREIGN PATENT DOCUMENTS

| | | |
|---|---|---|
| CN | 104693142 A | 6/2015 |
| DE | 2656289 A1 | 6/1978 |
| EP | 0131624 A1 | 1/1985 |
| EP | 0142924 A2 | 5/1985 |
| EP | 0193259 A1 | 9/1986 |
| EP | 0221044 A | 5/1987 |
| EP | 0242236 A1 | 10/1987 |
| EP | 0242246 A1 | 10/1987 |
| EP | 0257993 A2 | 3/1988 |
| SU | 404188 A3 | 10/1973 |
| SU | 416918 A3 | 2/1974 |
| SU | 472489 A3 | 5/1975 |
| WO | WO 9113972 A1 | 9/1991 |
| WO | WO 9119806 A1 | 12/1991 |
| WO | WO 9200377 A1 | 1/1992 |
| WO | WO 9211376 A1 | 7/1992 |
| WO | WO 9214827 A1 | 9/1992 |

OTHER PUBLICATIONS

P. Christou, Transformation Technology, *Trends in Plant Science*, 1:423-431 (1996).

(Continued)

*Primary Examiner* — Kahsay Habte
(74) *Attorney, Agent, or Firm* — FINNEGAN, HENDERSON, FARABOW, GARRETT & DUNNER LLP

(57) ABSTRACT

The invention relates to the field of pesticide technology, and in particular a type of substituted thiadiazinone dioxide, preparation method, herbicidal composition and application thereof. The substituted thiadiazinone dioxide, as shown in general formula I:

wherein, $R_1$ and $R_2$ each independently represent hydrogen, cyano or alkyl with or without halogen and so on; X represents hydrogen or halogen; Y represents C—Z or N; Z represents hydrogen or halogen; and when X represents halogen, Z represents hydrogen. The compound has excellent herbicidal activity against gramineous weeds, broadleaf weeds or amaranthaceous weeds, and has high selectivity for crops such as soybean, corn, rice or wheat.

14 Claims, No Drawings

(56) References Cited

OTHER PUBLICATIONS

H. Braun et al., The General Mitochondrial Processing Peptidase from Potato Is an Integral Part of Cytochrome C Reductase of The Respiratory Chain, *EMBO J.* 11:3219-3227 (1992).
F. Wolter et al., Rbcs Genes in Solanum Tuberosum: Conservation of Transit Peptide and Exon Shuffling During Evolution, *Proc. Natl. Acad. Sci. USA*, 85:846-850 (1988).
U. Sonnewald et al., Transgenic Tobacco Plants Expressing Yeast-Derived Invertase in Either the Cytosol, Vacuole or Apoplast: a Powerful Tool for Studying Sucrose Metabolism and Sink/Source Interactions, *Plant J.* 1:95-106 (1991).
International Search Report and Written Opinion of International Application No. PCT/CN2020/112747, mailed Nov. 25, 2020.
Huang, X, New Herbicide Bentazone, *Pesticide Industry Translation Series*, No. 5, pp. 53-55 and 50, Oct. 27, 1980.

\* cited by examiner

SUBSTITUTED THIADIAZINONE DIOXIDE AND PREPARATION METHOD THEREFOR, HERBICIDAL COMPOSITION, AND APPLICATION THEREFOR

CROSS-REFERENCE TO RELATED APPLICATION

This application is a national stage filing under 35 U.S.C. § 371 of International Application No. PCT/CN2020/112747, filed Sep. 1, 2020, which claims the priority and benefits of Chinese Patent Application Nos. 201910822098.1, filed Sep. 2, 2019, 202010861293.8, filed Aug. 25, 2020, all of which are incorporated herein by reference.

TECHNICAL FIELD

The invention relates to the field of pesticide technology, and in particular a type of substituted thiadiazinone dioxide, preparation method, herbicidal composition and use thereof.

TECHNICAL BACKGROUND

Weed control is one of the most important links in the course of achieving high-efficiency agriculture. Various herbicides are available in the market, including PS II inhibitor herbicides, etc., for example, U.S. Pat. Nos. 3,920,641, 3,989,507, etc. disclose general formula compounds

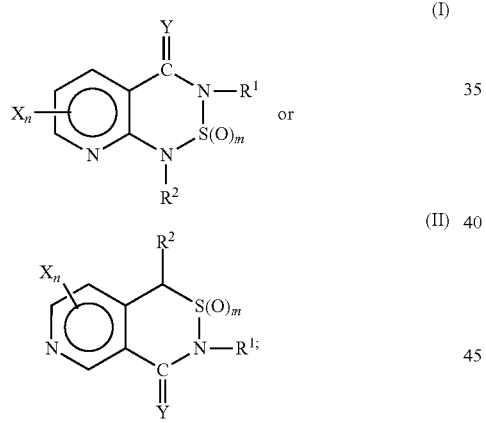

DE2656289A1, etc. disclose general formula compounds

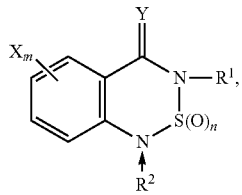

among them, the benzothiadiazinone herbicide bentazone developed by BASF is mainly applied to crops such as rice, soybean, peanut, wheat, etc. to prevent and control broadleaf weeds and cyperaceous weeds, which is ineffective on gramineous weeds. However, scientists still need to do continuously research and develop new herbicides with high efficacy, safety, economics and different modes of action due to problems such as the growing market, weed resistance, the service life and economics of pesticides as well as people's increasing concern on environment.

INVENTION CONTENTS

The present invention provides a type of substituted thiadiazinone dioxide, preparation method, herbicidal composition and application thereof. The compound has excellent herbicidal activity against gramineous weeds, broadleaf weeds or amaranthaceous weeds, and has high selectivity for crops such as soybean, corn, rice or wheat.

The technical solution adopted by the invention is as follows:

A substituted thiadiazinone dioxide, as shown in general formula I:

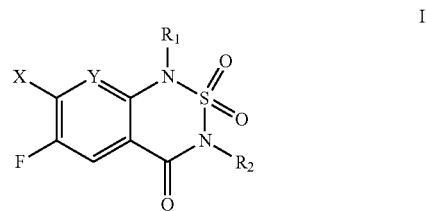

Wherein, $R_1$ and $R_2$ each independently represent hydrogen, cyano; alkyl, alkenyl, alkynyl, cycloalkyl, cycloalkylalkyl, formylalkyl, cyanoalkyl or hydroxyalkyl with or without halogen; aryl, arylalkyl, heterocyclyl, heterocyclylalkyl, $R_3$—O-(alkyl)$_n$-, $R_3$—S-(alkyl)$_n$-, $R_3$—(CO)-(alkyl)$_n$-, $R_3$—(CO)—O-(alkyl)$_n$-, $R_3$—O-(alkyl)$_n$-(CO)—, $R_3$—S—(CO)-(alkyl)$_n$-, $R_3$—O—(CO)-(alkyl)-, $R_3$—O—(CO)—O-(alkyl)-, $R_3$—SO$_2$-(alkyl)$_n$-, $R_4R_5$N—(CO)—, $R_4R_5$N-(alkyl)$_n$-, $R_3$—(CO)—NR$_6$—, $R_4R_5$N—(CO)—NR$_6$—,

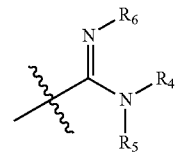

or $R_4R_5R_6$Si—O-(alkyl)$_n$-;

each $R_3$ independently represents alkyl, alkenyl, alkynyl, cycloalkyl or cycloalkylalkyl with or without halogen; aryl, arylalkyl, heterocyclyl or heterocyclylalkyl;

$R_4$, $R_5$ and $R_6$ each independently represent hydrogen; alkyl, alkenyl, alkynyl, cycloalkyl or cycloalkylalkyl with or without halogen; aryl, arylalkyl, heterocyclyl or heterocyclylalkyl;

n represents 0 or 1;

X represents hydrogen or halogen; Y represents C—Z or N; Z represents hydrogen or halogen; and when X represents halogen, Z represents hydrogen;

the "aryl" or "heterocyclyl" is unsubstituted or substituted by at least one (for example, 1, 2, 3, 4, 5) of the following groups: halogen, nitro, cyano, thiocyanato, cyanoalkyl, mercapto, hydroxyl, hydroxylalkyl, carboxyl, formyl, azido, trialkylsilyl, dialkylphosphono, unsubstituted or substituted heterocyclyl, heterocyclylalkyl, aryl or arylalkyl; alkyl, alkenyl, alkynyl, cycloalkyl, cycloalkenyl, cycloalkylalkyl, cycloalkenylalkyl, cycloalkyl substituted by alkyl, OR", SR", -alkyl-OR", —O-alkyl-OR", -alkyl-SR", COR", -alkyl-COR", —O-alkyl-COR", COOR", -alkyl-COOR", —O-alkyl-COOR", COSR", SOR", $SO_2R"$, —O—$SO_2R"$, -alkyl-$SO_2R"$, OCOR", -alkyl-OCOR" or SCOR" with or without halogen; amino, aminocarbonyl, aminocarbonylalkyl or aminosulfonyl which is unsubstituted or substituted by one or two groups selected from the group consisting of R", COR", COOR", $SO_2R"$, -alkyl-$SO_2R"$ or OR" with or without halogen; or any two adjacent carbon atoms in the ring are connected with —$CH_2CH_2CH_2$—, —$OCH_2CH_2$—, —$OCH_2O$—, —$OCH_2CH_2O$— or —CH=CH—CH=CH— groups to form a fused ring;

each R" independently represents alkyl, alkenyl, alkynyl, cycloalkyl, cycloalkylalkyl, cycloalkenyl, cycloalkenylalkyl, and unsubstituted or substituted heterocyclyl, heterocyclylalkyl, aryl or arylalkyl.

Preferably, $R_1$ and $R_2$ each independently represent hydrogen, cyano; $C_1$-$C_8$ alkyl, $C_2$-$C_8$ alkenyl, $C_2$-$C_8$ alkynyl, $C_3$-$C_8$ cycloalkyl, $C_3$-$C_8$ cycloalkyl $C_1$-$C_8$ alkyl, formyl $C_1$-$C_8$ alkyl, cyano $C_1$-$C_8$ alkyl or hydroxyl $C_1$-$C_8$ alkyl with or without halogen; aryl, aryl $C_1$-$C_8$ alkyl, heterocyclyl, heterocyclyl $C_1$-$C_8$ alkyl, $R_3$—O—($C_1$-$C_8$ alkyl)$_n$-, $R_3$—S—($C_1$-$C_8$ alkyl)$_n$-, $R_3$—(CO)—($C_1$-$C_8$ alkyl)$_n$-, $R_3$—(CO)—O—($C_1$-$C_8$ alkyl)$_n$-, $R_3$—O—($C_1$-$C_8$ alkyl)$_n$-(CO)—, $R_3$—S—(CO)—($C_1$-$C_8$ alkyl)$_n$-, $R_3$—O—(CO)—($C_1$-$C_8$ alkyl)-, $R_3$—O—(CO)—O—($C_1$-$C_8$ alkyl)-, $R_3$—$SO_2$—($C_1$-$C_8$ alkyl)$_n$-, $R_4R_5N$—(CO)—, $R_4R_5N$—($C_1$-$C_8$ alkyl)$_n$-, $R_3$—(CO)—$NR_6$—, $R_4R_5N$—(CO)—$NR_6$—,

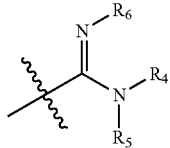

or $R_4R_5R_6Si$—O—($C_1$-$C_8$ alkyl)$_n$-;

each $R_3$ independently represents $C_1$-$C_8$ alkyl, $C_2$-$C_8$ alkenyl, $C_2$-$C_8$ alkynyl, $C_3$-$C_8$ cycloalkyl or $C_3$-$C_8$ cycloalkyl $C_1$-$C_8$ alkyl with or without halogen; aryl, aryl $C_1$-$C_8$ alkyl, heterocyclyl or heterocyclyl $C_1$-$C_8$ alkyl;

$R_4$, $R_5$ and $R_6$ each independently represent hydrogen; $C_1$-$C_8$ alkyl, $C_2$-$C_8$ alkenyl, $C_2$-$C_8$ alkynyl, $C_3$-$C_8$ cycloalkyl or $C_3$-$C_8$ cycloalkyl $C_1$-$C_8$ alkyl with or without halogen; aryl, aryl $C_1$-$C_8$ alkyl, heterocyclyl or heterocyclyl $C_1$-$C_8$ alkyl;

n represents 0 or 1;

X represents hydrogen or halogen; Y represents C—Z or N; Z represents hydrogen or halogen; and when X represents halogen, Z represents hydrogen;

the "aryl" or "heterocyclyl" is unsubstituted or substituted by at least one (for example, 1, 2, 3, 4, 5) of the following groups: halogen, nitro, cyano, thiocyanato, cyano $C_1$-$C_8$ alkyl, mercapto, hydroxyl, hydroxyl $C_1$-$C_8$ alkyl, carboxyl, formyl, azido, tri-$C_1$-$C_8$alkylsilyl, di-$C_1$-$C_8$ alkyl phosphono; heterocyclyl, heterocyclyl $C_1$-$C_8$ alkyl, aryl or aryl $C_1$-$C_8$ alkyl which is unsubstituted or substituted by 1-3 groups selected from the group consisting of halogen, $C_1$-$C_8$ alkyl, halo $C_1$-$C_8$ alkyl, $C_1$-$C_8$ alkoxy or amino; $C_1$-$C_8$ alkyl, $C_2$-$C_8$ alkenyl, $C_2$-$C_8$ alkynyl, $C_3$-$C_8$ cycloalkyl, $C_3$-$C_8$cycloalkenyl, $C_3$-$C_8$ cycloalkyl $C_1$-$C_8$ alkyl, $C_3$-$C_8$cycloalkenyl $C_1$-$C_8$ alkyl, $C_3$-$C_8$ cycloalkyl substituted by $C_1$-$C_8$ alkyl, OR", SR", —($C_1$-$C_8$)alkyl-OR", —O—($C_1$-$C_8$)alkyl-OR", —($C_1$-$C_8$)alkyl-SR", COR", —($C_1$-$C_8$)alkyl-COR", —O—($C_1$-$C_8$)alkyl-COR", COOR", —($C_1$-$C_8$)alkyl-COOR", —O—($C_1$-$C_8$)alkyl-COOR", COSR", SOR", $SO_2R"$, —O—$SO_2R"$, —($C_1$-$C_8$)alkyl-$SO_2R"$, OCOR", —($C_1$-$C_8$)alkyl-OCOR" or SCOR" with or without halogen; amino, aminocarbonyl, amino carbonyl $C_1$-$C_8$ alkyl or aminosulfonyl which is unsubstituted or substituted by one or two groups selected from the group consisting of R", COR", COOR", $SO_2R"$, —($C_1$-$C_8$)alkyl-$SO_2R"$ or OR" with or without halogen; or any two adjacent carbon atoms in the ring are connected with —$CH_2CH_2CH_2$—, —$OCH_2CH_2$—, —$OCH_2O$—, —$OCH_2CH_2O$— or —CH=CH—CH=CH— groups to form a fused ring;

each R" independently represents $C_1$-$C_8$ alkyl, $C_2$-$C_8$ alkenyl, $C_2$-$C_8$ alkynyl, $C_3$-$C_8$ cycloalkyl, $C_3$-$C_8$ cycloalkyl $C_1$-$C_8$ alkyl, $C_3$-$C_8$cycloalkenyl, $C_3$-$C_8$cycloalkenyl $C_1$-$C_8$ alkyl; and heterocyclyl, heterocyclyl $C_1$-$C_8$ alkyl, aryl or aryl $C_1$-$C_8$ alkyl which is unsubstituted or substituted by 1-3 groups selected from the group consisting of halogen, $C_1$-$C_8$ alkyl, halogenated $C_1$-$C_8$ alkyl, $C_1$-$C_8$ alkoxy or amino.

More preferably, $R_1$ and $R_2$ each independently represent hydrogen, cyano; $C_1$-$C_6$ alkyl, $C_2$-$C_6$ alkenyl, $C_2$-$C_6$ alkynyl, $C_3$-$C_6$ cycloalkyl, $C_3$-$C_6$ cycloalkyl $C_1$-$C_6$ alkyl, formyl $C_1$-$C_6$alkyl, cyano $C_1$-$C_6$ alkyl or hydroxyl $C_1$-$C_6$ alkyl with or without halogen; aryl, aryl $C_1$-$C_6$ alkyl, heterocyclyl, heterocyclyl $C_1$-$C_6$ alkyl, $R_3$—O—($C_1$-$C_6$ alkyl)$_n$-, $R_3$—S—($C_1$-$C_6$ alkyl)$_n$-, $R_3$—(CO)—($C_1$-$C_6$ alkyl)$_n$-, $R_3$—(CO)—O—($C_1$-$C_6$ alkyl)$_n$-, $R_3$—O—($C_1$-$C_6$ alkyl)$_n$-(CO)—, $R_3$—S—(CO)—($C_1$-$C_6$ alkyl)$_n$-, $R_3$—O—(CO)—($C_1$-$C_6$ alkyl)-, $R_3$—O—(CO)—O—($C_1$-$C_6$ alkyl)-, $R_3$—$SO_2$—($C_1$-$C_6$ alkyl)$_n$-, $R_4R_5N$—(CO)—, $R_4R_5N$—($C_1$-$C_6$ alkyl)$_n$-, $R_3$—(CO)—$NR_6$—, $R_4R_5N$—(CO)—$NR_6$—,

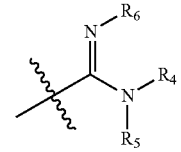

or $R_4R_5R_6Si$—O—($C_1$-$C_6$ alkyl)$_n$-;

each $R_3$ independently represents $C_1$-$C_6$ alkyl, $C_2$-$C_6$ alkenyl, $C_2$-$C_6$ alkynyl, $C_3$-$C_6$ cycloalkyl or $C_3$-$C_6$ cycloalkyl $C_1$-$C_6$ alkyl with or without halogen; aryl, aryl $C_1$-$C_6$ alkyl, heterocyclyl or heterocyclyl $C_1$-$C_6$ alkyl;

$R_4$, $R_5$ and $R_6$ each independently represent hydrogen; $C_1$-$C_6$ alkyl, $C_2$-$C_6$ alkenyl, $C_2$-$C_6$ alkynyl, $C_3$-$C_6$ cycloalkyl or $C_3$-$C_6$ cycloalkyl $C_1$-$C_6$ alkyl with or without halogen; aryl, aryl $C_1$-$C_6$ alkyl, heterocyclyl or heterocyclyl $C_1$-$C_6$ alkyl;

n represents 0 or 1;

X represents hydrogen or halogen; Y represents C—Z or N; Z represents hydrogen or halogen; and when X represents halogen, Z represents hydrogen;

the "aryl" or "heterocyclyl" is unsubstituted or substituted by at least one (for example, 1, 2, 3, 4, 5) of the following groups: halogen, nitro, cyano, thiocyanato, cyano $C_1$-$C_6$ alkyl, mercapto, hydroxyl, hydroxyl $C_1$-$C_6$ alkyl, carboxyl, formyl, azido, tri-$C_1$-$C_6$alkylsilyl, di-$C_1$-$C_6$ alkyl phosphono; heterocyclyl, heterocyclyl $C_1$-$C_6$ alkyl, aryl or aryl $C_1$-$C_6$ alkyl which is unsubstituted or substituted by 1-3 groups selected from the group consisting of halogen, $C_1$-$C_6$ alkyl, halo $C_1$-$C_6$ alkyl, $C_1$-$C_6$ alkoxy or amino; $C_1$-$C_6$ alkyl, $C_2$-$C_6$ alkenyl, $C_2$-$C_6$ alkynyl, $C_3$-$C_6$ cycloalkyl, $C_3$-$C_6$cycloalkenyl, $C_3$-$C_6$ cycloalkyl $C_1$-$C_6$ alkyl, $C_3$-$C_6$cycloalkenyl $C_1$-$C_6$ alkyl, $C_3$-$C_6$ cycloalkyl substituted by $C_1$-$C_6$ alkyl, OR", SR", —($C_1$-$C_6$)alkyl-OR", —O—($C_1$-$C_6$)alkyl-OR", —($C_1$-$C_6$)alkyl-SR", COR", —($C_1$-$C_6$)alkyl-COR", —O—($C_1$-$C_6$)alkyl-COR", COOR", —($C_1$-$C_6$)alkyl-COOR", —O—($C_1$-$C_6$)alkyl-COOR", COSR", SOR", SO$_2$R", —O—SO$_2$R", —($C_1$-$C_6$)alkyl-SO$_2$R", OCOR", —($C_1$-$C_6$)alkyl-OCOR" or SCOR" with or without halogen; amino, amino carbonyl, amino carbonyl $C_1$-$C_6$ alkyl or aminosulfonyl which is unsubstituted or substituted by one or two groups selected from the group consisting of R", COR", COOR", SO$_2$R", —($C_1$-$C_6$)alkyl-SO$_2$R" or OR" with or without halogen; or any two adjacent carbon atoms in the ring are connected with —CH$_2$CH$_2$CH$_2$—, —OCH$_2$CH$_2$—, —OCH$_2$O—, —OCH$_2$CH$_2$O— or —CH=CH—CH=CH— groups to form a fused ring;

each R" independently represents $C_1$-$C_6$ alkyl, $C_2$-$C_6$ alkenyl, $C_2$-$C_6$ alkynyl, $C_3$-$C_6$ cycloalkyl, $C_3$-$C_6$ cycloalkyl $C_1$-$C_6$ alkyl, $C_3$-$C_6$cycloalkenyl, $C_3$-$C_6$cycloalkenyl $C_1$-$C_6$ alkyl; and heterocyclyl, heterocyclyl $C_1$-$C_6$ alkyl, aryl or aryl $C_1$-$C_6$ alkyl which is unsubstituted or substituted by 1-3 groups selected from the group consisting of halogen, $C_1$-$C_6$ alkyl, halo $C_1$-$C_6$ alkyl, $C_1$-$C_6$ alkoxy or amino.

Further preferably, $R_1$ and $R_2$ each independently represent hydrogen, cyano; $C_1$-$C_6$ alkyl, $C_2$-$C_6$ alkenyl, $C_2$-$C_6$ alkynyl, $C_3$-$C_6$ cycloalkyl, $C_3$-$C_6$ cycloalkyl $C_1$-$C_3$ alkyl, formyl $C_1$-$C_3$ alkyl, cyano $C_1$-$C_3$ alkyl or hydroxyl $C_1$-$C_3$ alkyl with or without halogen; aryl, aryl $C_1$-$C_3$ alkyl, heterocyclyl, heterocyclyl $C_1$-$C_3$ alkyl, $R_3$—O—($C_1$-$C_3$ alkyl)$_n$-, $R_3$—S—($C_1$-$C_3$ alkyl)$_n$-, $R_3$—(CO)—($C_1$-$C_3$ alkyl)$_n$-, $R_3$—(CO)—O—($C_1$-$C_3$ alkyl)$_n$-, $R_3$—O—($C_1$-$C_3$ alkyl)$_n$-(CO)—, $R_3$—S—(CO)—($C_1$-$C_3$ alkyl)$_n$-, $R_3$—O—(CO)—($C_1$-$C_3$ alkyl)-, $R_3$—O—(CO)—O—($C_1$-$C_3$ alkyl)-, $R_3$—SO$_2$—($C_1$-$C_3$ alkyl)$_n$-, $R_4R_5$N—(CO)—, $R_4R_5$N—($C_1$-$C_3$ alkyl)$_n$-, $R_3$—(CO)—NR$_6$—, $R_4R_5$N—(CO)—NR$_6$—,

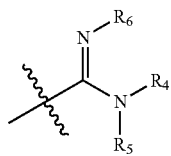

or $R_4R_5R_6$Si—O—($C_1$-$C_3$ alkyl)$_n$-;

X represents hydrogen or fluorine; Y represents C—Z or N; Z represents hydrogen, fluorine, chlorine, bromine or iodine; and when X represents fluorine, Y represents C—Z, and Z represents hydrogen.

In another preferred embodiment, $R_1$ and $R_2$ each independently represent hydrogen, $C_1$-$C_6$ alkyl, $C_2$-$C_6$ alkenyl, $C_2$-$C_6$ alkynyl, $R_3$—(CO)—, $R_3$—O—(CO)— or $R_3$—O—(CO)—O—($C_1$-$C_6$ alkyl)-;

each $R_3$ independently represents $C_1$-$C_6$ alkyl;

X represents hydrogen or fluorine; Y represents C—Z or N; Z represents hydrogen, fluorine, chlorine, bromine or iodine; and when X represents fluorine, Y represents C—Z, and Z represents hydrogen.

In the definition of the compound represented by the above Formula and all of the following structural formulas, the technical terms used, whether used alone or used in compound word, represent the following substituents: an alkyl having more than two carbon atoms may be linear or branched. For example, the alkyl in the compound word "-alkyl-OR"" may be —CH$_2$—, —CH$_2$CH$_2$—, —CH(CH$_3$)—, —C(CH$_3$)$_2$—, and the like. The alkyl is, for example, $C_1$ alkyl: methyl; $C_2$ alkyl: ethyl; $C_3$ alkyl: propyl such as n-propyl or isopropyl; $C_4$ alkyl: butyl such as n-butyl, isobutyl, tert-butyl or 2-butyl; $C_5$ alkyl: pentyl such as n-pentyl; $C_6$ alkyl: hexyl such as n-hexyl, isohexyl and 1,3-dimethylbutyl. Similarly, the alkenyl is, for example, allyl, 1-methylprop-2-en-1-yl, 2-methylprop-2-en-1-yl, but-2-en-1-yl, butyl-3-en-1-yl, 1-methylbut-3-en-1-yl and 1-methylbut-2-en-1-yl. The alkynyl is, for example, propargyl, but-2-yn-1-yl, but-3-yn-1-yl, 1-methylbut-3-yn-1-yl. At least one (for example, 1, 2 or 3) multiple bonds may be placed at any position of each unsaturated group. The cycloalkyl is a carbocyclic saturated ring system having, for example, three to six carbon atoms, such as cyclopropyl, cyclobutyl, cyclopentyl or cyclohexyl. Similarly, the cycloalkenyl is monocycloalkenyl having, for example, three to six carbon ring members, such as cyclopropenyl, cyclobutenyl, cyclopentenyl, and cyclohexenyl, wherein double bond can be at any position. Halogen is fluorine, chlorine, bromine or iodine.

Unless otherwise specified, the technical terms used, whether used alone or used in compound word, represent the following meanings: the "aryl" of the present invention includes, but is not limited to, phenyl, naphthyl,

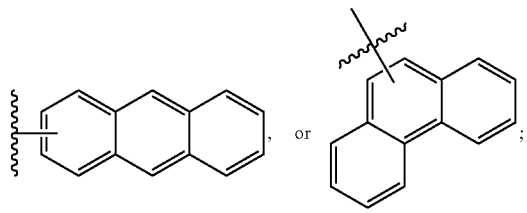

the "heterocyclyl" not only includes, but is not limited to,

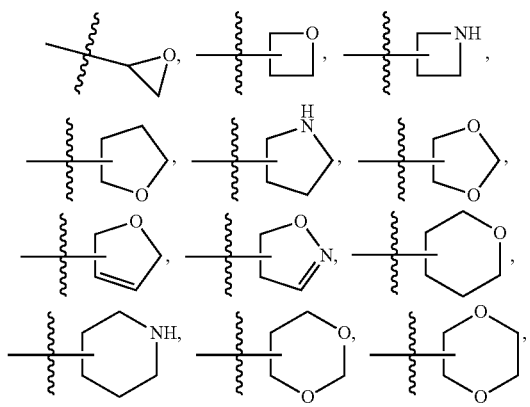

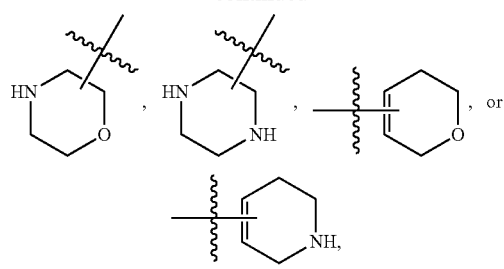
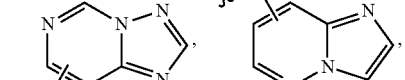
which has 0, 1 or 2 oxo groups; but also includes "heteroaryl", which is an aromatic cyclic group having, for example, 3 to 6 (for example, 3, 4, 5 or 6) ring atoms and which may also be fused with a benzo ring, and 1 to 4 (for example, 1, 2, 3 or 4) heteroatoms of the ring are selected from the group consisting of oxygen, nitrogen and sulfur. For example,
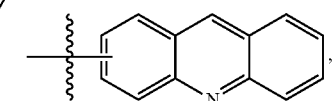
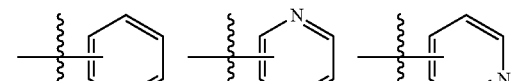
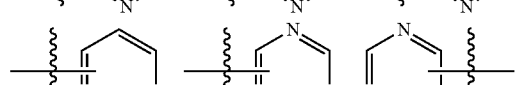
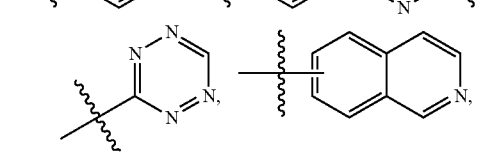
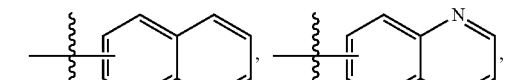
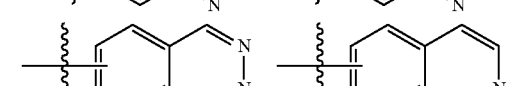
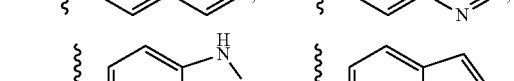
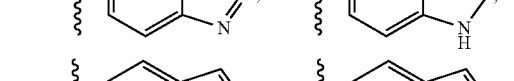
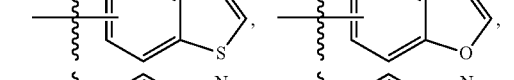
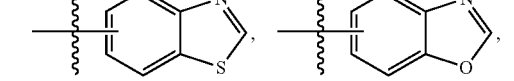
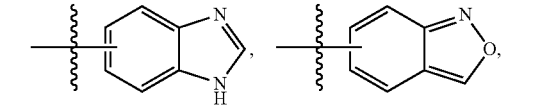
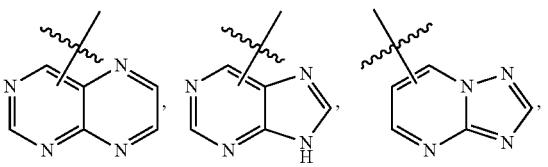
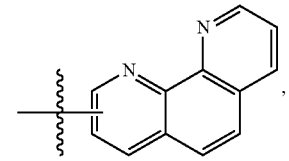
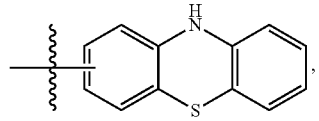
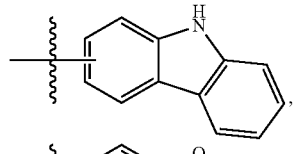
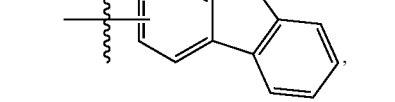
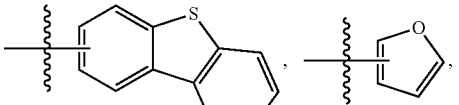
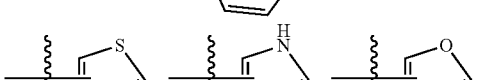
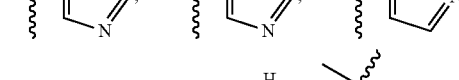
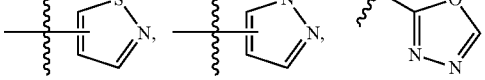
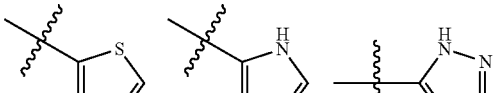
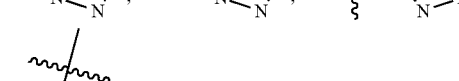
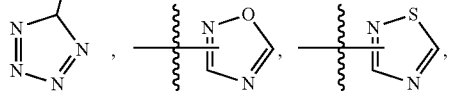

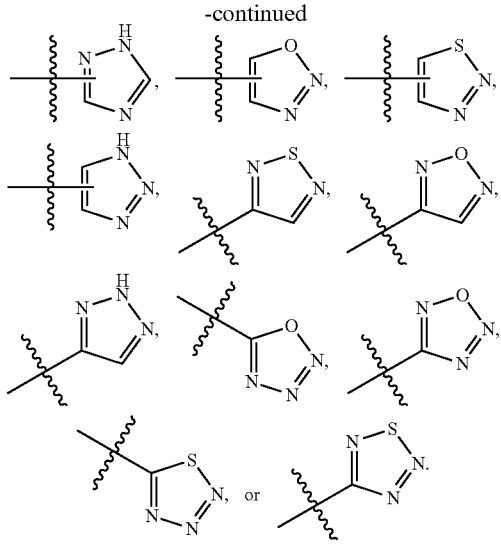

If a group is substituted by a group, which should be understood to mean that the group is substituted by one or more groups, which are same or different groups, selected from the mentioned groups. In addition, the same or different substitution characters contained in the same or different substituents are independently selected, and may be the same or different. This is also applicable to ring systems formed with different atoms and units. Meanwhile, the scope of the claims will exclude those compounds chemically unstable under standard conditions known to those skilled in the art.

In addition, unless specifically defined, the term occurring before or after multiple juxtaposed substituents (separated by "," or "or") in the present invention has a limiting effect on each of the substituents, such as the term "with or without halogen" in "alkyl, alkenyl, alkynyl, cycloalkyl or cycloalkylalkyl with or without halogen" has a limiting effect on each of the following groups "alkyl", "alkenyl", "alkynyl", "cycloalkyl" and "cycloalkylalkyl"; a group (including heterocyclyl, aryl, etc.) without being specified a linking site may be attached at any site, including a C or N site; if it is substituted, the substituent may be substituted at any site as long as it comply with the valence bond theory. For example, if the heteroaryl

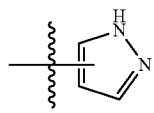

is substituted with one methyl, it can be

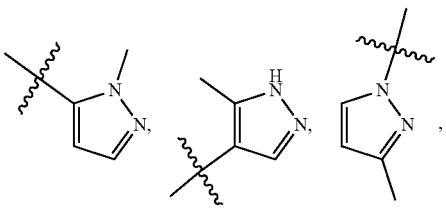

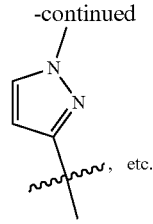, etc.

Depending on the property of substituents and the linkage manner thereof, the compound of Formula I and its derivatives may exist as a stereoisomer. For example, if a compound has one or more asymmetric carbon atoms, it may has enantiomers and diastereomers. The stereoisomer can be obtained from the mixtures obtained in the preparation by conventional separation methods, for example by chromatographic separation. The stereoisomer may also be prepared selectively by using stereoselective reactions and using optically active starting materials and/or auxiliaries. The present invention also relates to all stereoisomers and mixtures thereof which are included in the general Formula I but are not specifically defined.

A method for preparing the substituted thiadiazinone dioxide is as follows:
when $R_2$ in the above general formula I is hydrogen, the preparation method comprises the following steps:
(1) subjecting the compound of the general formula III and an electrophilic reagent

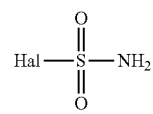

to substitution reaction to obtain the compound of the general formula II-1;
(2) subjecting the compound of the general Formula II-1 to intramolecular cyclization reaction to obtain the compound of the general formula I-1;
(3) subjecting the compound of the general formula I-1 and $R_1'$-L to alkylation reaction to obtain the compound of the general formula I-2;
when $R_2$ in the general formula I is $R_2'$, the preparation method comprises the following steps:
(1') preparing the compound of the general formula II-2 from the compound of the general formula III in the presence of

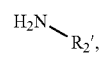

an electrophilic reagent

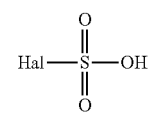

and a dehydrating agent;
(2') subjecting the compound of the general Formula II-2 to intramolecular cyclization reaction to obtain the compound of the general Formula I-3;

(3') subjecting the compound of the general Formula I-3 and R₁'-L to alkylation reaction to obtain the compound of the general Formula I-4;

wherein, Hal and L each independently represent halogen; R₁' and R₂' respectively represent the values for R₁ and R₂ defined as previously described excluding hydrogen; X and Y are defined as previously described;

the chemical reaction scheme is as follows:

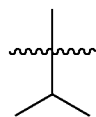

in the step (1'), the dehydrating agent is preferably phosphorus oxychloride, concentrated sulfuric acid, phosphorus pentoxide or phosphorus pentachloride;

the steps (1), (1'), (2), (2'), (3) and (3') are all carried out in the presence of bases and organic solvents; the bases are each independently selected from inorganic bases (such as K₂CO₃, Na₂CO₃, Cs₂CO₃, NaHCO₃, KF, CsF, KOAc, NaOAc, K₃PO₄, t-BuONa, EtONa, NaOH, KOH, NaOMe, etc) or organic bases (such as pyrazole, triethylamine, DIEA, etc); the organic solvents are each independently selected from methanol, ethanol, acetonitrile, dichloroethane, DMF, DMSO, dioxane, dichloromethane or ethyl acetate.

An herbicidal composition comprising a herbicidally effective dose of at least one of the substituted thiadiazinone dioxide; preferably, the herbicidal composition also comprises a preparation auxiliary.

A method for controlling a weed which includes applying a herbicidally effective dose of at least one of the substituted thiadiazinone dioxide or the herbicidal composition to a plant or a weed area.

Use of at least one of the substituted thiadiazinone dioxide or the herbicidal composition as above-described for controlling a weed, preferably, wherein the substituted thiadiazinone dioxide is used for preventing and/or controlling a weed in a useful crop, wherein the useful crop is a transgenic crop or a crop treated by gene editing technique.

The compounds of the formula I according to the invention have an outstanding herbicidal activity against a broad spectrum of economically important monocotyledonous and dicotyledonous harmful plants. The active compounds also act efficiently on perennial weeds which produce shoots from rhizomes, root stocks or other perennial organs and which are difficult to control. In this context, it is generally immaterial whether the substances are applied pre-sowing, pre-emergence or post-emergence. Specifically, examples may be mentioned of some representatives of the monocotyledonous and dicotyledonous weed flora which can be controlled by the compounds according to the invention, without these being a restriction to certain species. Examples of weed species on which the active compounds act efficiently are, from amongst the monocotyledons, *Avena, Lolium, Alopecurus, Phalaris, Echinochloa, Digitaria, Setaria* and also *Cyperus* species from the annual sector and from amongst the perennial species *Agropyron, Cynodon, Imperata* and *Sorghum*, and also perennial *Cyperus* species.

In the case of the dicotyledonous weed species, the spectrum of action extends to species such as, for example, *Galium, Viola, Veronica, Lamium, Stellaria, Amaranthus, Sinapis, Ipomoea, Sida, Matricaria* and *Abutilon* from amongst the annuals, and *Convolvulus, Cirsium, Rumex* and *Artemisia* in the case of the perennial weeds. The active compounds according to the invention also effect outstanding control of harmful plants which occur under the specific conditions of rice growing such as, for example, *Echinochloa, Sagittaria, Alisma, Eleocharis, Scirpus* and *Cyperus*. If the compounds according to the invention are applied to the soil surface prior to germination, then the weed seedlings are either prevented completely from emerging, or the weeds grow until they have reached the cotyledon stage but then their growth stops, and, eventually, after three to four weeks have elapsed, they die completely. In particular, the compounds according to the invention exhibit excellent activity against *Aperaspica venti, Chenopodium album, Lamium purpureum, Polygonum convulvulus, Stellaria media, Veronica hederifolia, Veronica persica, Viola tricolor* and against *Amaranthus, Galium* and *Kochia* species.

Although the compounds according to the invention have an excellent herbicidal activity against monocotyledonous and dicotyledonous weeds, crop plants of economically important crops such as, for example, wheat, barley, rye, rice, corn, sugarbeet, cotton and soya, are not damaged at all, or only to a negligible extent. In particular, they have excellent compatibility in cereals, such as wheat, barley and corn, in particular wheat. For these reasons, the present compounds are highly suitable for selectively controlling undesired plant growth in plantings for agricultural use or in plantings of ornamentals.

Owing to their herbicidal properties, these active compounds can also be employed for controlling harmful plants in crops of known or still to be developed genetically engineered plants. The transgenic plants generally have particularly advantageous properties, for example resistance to certain pesticides, in particular certain herbicides, resistance to plant diseases or causative organisms of plant diseases, such as certain insects or microorganisms such as fungi, bacteria or viruses. Other particular properties relate, for example, to the quantity, quality, storage-stability, composition and to specific ingredients of the harvested product. Thus, transgenic plants having an increased starch content or a modified quality of the starch or those having a different fatty acid composition of the harvested produce are known.

The use of the compounds of the formula I according to the invention or their salts in economically important transgenic crops of useful and ornamental plants, for example of cereal, such as wheat, barley, rye, oats, millet, rice, maniok and corn, or else in crops of sugarbeet, cotton, soya, rapeseed, potato, tomato, pea and other vegetable species is preferred. The compounds of the formula I can preferably be used as herbicides in crops of useful plants which are resistant or which have been made resistant by genetic engineering toward the phytotoxic effects of the herbicides.

Conventional ways for preparing novel plants which have modified properties compared to known plants comprise, for example, traditional breeding methods and the generation of mutants. Alternatively, novel plants having modified properties can be generated with the aid of genetic engineering methods (see, for example, EP-A 0 221 044, EP-A 0 131 624). For example, there have been described several cases of:

genetically engineered changes in crop plants in order to modify the starch synthesized in the plants (for example WO 92/11376, WO 92/14827, WO 91/19806), transgenic crop plants which are resistant to certain herbicides of the glufosinate- (cf., for example, EP-A 0 242 236, EP-A 0 242 246) or glyphosate-type (WO 92/00377), or of the sulfonylurea-type (EP-A 0 257 993, U.S. Pat. No. 5,013,659A), transgenic crop plants, for example cotton, having the ability to produce *Bacillus thuringiensis* toxins (Bt toxins) which impart resistance to certain pests to the plants (EP-A 0 142 924, EP-A 0 193 259), transgenic crop plants having a modified fatty acid composition (WO 91/13972).

Numerous molecular biological techniques which allow the preparation of novel transgenic plants having modified properties are known in principle; see, for example, Sambrook et al., 1989, Molecular Cloning, A Laboratory Manual, 2nd ed. Cold Spring Harbor Laboratory Press, Cold Spring Harbor, N.Y.; or Winnacker "Gene und Klone" [Genes and Clones], VCH Weinheim, 2nd edition 1996, or Christou, "Trends in Plant Science" 1 (1996) 423-431). In order to carry out such genetic engineering manipulations, it is possible to introduce nucleic acid molecules into plasmids which allow a mutagenesis or a change in the sequence to occur by recombination of DNA sequences. Using the abovementioned standard processes it is possible, for example, to exchange bases, to remove partial sequences or to add natural or synthetic sequences. To link the DNA fragments with each other, it is possible to attach adaptors or linkers to the fragments.

Plant cells having a reduced activity of a gene product can be prepared, for example, by expressing at least one appropriate antisense-RNA, a sense-RNA to achieve a cosuppression effect, or by expressing at least one appropriately constructed ribozyme which specifically cleaves transcripts of the above-mentioned gene product.

To this end it is possible to employ both DNA molecules which comprise the entire coding sequence of a gene product including any flanking sequences that may be present, and DNA molecules which comprise only parts of the coding sequence, it being necessary for these parts to be long enough to cause an antisense effect in the cells. It is also possible to use DNA sequences which have a high degree of homology to the coding sequences of a gene product but which are not entirely identical.

When expressing nucleic acid molecules in plants, the synthesized protein can be localized in any desired compartment of the plant cells. However, to achieve localization in a certain compartment, it is, for example, possible to link the coding region with DNA sequences which ensure localization in a certain compartment. Such sequences are known to the person skilled in the art (see, for example, Braun et al., EMBO J. 11 (1992), 3219-3227; Wolter et al., Proc. Natl. Acad. Sci. USA 85 (1988), 846-850; Sonnewald et al., Plant J. 1 (1991), 95-106).

The transgenic plant cells can be regenerated to whole plants using known techniques. The transgenic plants can in principle be plants of any desired plant species, i.e. both monocotyledonous and dicotyledonous plants. In this manner, it is possible to obtain transgenic plants which have modified properties by overexpression, suppression or inhibition of homologous (=natural) genes or gene sequences or by expression of heterologous (=foreign) genes or gene sequences.

When using the active compounds according to the invention in transgenic crops, in addition to the effects against harmful plants which can be observed in other crops, there are frequently effects which are specific for the application in the respective transgenic crop, for example a modified or specifically broadened spectrum of weeds which can be controlled, modified application rates which can be used for the application, preferably good combinability with the herbicides to which the transgenic crops are resistant, and an effect on the growth and the yield of the transgenic crop plants. The invention therefore also provides for the use of the compounds according to the invention as herbicides for controlling harmful plants in transgenic crop plants.

In addition, the substances according to the invention have outstanding growth-regulating properties in crop plants. They engage in the plant metabolism in a regulating manner and can this be employed for the targeted control of plant constituents and for facilitating harvesting, for example by provoking desiccation and stunted growth. Furthermore, they are also suitable for generally regulating and inhibiting undesirable vegetative growth, without destroying the plants in the process. Inhibition of vegetative growth plays an important role in many monocotyledon and dicotyledon crops because lodging can be reduced hereby, or prevented completely.

The compounds according to the invention can be applied in the customary formulations in the form of wettable powders, emulsifiable concentrates, sprayable solutions, dusts or granules. The invention therefore also provides herbicidal compositions comprising compounds of the formula I. The compounds of the formula I can be formulated in various ways depending on the prevailing biological and/or chemico-physical parameters. Examples of suitable formulation options are: wettable powders (WP), water-soluble powders (SP), water-soluble concentrates, emulsifiable concentrates (EC), emulsions (EW), such as oil-in-water and water-in-oil emulsions, sprayable solutions, suspension concentrates (SC), oil dispersions (OD), oil- or water-based dispersions, oil-miscible solutions, dusts (DP), capsule suspensions (CS), seed-dressing compositions, granules for broadcasting and soil application, granules (GR) in the form of microgranules, spray granules, coating granules and adsorption granules, water-dispersible granules (WG), water-soluble granules (SG), ULV formulations, microcapsules and waxes. These individual formulation types are known in principle and are described, for example, in Winnacker-Küchler, "ChemischeTechnologie" [Chemical Technology], Volume 7, C. Hauser Verlag Munich, 4th. Edition 1986; Wade van Valkenburg, "Pesticide Formulations", Marcel Dekker, N.Y., 1973; K. Martens, "Spray Drying" Handbook, 3rd Ed. 1979, G. Goodwin Ltd. London.

The necessary formulation auxiliaries, such as inert materials, surfactants, solvents and other additives, are likewise known and are described, for example, in Watkins, "Handbook of Insecticide Dust Diluents and Carriers", 2nd Ed., Darland Books, Caldwell N.J., H. v. Olphen, "Introduction to Clay Colloid Chemistry"; 2nd Ed., J. Wiley & Sons, N.Y.; C. Marsden, "Solvents Guide"; 2nd Ed., Interscience, N.Y. 1963; McCutcheon's "Detergents and Emulsifiers Annual", MC Publ. Corp., Ridgewood N.J.; Sisley and Wood, "Encyclopedia of Surface Active Agents", Chem. Publ. Co. Inc., N.Y. 1964; Schönfeldt, "GrenzflüchenaktiveÄthylenoxidaddkte" [Surface-active ethylene oxide adducts], Wiss. Verlagagesell. Stuttgart 1976; Winnacker-Küchler, "ChemischeTechnologie" [Chemical Technology], Volume 7, C. Hauser Verlag Munich, 4th Edition 1986.

Wettable powders are preparations which are uniformly dispersible in water and which contain, in addition to the active compound and as well as a diluent or inert substance, surfactants of ionic and/or nonionic type (wetting agents, dispersants), for example polyethoxylated alkyl phenols, polyethoxylated fatty alcohols, polyethoxylated fatty amines, fatty alcohol polyglycol ethersulfates, alkanesulfonates, alkylbenzenesulfonates, sodium ligninsulfonate, sodium 2,2'-dinaphthylmethane-6,6'-disulfonate, sodium dibutyinaphthalenesulfonate or else sodium oleoylmethyltaurinate. To prepare the wettable powders, the herbicidally active compounds are finely ground, for example in customary apparatus such as hammer mills, fan mills and air-jet mills, and are mixed simultaneously or subsequently with the formulation auxiliaries.

Emulsifiable concentrates are prepared by dissolving the active compound in an organic solvent, for example butanol, cyclohexanone, dimethylformamide, xylene or else relatively high-boiling aromatic compounds or hydrocarbons or mixtures of the solvents, with the addition of one or more surfactants of ionic and/or nonionic type (emulsifiers). Examples of emulsifiers which can be used are calcium alkylarylsulfonates, such as Ca dodecylbenzenesulfonate, or nonionic emulsifiers, such as fatty acid polyglycol esters, alkylaryl polyglycol ethers, fatty alcohol polyglycol ethers, propylene oxide-ethylene oxide condensation products, alkyl polyethers, sorbitan esters, for example sorbitan fatty acid esters or polyoxyethylenesorbitan esters, for example polyoxyethylenesorbitan fatty acid esters.

Dusts are obtained by grinding the active compound with finely divided solid substances, for example talc, natural clays, such as kaolin, bentonite and pyrophyllite, or diatomaceous earth. Suspension concentrates can be water- or oil-based. They can be prepared, for example, by wet milling using commercially customary bead mills, with or without the addition of surfactants as already mentioned above, for example, in the case of the other formulation types.

Emulsions, for example oil-in-water emulsions (EW), can be prepared for example by means of stirrers, colloid mills and/or static mixers using aqueous organic solvents and, if desired, surfactants as already mentioned above, for example, in the case of the other formulation types.

Granules can be prepared either by spraying the active compound onto adsorptive, granulated inert material or by applying active-compound concentrates to the surface of carriers such as sand, kaolinites or granulated inert material, by means of adhesive binders, for example polyvinyl alcohol, sodium polyacrylate or else mineral oils. Suitable active compounds can also be granulated in the manner which is customary for the preparation of fertilizer granules, if desired as a mixture with fertilizers. Water-dispersible granules are generally prepared by the customary processes, such as spray-drying, fluidized-bed granulation, disk granulation, mixing using high-speed mixers, and extrusion without solid inert material.

For the preparation of disk, fluidized-bed, extruder and spray granules, see for example processes in "Spray-Drying Handbook" 3rd ed. 1979, G. Goodwin Ltd., London; J. E. Browning, "Agglomeration", Chemical and Engineering 1967, pages 147 ff.; "Perry's Chemical Engineer's Handbook", 5th Ed., McGraw-Hill, New York 1973, pp. 8-57. For further details on the formulation of crop protection products, see for example G. C. Klingman, "Weed Control as a Science", John Wiley and Sons Inc., New York, 1961, pages 81-96 and J. D. Freyer, S. A. Evans, "Weed Control Handbook", 5th Ed., Blackwell Scientific Publications, Oxford, 1968, pages 101-103.

The agrochemical formulations generally contain from 0.1 to 99% by weight, in particular from 0.1 to 95% by weight, of active compound of the formula I. In wettable powders the concentration of active compound is, for example, from about 10 to 99% by weight, the remainder to 100% by weight consisting of customary formulation constituents. In emulsifiable concentrates the concentration of active compound can be from about 1 to 90%, preferably from 5 to 80%, by weight. Formulations in the form of dusts contain from 1 to 30% by weight of active compound, preferably most commonly from 5 to 20% by weight of active compound, while sprayable solutions contain from about 0.05 to 80%, preferably from 2 to 50%, by weight of active compound. In the case of water-dispersible granules the content of active compound depends partly on whether the active compound is in liquid or solid form and on the granulation auxiliaries, fillers, etc. that are used. In water-dispersible granules the content of active compound, for example, is between 1 and 95% by weight, preferably between 10 and 80% by weight.

In addition, the formulations of active compound may comprise the tackifiers, wetting agents, dispersants, emulsifiers, penetrants, preservatives, antifreeze agents, solvents, fillers, carriers, colorants, antifoams, evaporation inhibitors and pH and viscosity regulators which are customary in each case.

Based on these formulations it is also possible to produce combinations with other pesticidally active substances, for example insecticides, acaricides, herbicides and fungicides, and also with safeners, fertilizers and/or growth regulators, for example in the form of a ready-mix or tank mix.

Suitable active compounds which can be combined with the active compounds according to the invention in mixed formulations or in a tank mix are, for example, known active compounds as described in for example World Herbicide New Product Technology Handbook, China Agricultural Science and Farming Techniques Press, 2010.9 and in the literature cited therein. For example the following active compounds may be mentioned as herbicides which can be combined with the compounds of the formula I (note: the compounds are either named by the "common name" in accordance with the International Organization for Standardization (ISO) or by the chemical names, if appropriate together with a customary code number): acetochlor, butachlor, alachlor, propisochlor, metolachlor, s-metolachlor, pretilachlor, propachlor, ethachlor, napropamide, R-left handed napropamide, propanil, mefenacet, diphenamid, diflufenican, ethaprochlor, beflubutamid, bromobutide, dimethenamid, dimethenamid-P, etobenzanid, flufenacet, thenylchlor, metazachlor, isoxaben, flamprop-M-methyl, flamprop-M-propyl, allidochlor, pethoxamid, chloranocryl, cyprazine, mefluidide, monalide, delachlor, prynachlor, terbuchlor, xylachlor, dimethachlor, cisanilide, trimexachlor, clomeprop, propyzamide, pentanochlor, carbetamide, benzoylprop-ethyl, cyprazole, butenachlor, tebutam, benzipram, mogrton, dichlofluanid, naproanilide, diethatyl-ethyl, naptalam, flufenacet, EL-177, benzadox, chlorthiamid, chlorophthalimide, isocarbamide, picolinafen, atrazine, simazine, prometryn, cyanatryn, simetryn, ametryn, propazine, dipropetryn, SSH-108, terbutryn, terbuthylazine, triaziflam, cyprazine, proglinazine, trietazine, prometon, simetone, aziprotryne, desmetryn, dimethametryn, procyazine, mesoprazine, sebuthylazine, secbumeton, terbumeton, methoprotryne, cyanatryn, ipazine, chlorazine, atraton, pendimethalin, eglinazine, cyanuric acid, indaziflam, chlorsulfuron, metsulfuron-methyl, bensulfuron methyl, chlorimuron-ethyl, tribenuron-methyl, thifensulfuron-methyl, pyrazosulfuron-ethyl, mesosulfuron, iodosulfuron-methyl sodium, foramsulfuron, cinosulfuron, triasulfuron, sulfometuron methyl, nicosulfuron, ethametsulfuron-methyl, amidosulfuron, ethoxysulfuron, cyclosulfamuron, rimsulfuron, azimsulfuron, flazasulfuron, monosulfuron, monosulfuron-ester, flucarbazone-sodium, flupyrsulfuron-methyl, halosulfuron-methyl, oxasulfuron, imazosulfuron, primisulfuron, propoxycarbazone, prosulfuron, sulfosulfuron, trifloxysulfuron, triflusulfuron-methyl, tritosulfuron, sodium metsulfuron methyl, flucetosulfuron, HNPC-C, orthosulfamuron, propyrisulfuron, metazosulfuron, acifluorfen, fomesafen, lactofen, fluoroglycofen, oxyfluorfen, chlornitrofen, aclonifen, ethoxyfen-ethyl, bifenox, nitrofluorfen, chlomethoxyfen, fluorodifen, fluoronitrofen, furyloxyfen, nitrofen, TOPE, DMNP, PPG1013, AKH-7088, halosafen, chlortoluron, isoproturon, linuron, diuron, dymron, fluometuron, benzthiazuron, methabenzthiazuron, cumyluron, ethidimuron, isouron, tebuthiuron, buturon, chlorbromuron, methyldymron, phenobenzuron, SK-85, metobromuron, metoxuron, afesin, monuron, siduron, fenuron, fluothiuron, neburon, chloroxuron, noruron, isonoruron, 3-cyclooctyl-1, thiazfluron, tebuthiuron, difenoxuron, parafluron, methylamine tribunil, karbutilate, trimeturon, dimefuron, monisouron, anisuron, methiuron, chloreturon, tetrafluron, phenmedipham, phenmedipham-ethyl, desmedipham, asulam, terbucarb, barban, propham, chlorpropham, rowmate, swep, chlorbufam, carboxazole, chlorprocarb, fenasulam, BCPC, CPPC, carbasulam, butylate, benthiocarb, vernolate, molinate, triallate, dimepiperate, esprocarb, pyributicarb, cycloate, avadex, EPTC, ethiolate, orbencarb, pebulate, prosulfocarb, tiocarbazil, CDEC, dimexano, isopolinate, methiobencarb, 2,4-D butyl ester, MCPA-Na, 2,4-D isooctyl ester, MCPA isooctyl ester, 2,4-D sodium salt, 2,4-D dimethylamine salt, MCPA-thioethyl, MCPA, 2,4-D propionic acid, high 2,4-D propionic acid salt, 2,4-D butyric acid, MCPA propionic acid, MCPA propionic acid salt, MCPA butyric acid, 2,4,5-D, 2,4,5-D propionic acid, 2,4,5-D butyric acid, MCPA amine salt, dicamba, erbon, chlorfenac, saison, TBA, chloramben, methoxy-TBA, diclofop-methyl, fluazifop-butyl, fluazifop-p-butyl, haloxyfop-methyl, haloxyfop-P, quizalofop-ethyl, quizalofop-p-ethyl, fenoxaprop-ethy, fenoxaprop-p-ethyl, propaquizafop, cyhalofop-butyl, metamifop, clodinafop-propargyl, fenthiaprop-ethyl, chloroazifop-propynyl, poppenate-methyl, trifopsime, isoxapyrifop, paraquat, diquat, oryzalin, ethalfluralin, isopropalin, nitralin, profluralin, prodinamine, benfluralin, fluchloraline, dinitramina, dipropalin, chlornidine, methalpropalin, dinoprop, glyphosate, anilofos, glufosinate ammonium, amiprophos-methyl, sulphosate, piperophos, bialaphos-sodium, bensulide, butamifos, phocarb, 2,4-DEP, H-9201, zytron, imazapyr, imazethapyr, imazaquin, imazamox, imazamox ammonium salt, imazapic, imazamethabenz-methyl, fluroxypyr, fluroxypyrisooctyl ester, clopyralid, picloram, trichlopyr, dithiopyr, haloxydine, 3,5,6-trichloro-2-pyridinol, thiazopyr, fluridone, aminopyralid, diflufenzopyr, triclopyr-butotyl, Cliodinate, sethoxydim, clethodim, cycloxydim, alloxydim, clefoxydim, butroxydim, tralkoxydim, tepraloxydim, buthidazole, metribuzin, hexazinone, metamitron, ethiozin, ametridione, amibuzin, bromoxynil, bromoxynil octanoate, ioxynil octanoate, ioxynil, dichlobenil, diphenatrile, pyraclonil, chloroxynil, iodobonil, flumetsulam, florasulam, penoxsulam, metosulam, cloransulam-methyl, diclosulam, pyroxsulam, benfuresate, bispyribac-sodium, pyribenzoxim, pyriftalid, pyriminobac-methyl, pyrithiobac-sodium, benzobicylon, mesotrione, sulcotrione, tembotrione, tefuryltrione, bicyclopyrone, ketodpiradox, isoxaflutole, clomazone, fenoxasulfone, methiozolin, fluazolate, pyraflufen-ethyl, pyrazolynate, difenzoquat, pyrazoxyfen, benzofenap, nipyraclofen, pyrasulfotole, topramezone, pyroxasulfone, cafenstrole, flupoxam, aminotriazole, amicarbazone, azafenidin, carfentrazone-ethyl, sulfentrazone, bencarbazone, benzfendizone, butafenacil, bromacil, isocil, lenacil, terbacil, flupropacil, cinidon-ethyl, flumiclorac-pentyl, flumioxazin, propyzamide, MK-129, flumezin, pentachlorophenol, dinoseb, dinoterb, dinoterb acetate, dinosam, DNOC, chloronitrophene, medinoterb acetate, dinofenate, oxadiargyl, oxadiazon, pentoxazone, Flufenacet, fluthiacet-methyl, fentrazamide, flufenpyr-ethyl, pyrazon, brompyrazon, metflurazon, kusakira, dimidazon, oxapyrazon, norflurazon, pyridafol, quinclorac, quinmerac, bentazone, pyridate, oxaziclomefone, benazolin, clomazone, cinmethylin, ZJ0702, pyribambenz-propyl, indanofan, sodium chlorate, dalapon, trichloroacetic acid, monochloroacetic acid, hexachloroacetone, flupropanate, cyperquat, bromofenoxim, epronaz, methazole, flurtamone, benfuresate, ethofumesate, tioclorim, chlorthal, fluorochloridone, tavron, acrolein, bentranil, tridiphane, chlorfenpropmethyl, thidiarizonaimin, phenisopham, busoxinone, methoxyphenone, saflufenacil, clacyfos, chloropon, alorac, diethamquat, etnipromid, iprymidam, ipfencarbazone, thiencarbazone-methyl, pyrimisulfan, chlorflurazole, tripropindan, sulglycapin, prosulfalin, cambendichlor, aminocyclopyrachlor, rodethanil, benoxacor, fenclorim, flurazole, fenchlorazole-ethyl, cloquintocet-mexyl, oxabetrinil, MG/91, cyometrinil, DKA-24, mefenpyr-diethyl, furilazole, fluxofenim, isoxadifen-ethyl, dichlormid, halauxifen-methyl, DOW florpyrauxifen, UBH-509, D489, LS 82-556, KPP-300, NC-324, NC-330, KH-218, DPX-N8189, SC-0744, DOWCO535, DK-8910, V-53482, PP-600, MBH-001, KIH-9201, ET-751, KIH-6127 and KIH-2023.

For use, the formulations which are present in commercially available form are, if appropriate, diluted in the customary manner, for example using water in the case of wettable powders, emulsifiable concentrates, dispersions and water-dispersible granules. Products in the form of dusts, granules for soil application or broadcasting and sprayable solutions are usually not further diluted with other inert substances prior to use. The application rate of the compounds of the formula I required varies with the external conditions, such as temperature, humidity, the nature of the herbicide used and the like. It can vary within wide limits, for example between 0.001 and 1.0 kg/ha or more of active substance, but it is preferably between 0.005 and 750 g/ha.

Specific Mode for Carrying Out the Invention

The following embodiments are used to illustrate the present invention in detail and should not be taken as any limit to the present invention. The scope of the invention would be explained through the Claims.

In view of economics and variety of a compound, we preferably synthesized several compounds, part of which are listed in the following Table 1. The structure and information of a certain compound are shown in Table 1. The compounds in Table 1 are listed for further explication of the present invention, other than any limit therefor. The subject of the present invention should not be interpreted by those skilled in the art as being limited to the following compounds.

TABLE 1

Structures and ¹H NMR data of compounds

I

| No. | R₁ | R₂ | X | Y | ¹HNMR |
|-----|----|----|---|---|-------|
| 1 | H | CH₃ | H | CH | ¹H NMR (500 MHz, DMSO-d₆) δ 8.66 (s, 1H), 8.33 (dd, J = 9.0, 2.0 Hz, 1H), 7.24-7.21 (m, 1H), 6.92 (dd, J = 7.5, 5.5 Hz, 1H), 2.89 (s, 3H). |
| 2 | H | isopropyl | H | CH | ¹H NMR (500 MHz, DMSO-d₆) δ 7.72 (dd, J = 9.0, 3.0 Hz, 1H), 7.58-7.54 (m, 1H), 7.21-7.19 (m, 1H), 4.84 (p, J = 7.0 Hz, 1H), 1.47 (d, J = 7.0 Hz, 6H). |
| 3 | H | CH(CH₃)CH=CHCH₃ | H | CH | ¹H NMR (500 MHz, DMSO-d₆) δ 8.72 (s, 1H), 8.34 (dd, J = 9.0, 2.0 Hz, 1H), 7.24-7.21 (m, 1H), 7.11 (dd, J = 15.0, 1.0 Hz, 1H), 6.92 (dd, J = 7.5, 5.5 Hz, 1H), 5.16-5.10 (m, 1H), 1.82 (dd, J = 6.5, 1.0 Hz, 3H). |
| 4 | H | CH₂C≡CH | H | CH | ¹H NMR (500 MHz, DMSO-d₆) δ 8.62 (s, 1H), 8.33 (dd, J = 9.0, 2.0 Hz, 1H), 7.24-7.21 (m, 1H), 6.92 (dd, J = 7.5, 5.5 Hz, 1H), 3.94 (d, J = 3.0 Hz, 2H), 3.16 (t, J = 3.0 Hz, 1H). |
| 5 | H | cyclopropyl | H | CH | ¹H NMR (500 MHz, DMSO-d₆) δ 7.74-7.71 (m, 1H), 7.59-7.55 (m, 1H), 7.23-7.20 (m, 1H), 2.78-2.74 (m, 1H), 1.09-1.00 (m, 2H), 0.94-0.85 (m, 2H). |
| 6 | H | CH₂-cyclopentyl | H | CH | ¹H NMR (500 MHz, DMSO-d₆) δ 7.75 (dd, J = 9.0, 3.0 Hz, 1H), 7.61-7.57 (m, 1H), 7.25 (dd, 9.0, 4.5 Hz, 1H), 3.78 (d, J = 7.5 Hz, 2H), 2.37-2.29 (m, 1H), 1.69-1.58 (m, 4H), 1.54-1.45 (m, 2H), 1.38-1.24 (m, 2H). |
| 7 | H | CH(CH₃)CH(CH₃)Cl | H | CH | ¹H NMR (500 MHz, DMSO-d₆) δ 8.72 (s, 1H), 8.35 (dd, J = 9.0, 2.0 Hz, 1H), 7.24-7.21 (m, 1H), 6.92 (dd, J = 7.5, 5.5 Hz, 1H), 5.85 (q, J = 7.0 Hz, 1H), 1.83 (d, J = 7.0 Hz, 3H). |
| 8 | H | CH(CH₂F)₂ | H | CH | ¹H NMR (500 MHz, DMSO-d₆) δ 8.68 (s, 1H), 8.33 (dd, J = 9.0, 2.0 Hz, 1H), 7.25-7.22 (m, 1H), 6.92 (dd, J = 7.5, 5.5 Hz, 1H), 5.47-5.34 (m, 2H), 5.22-5.01 (m, 1H), 4.73-4.59 (m, 2H) |
| 9 | H | CH(CH₃)CN | H | CH | ¹H NMR (500 MHz, DMSO-d₆) δ 7.71 (dd, J = 9.0, 3.0 Hz, 1H), 7.54-7.50 (m, 1H), 7.31 (dd, J = 9.0, 4.5 Hz, 1H). |
| 10 | H | CH(CH₃)OCH₃ | H | CH | ¹H NMR (500 MHz, DMSO-d₆) δ 7.69 (dd, J = 9.0, 3.0 Hz, 1H), 7.56-7.51 (m, 1H), 7.18 (dd, J = 9.0, 4.5 Hz, 1H), 3.95 (s, 3H). |

TABLE 1-continued

Structures and $^1$H NMR data of compounds

I

| No. | R$_1$ | R$_2$ | X | Y | $^1$HNMR |
|---|---|---|---|---|---|
| 11 | H | —CH$_2$OCH$_3$ | H | CH | $^1$H NMR (500 MHz, DMSO-d$_6$) δ 8.71 (s, 1H), 8.34 (dd, J = 9.0, 2.0 Hz, 1H), 7.25-7.21 (m, 1H), 6.92 (dd, J = 7.5, 5.5 Hz, 1H), 5.28 (s, 2H), 3.22 (s, 3H). |
| 12 | H | —CH(CH$_3$)CHO | H | CH | $^1$H NMR (500 MHz, DMSO-d$_6$) δ 9.72 (d, J = 6.0 Hz, 1H), 8.65 (s, 1H), 8.33 (dd, J = 9.0, 2.0 Hz, 1H), 7.25-7.21 (m, 1H), 6.92 (dd, J = 7.5, 5.5 Hz, 1H), 4.99-4.94 (m, 1H), 1.37 (d, J = 7.0 Hz, 3H). |
| 13 | H | —CH(CH$_3$)CN | H | CH | $^1$H NMR (500 MHz, DMSO-d$_6$) δ 8.74 (s, 1H), 8.35 (dd, J = 9.0, 2.0 Hz, 1H), 7.25-7.21 (m, 1H), 6.92 (dd, J = 7.5, 5.5 Hz, 1H), 4.91 (q, J = 7.0 Hz, 1H), 1.40 (d, J = 7.0 Hz, 3H). |
| 14 | H | —CH$_2$SCH$_3$ | H | CH | $^1$H NMR (500 MHz, DMSO-d$_6$) δ 8.33 (s, 1H), 8.28 (dd, J = 9.0, 2.0 Hz, 1H), 7.89 (s, 1H), 7.24-7.20 (m, 1H), 6.92 (dd, J = 7.5, 5.5 Hz, 1H), 2.00 (s, 3H). |
| 15 | H | —CH(CH$_3$)SCH$_3$ | H | CH | $^1$H NMR (500 MHz, DMSO-d$_6$) δ 8.67 (s, 1H), 8.34 (dd, J = 9.0, 2.0 Hz, 1H), 7.24-7.21 (m, 1H), 6.92 (dd, J = 7.5, 5.5 Hz, 1H), 4.88 (q, J = 7.0 Hz, 1H), 2.16 (s, 3H), 1.54 (d, J = 7.0 Hz, 3H). |
| 16 | H | —CH$_2$NH$_2$ | H | CH | $^1$H NMR (500 MHz, DMSO-d$_6$) δ 8.60 (s, 1H), 8.32 (dd, J = 9.0, 2.0 Hz, 1H), 7.24-7.21 (m, 1H), 6.92 (dd, J = 7.5, 5.5 Hz, 1H), 4.24 (s, 2H). |
| 17 | H | —CH$_2$N(CH$_3$)$_2$ | H | CH | $^1$H NMR (500 MHz, DMSO-d$_6$) δ 8.63 (s, 1H), 8.34 (dd, J = 9.0, 2.0 Hz, 1H), 7.24-7.21 (m, 1H), 6.92 (dd, J = 7.5, 5.5 Hz, 1H), 2.76 (s, 6H). |
| 18 | H | —CH$_2$N(CF$_3$)$_2$ | H | CH | $^1$H NMR (500 MHz, DMSO-d$_6$) δ 8.70 (s, 1H), 8.34 (dd, J = 9.0, 2.0 Hz, 1H), 7.25-7.21 (m, 1H), 6.93-6.91 (m, 1H). |
| 19 | H | —CH$_2$CH$_2$N(CH$_3$)$_2$ | H | CH | $^1$H NMR (500 MHz, DMSO-d$_6$) δ 7.59 (dd, J = 9.0, 3.0 Hz, 1H), 7.43-1.39 (m, 1H), 7.05 (dd, J = 9.0, 4.5 Hz, 1H), 4.15 (t, J = 7.0 Hz, 2H), 3.36 (t, J = 7.0 Hz, 2H), 2.85 (d, J = 3.0 Hz, 6H). |
| 20 | H | —CH$_2$NHC(O)CH$_3$ | H | CH | $^1$H NMR (500 MHz, DMSO-d$_6$) δ 11.20 (s, 1H), 10.60 (s, 1H), 8.12 (dd, J = 9.0, 2.0 Hz, 1H), 7.20-7.11 (m, 1H), 6.92 (dd, J = 7.5, 5.5 Hz, 1H), 2.04 (s, 3H). |

TABLE 1-continued

Structures and ¹H NMR data of compounds

I

| No. | R₁ | R₂ | X | Y | ¹HNMR |
|---|---|---|---|---|---|
| 21 | H | ![structure: -C(CH₃)-NH-C(=O)-NH₂] | H | CH | ¹H NMR (500 MHz, DMSO-d₆) δ 10.60 (s, 1H), 10.20 (s, 1H), 8.12 (dd, J = 9.0, 2.0 Hz, 1H), 7.20-7.11 (m, 1H), 6.92 (dd, J = 7.5, 5.5 Hz, 1H), 6.22 (s, 2H). |
| 22 | H | ![structure: -C(CH₃)-C(=NH)-NH₂] | H | CH | ¹H NMR (500 MHz, DMSO-d₆) δ 8.56 (s, 1H), 8.29 (dd, J = 9.0, 2.0 Hz, 1H), 8.02 (s, 3H), 7.23-7.19 (m, 1H), 6.92 (dd, J = 7.5, 5.5 Hz, 1H). |
| 23 | H | ![structure: -C(CH₃)-C(=O)-NHCH₃] | H | CH | ¹H NMR (500 MHz, DMSO-d₆) δ 8.91 (s, 1H), 8.39 (dd, J = 9.0, 2.0 Hz, 1H), 7.24-7.21 (m, 1H), 6.92 (dd, J = 7.5, 5.5 Hz, 1H), 6.71 (s, 1H), 2.70 (s, 3H). |
| 24 | H | ![structure: acetyl group] | H | CH | ¹H NMR (500 MHz, DMSO-d₆) δ 7.53 (dd, J = 9.0, 3.0 Hz, 1H), 7.45-7.42 (m, 1H), 7.33-7.731 (m, 1H), 1.91 (s, 3H). |
| 25 | H | ![structure: -CH(CH₃)-C(=O)-OCH₃] | H | CH | ¹H NMR (500 MHz, DMSO-d₆) δ 8.53 (s, 1H), 8.37 (dd, J = 9.0, 2.0 Hz, 1H), 7.25-7.21 (m, 1H), 6.92 (dd, J = 7.5, 5.5 Hz, 1H), 3.75 (s, 3H). |
| 26 | H | ![structure: -CH(CH₃)-O-C(=O)-OEt] | H | CH | ¹H NMR (500 MHz, DMSO-d₆) δ 8.76 (s, 1H), 8.34 (dd, J = 9.0, 2.0 Hz, 1H), 7.35 (q, J = 7.0 Hz, 1H), 7.25-7.21 (m, 1H), 6.92 (dd, J = 7.5, 5.5 Hz, 1H), 4.83-4.76 (m, 1H), 4.28-4.20 (m, 1H), 1.64 (d, J = 7.0 Hz, 3H), 1.32 (t, J = 8.0 Hz, 3H). |
| 27 | H | ![structure: -CH(CH₃)-S(=O)₂-CH₃] | H | CH | ¹H NMR (500 MHz, DMSO-d₆) δ 8.58 (s, 1H), 8.28 (dd, J = 9.0, 2.0 Hz, 1H), 7.25-7.21 (m, 1H), 6.92 (dd, J = 7.5, 5.5 Hz, 1H), 2.85 (s, 3H). |
| 28 | H | ![structure: -CH(CH₃)-phenyl] | H | CH | ¹H NMR (500 MHz, DMSO-d₆) δ 7.76 (dd, J = 9.0, 3.0Hz, 1H), 7.64-7.61 (m, 1H), 7.57-7.50 (m, 3H), 7.39-7.37 (m, 2H), 7.30 (dd, J = 9.0, 4.5 Hz, 1H). |
| 29 | H | ![structure: -CH(CH₃)-(2-fluorophenyl)] | H | CH | ¹H NMR (500 MHz, DMSO-d₆) δ 8.74 (s, 1H), 8.36 (dd, J = 9.0, 2.0 Hz, 1H), 7.55-7.52 (m, 1H), 7.30-7.22 (m, 2H), 7.16-7.12 (m, 1H), 7.03-6.99 (m, 1H), 6.92 (dd, J = 7.5, 5.5 Hz, 1H). |

TABLE 1-continued

Structures and ¹H NMR data of compounds

I

| No. | R₁ | R₂ | X | Y | ¹HNMR |
|---|---|---|---|---|---|
| 30 | H | 3-chlorophenyl (with methyl branch) | H | CH | ¹H NMR (500 MHz, DMSO-d₆) δ 8.76 (s, 1H), 8.37 (dd, J = 9.0, 2.0 Hz, 1H), 7.62 (t, J = 2.0 Hz, 1H), 7.48-7.37 (m, 2H), 7.26-7.22 (m, 1H), 7.17-7.15 (m, 1H), 6.92 (dd, J = 7.5, 5.5 Hz, 1H) |
| 31 | H | 4-methylphenyl (with methyl branch) | H | CH | ¹H NMR (500 MHz, DMSO-d₆) δ 8.75 (s, 1H), 8.37 (dd, J = 9.0, 2.0 Hz, 1H), 7.49-7.42 (m, 2H), 7.28-7.20 (m, 3H), 6.92 (dd, J = 7.5, 5.5 Hz, 1H), 2.32 (d, J = 1.5 Hz, 3H). |
| 32 | H | 3-(trifluoromethyl)phenyl (with methyl branch) | H | CH | ¹H NMR (500 MHz, DMSO-d₆) δ 8.77 (s, 1H), 8.37 (dd, J = 9.0, 2.0 Hz, 1H), 7.80 (q, J = 1.5 Hz, 1H), 7.65-7.63 (m, 1H), 7.42 (t, J = 7.5 Hz, 1H), 7.38-7.36 (m, 1H), 7.26-7.22 (m, 1H), 6.92 (dd, J = 7.5, 5.5 Hz, 1H). |
| 33 | H | 4-cyanophenyl (with methyl branch) | H | CH | ¹H NMR (500 MHz, DMSO-d₆) δ 8.78 (s, 1H), 8.37 (dd, J = 9.0, 2.0 Hz, 1H), 7.74-7.67 (m, 2H), 7.68-7.61 (m, 2H), 7.26-7.22 (m, 1H), 6.92 (dd, J = 7.5, 5.5 Hz, 1H). |
| 34 | H | 4-methoxyphenyl (with methyl branch) | H | CH | ¹H NMR (500 MHz, DMSO-d₆) δ 8.76 (s, 1H), 8.37 (dd, J = 9.0, 2.0 Hz, 1H), 7.49-7.43 (m, 2H), 7.26-7.22 (m, 1H), 6.98-6.89 (m, 3H), 3.79 (s, 3H). |
| 35 | H | benzyl (CH₂-phenyl) | H | CH | ¹H NMR (500 MHz, DMSO-d₆) δ 7.70-7.68 (m, 1H), 7.58-7.51 (m, 1H), 7.40-7.30 (m, 4H), 7.30-7.24 (m, 1H), 7.21-7.13 (m, 1H), 5.01 (s, 2H). |
| 36 | H | pyridin-4-yl (with methyl branch) | H | CH | ¹H NMR (500 MHz, DMSO-d₆) δ 8.77 (s, 1H), 8.49 (d, J = 5.0 Hz, 2H), 8.33 (dd, J = 9.0, 2.0 Hz, 1H), 7.30 (d, J = 5.0 Hz, 2H), 7.26-7.22 (m, 1H), 6.92 (dd, J = 7.5, 5.5 Hz, 1H). |
| 37 | H | furan-2-yl | H | CH | ¹H NMR (500 MHz, DMSO-d₆) δ 10.60 (s, 1H), 8.12 (dd, J = 9.0, 2.0 Hz, 1H), 7.88 (dd, J = 7.5, 1.5 Hz, 1H), 7.18-7.14 (m, 1H), 7.00 (dd, J = 7.5, 1.5 Hz, 1H), 6.92 (dd, J = 7.5, 5.5 Hz, 1H), 6.68 (t, J = 7.5 Hz, 1H). |

TABLE 1-continued

Structures and ¹H NMR data of compounds

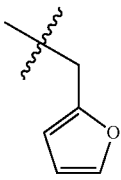 [SMILES: *Cc1ccco1]

| No. | R₁ | R₂ | X | Y | ¹HNMR |
|-----|----|----|---|---|-------|
| 38 | H | 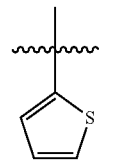 [SMILES: *c1cccs1] | H | CH | ¹H NMR (500 MHz, DMSO-$d_6$) δ 7.74-7.72 (m, 1H), 7.64 (dd, J = 9.0, 3.0 Hz, 1H), 7.56-7.54 (m, 1H), 7.51-7.49 (m, 1H), 7.23-7.21 (m, 2H), 4.08-4.06 (m, 2H). |
| 39 | H | 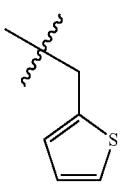 [SMILES: *Cc1cccs1] | H | CH | ¹H NMR (500 MHz, DMSO-$d_6$) δ 10.60 (s, 1H), 8.12 (dd, J = 9.0, 2.0 Hz, 1H), 7.36 (dd, J = 7.5, 2.0 Hz, 1H), 7.22 (dd, J = 7.5, 2.0 Hz, 1H), 7.21-7.12 (m, 2H), 6.92 (dd, J = 7.5, 5.5 Hz, 1H). |
| 40 | H | 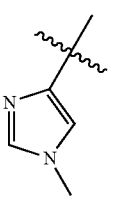 [SMILES: *c1cn(C)cn1] | H | CH | ¹H NMR (500 MHz, DMSO-$d_6$) δ 8.68 (s, 1H), 8.35 (dd J = 9.0, 2.0 Hz, 1H), 7.42 (dd, J = 7.5, 1.5 Hz, 1H), 7.29-7.19 (m, 2H), 6.97-6.89 (m, 2H), 4.73 (s, 2H). |
| 41 | H | 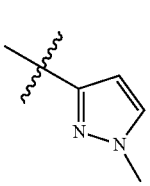 [SMILES: *c1ccn(C)n1] | H | CH | ¹H NMR (500 MHz, DMSO-$d_6$) δ 8.64 (s, 1H), 8.34 (dd, J = 9.0, 2.0 Hz, 1H), 7.84 (s, 1H), 7.24-7.21 (m, 1H), 6.93 (s, 1H), 6.92 (dd, J = 7.5, 5.5 Hz, 1H), 3.71 (s, 3H). |
| 42 | H | 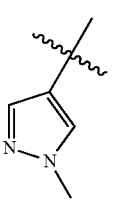 [SMILES: *c1cnn(C)c1] | H | CH | ¹H NMR (500 MHz, DMSO-$d_6$) δ 7.81 (d, J = 2.5 Hz, 1H), 7.62-7.58 (m, 1H), 7.48-7.47 (m, 1H), 7.27-7.24 (m, 1H), 6.30 (d, J = 2.5 Hz, 1H), 3.86 (s, 3H). |
| 43 | H | 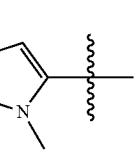 | H | CH | ¹H NMR (500 MHz, DMSO-$d_6$) δ 8.68 (s, 1H), 8.36 (dd, J = 9.0, 2.0 Hz, 1H), 7.87 (d, J = 1.5 Hz, 1H), 7.29 (d, J = 1.5 Hz, 1H), 7.24-7.21 (m, 1H), 6.92 (dd, J = 7.5, 5.5 Hz, 1H), 3.93 (s, 3H). |
| 44 | H |  | H | CH | ¹H NMR (500 MHz, DMSO-$d_6$) δ 10.60 (s, 1H), 8.12 (dd, J = 9.0, 2.0 Hz, 1H), 7.54 (d, J = 7.5 Hz, 1H), 7.18-7.14 (m, 1H), 6.92 (dd, J = 7.5, 5.5 Hz, 1H), 6.00 (d, J = 7.5 Hz, 1H), 3.53 (s, 3H). |

TABLE 1-continued

Structures and ¹H NMR data of compounds

I

| No. | R₁ | R₂ | X | Y | ¹HNMR |
|---|---|---|---|---|---|
| 45 | H | 2-methyl-1,3,4-oxadiazol-5-yl | H | CH | ¹H NMR (500 MHz, DMSO-d₆) δ 10.60 (s, 1H), 8.12 (dd, J = 9.0, 2.0 Hz, 1H), 7.18-7.14 (m, 1H), 6.92 (dd, J = 7.5, 5.5 Hz, 1H), 2.63 (s, 3H). |
| 46 | H | 1,3,4-thiadiazol-2-yl | H | CH | ¹H NMR (500 MHz, DMSO-d₆) δ 10.60 (s, 1H), 9.16 (s, 1H), 8.12 (dd, J = 9.0, 2.0 Hz, 1H), 7.18-7.14 (m, 1H), 6.92 (dd, J = 7.5, 5.5 Hz, 1H). |
| 47 | H | 1-methyl-1H-tetrazol-5-yl | H | CH | ¹H NMR (500 MHz, DMSO-d₆) δ 10.60 (s, 1H), 8.12 (dd, J = 9.0, 2.0 Hz, 1H), 7.18-7.14 (m, 1H), 6.92 (dd, J = 7.5, 5.5 Hz, 1H), 4.30 (s, 3H). |
| 48 | H | tetrahydro-2H-pyran-4-yl | H | CH | ¹H NMR (500 MHz, DMSO-d₆) δ 7.75 (dd, J = 9.0, 3.0 Hz, 1H), 7.60-7.56 (m, 1H), 7.24-7.22 (m, 1H), 4.78-4.71 (m, 1H), 3.96-3.93 (m, 2H), 3.42-3.75 (m, 2H), 2.46-2.39 (m, 2H), 1.71-1.68 (m, 2H). |
| 49 | CH₃ | isopropyl | H | CH | ¹H NMR (500 MHz, DMSO-d₆) δ 7.71-7.69 (m, 1H), 7.55-7.53 (m, 1H), 7.20-7.17 (m, 1H), 4.82 (p, J = 7.0 Hz, 1H), 1.89 (s, 3H), 1.45 (d, J = 7.0 Hz, 6H). |
| 50 | allyl | isopropyl | H | CH | ¹H NMR (500 MHz, DMSO-d₆) δ 8.32 (dd, J = 9.0, 2.0 Hz, 1H), 7.25-7.21 (m, 1H), 6.92 (dd, J = 7.5, 5.5 Hz, 1H), 6.42 (dd, J = 17.0, 10.0 Hz, 1H), 5.83 (dd, J = 13.5, 10.0 Hz, 1H), 4.72 (dd, J = 16.5, 14.0 Hz, 1H), 4.03-3.95 (m, 1H), 1.25 (d, J = 7.0 Hz, 6H). |
| 51 | propargyl | isopropyl | H | CH | ¹H NMR (500 MHz, DMSO-d₆) δ 8.38 (dd, J = 9.0, 2.0 Hz, 1H), 7.28-7.24 (m, 1H), 6.79 (dd, J = 7.5, 5.5 Hz, 1H), 3.96 (p, J = 7.0 Hz, 1H), 3.80 (d, J = 3.0 Hz, 2H), 3.18 (t, J = 3.0 Hz, 1H), 1.25 (d, J = 7.0 Hz, 6H). |
| 52 | 3,3,3-trifluoropropyl | isopropyl | H | CH | ¹H NMR (500 MHz, DMSO-d₆) δ 8.40 (dd, J = 9.0, 2.0 Hz, 1H), 7.27-7.24 (m, 1H), 6.79 (dd, J = 7.5, 5.5 Hz, 1H), 4.59-4.46 (m, 3H), 1.25 (d, J = 7.0 Hz, 6H). |
| 53 | cyclohexyl | isopropyl | H | CH | ¹H NMR (500 MHz, DMSO-d₆) δ 8.34 (s, 1H), 7.25 (s, 1H), 6.79 (s, 1H), 4.03-3.99 (m, 1H), 3.44-3.41 (m, 1H), 1.65-1.52 (m, 6H), 1.25 (s, 6H), 1.22-1.11 (m, 2H), 1.08-0.98 (m, 2H). |

TABLE 1-continued

Structures and ¹H NMR data of compounds

[Structure I: bicyclic benzothiadiazine core with R₁, R₂, X, Y, F substituents]

| No. | R₁ | R₂ | X | Y | ¹HNMR |
|---|---|---|---|---|---|
| 54 | cyclopropylmethyl | isopropyl | H | CH | ¹H NMR (500 MHz, DMSO-d₆) δ 8.35 (dd, J = 9.0, 2.0 Hz, 1H), 7.25-7.21 (m, 1H), 6.79 (dd, J = 7.5, 5.5 Hz, 1H), 4.54 (p, J = 7.0 Hz, 1H), 2.98 (d, J = 7.0 Hz, 2H), 1.25 (d, J = 7.0 Hz, 6H), 1.11-1.02 (m, 1H), 0.38-0.29 (m, 2H), 0.02--0.08 (m, 2H). |
| 55 | -CH(CH₃)-O-CH₃ | isopropyl | H | CH | ¹H NMR (500 MHz, DMSO-d₆) δ 8.35 (dd, J = 9.0, 2.0 Hz, 1H), 7.24-7.20 (m, 1H), 6.92 (dd, J = 7.5, 5.5 Hz, 1H), 4.03 (p, J = 7.0 Hz, 1H), 3.49 (s, 3H), 1.25 (d, J = 7.0 Hz, 6H). |
| 56 | -CH₂-O-CH₃ | isopropyl | H | CH | ¹H NMR (500 MHz, DMSO-d₆) δ 7.84-7.76 (m, 1H), 7.75-7.67 (m, 2H), 5.22 (s, 2H), 4.90 (p, J = 7.0 Hz, 1H), 3.32 (s, 3H), 1.48 (d, J = 7.0 Hz, 6H). |
| 57 | -C(CH₃)₂-S-CH₃ | isopropyl | H | CH | ¹H NMR (500 MHz, DMSO-d₆) δ 8.31 (dd, J = 9.0, 2.0 Hz, 1H), 7.22-7.19 (m, 1H), 6.92 (dd, J = 7.5, 5.5 Hz, 1H), 4.57-4.48 (m, 1H), 2.00 (s, 3H), 1.25 (d, J = 7.0 Hz, 6H). |
| 58 | -CH(CH₃)-S-CH₃ | isopropyl | H | CH | ¹H NMR (500 MHz, DMSO-d₆) δ 8.34 (dd, J = 9.0, 2.0 Hz, 1H), 7.25-7.21 (m, 1H), 6.79 (dd, J = 7.5, 5.5 Hz, 1H), 4.74 (q, J = 7.0 Hz, 1H), 4.56-4.48 (m, 1H), 2.16 (s, 3H), 1.54 (d, J = 6.5 Hz, 3H), 1.25 (dd, J = 25.0, 7.0 Hz, 6H). |
| 59 | -CH₂-NH₂ | isopropyl | H | CH | ¹H NMR (500 MHz, DMSO-d₆) δ 8.35 (dd, J = 9.0, 2.0 Hz, 1H), 7.26-7.22 (m, 1H), 7.02 (dd, J = 7.5, 5.5 Hz, 1H), 4.53 (p, J = 7.0 Hz, 1H), 4.01 (s, 2H), 1.25 (d, J = 7.0 Hz, 6H) |
| 60 | -CH₂-N(CH₃)₂ | isopropyl | H | CH | ¹H NMR (500 MHz, DMSO-d₆) δ 8.37 (dd, J = 9.0, 2.0 Hz, 1H), 7.27-7.23 (m, 1H), 6.79 (dd, J = 7.5, 5.5 Hz, 1H), 4.55-4.49 (m, 1H), 4.13 (s, 2H), 2.27 (s, 6H), 1.25 (d, J = 7.0 Hz, 6H). |
| 61 | -CH(CH₃)-CN | isopropyl | H | CH | ¹H NMR (500 MHz, DMSO-d₆) δ 8.38 (dd, J = 9.0, 2.0 Hz, 1H), 7.28-7.24 (m, 1H), 6.92 (dd, J = 7.5, 5.5 Hz, 1H), 4.06-4.97 (m, 1H), 1.25 (d, J = 7.0 Hz, 6H). |
| 62 | acetyl-substituted | isopropyl | H | CH | ¹H NMR (500 MHz, DMSO-d₆) δ 7.73 (dd, J = 9.0, 3.0 Hz, 1H), 7.58-7.54 (m, 1H), 7.21 (dd, J = 9.0, 4.5 Hz, 1H), 4.85 (p, J = 7.0 Hz, 1H), 1.91 (s, 3H), 1.48 (d, J = 7.0 Hz, 6H). |

TABLE 1-continued

Structures and $^1$H NMR data of compounds

[Structure I: benzothiadiazine scaffold with R$_1$, R$_2$, X, Y, F substituents]

| No. | R$_1$ | R$_2$ | X | Y | $^1$HNMR |
|---|---|---|---|---|---|
| 63 | [isopropyl ester group] | [isopropyl] | H | CH | $^1$H NMR (500 MHz, DMSO-d$_6$) δ 7.82 (dd, J = 9.0, 3.0 Hz, 1H), 7.69-7.66 (m, 2H), 4.91 (p, J = 7.0 Hz, 1H), 4.78 (p, J = 7.0 Hz, 1H), 1.50 (d, J = 7.0 Hz, 6H), 1.20 (t, J = 7.0 Hz, 6H). |
| 64 | [ethyl carbonate group] | [isopropyl] | H | CH | $^1$H NMR (500 MHz, DMSO-d$_6$) δ 7.83 (dd, J = 8.5, 3.0 Hz, 1H), 7.75-7.69 (m, 2H), 6.49 (q, J = 6.0 Hz, 1H), 4.87 (p, J = 7.0 Hz, 1H), 4.11 (q, J = 7.0 Hz, 2H), 1.54 (d, J = 6.0 Hz, 3H), 1.46-1.41 (m, 6H), 1.16 (t, J = 7.0 Hz, 3H). |
| 65 | [NHAc group] | [isopropyl] | H | CH | $^1$H NMR (500 MHz, DMSO-d$_6$) δ 8.80 (s, 1H), 8.19 (dd, J = 9.0, 2.0 Hz, 1H), 7.25-7.22 (m, 1H), 7.02 (dd, J = 7.5, 5.5 Hz, 1H), 3.84-3.76 (m, 1H), 2.04 (s, 3H), 1.25 (d, J = 7.0 Hz, 6H). |
| 66 | [NHC(O)NH$_2$ group] | [isopropyl] | H | CH | $^1$H NMR (500 MHz, DMSO-d$_6$) δ 8.19 (dd, J = 9.0, 2.0 Hz, 1H), 7.80 (s, 1H), 7.25-7.22 (m, 1H), 7.02 (dd, J = 7.5, 5.5 Hz, 1H), 6.22 (s, 2H), 3.83-3.77 (m, 1H), 1.25 (d, J = 7.0 Hz, 6H). |
| 67 | [C(O)NHMe group] | [isopropyl] | H | CH | $^1$H NMR (500 MHz, DMSO-d$_6$) δ 8.26 (dd, J = 9.0, 2.0 Hz, 1H), 7.90 (dd, J = 7.5, 5.5 Hz, 1H), 7.41-7.38 (m, 1H), 6.71 (s, 1H), 4.03-3.95 (m, 1H), 2.74 (s, 3H), 1.25 (d, J = 7.0 Hz, 6H). |
| 68 | [SO$_2$Me group] | [isopropyl] | H | CH | $^1$H NMR (500 MHz, DMSO-d$_6$) δ 8.35 (dd, J = 9.0, 2.0 Hz, 1H), 7.27-7.23 (m, 1H), 6.92 (dd, J = 7.5, 5.5 Hz, 1H), 4.57-4.49 (m, 1H), 3.88 (s, 3H), 1.25 (d, J = 7.0 Hz, 6H). |
| 69 | [phenyl] | [isopropyl] | H | CH | $^1$H NMR (500 MHz, DMSO-d$_6$) δ 8.47-8.41 (m, 1H), 7.34-7.25 (m, 2H), 7.29-7.21 (m, 2H), 7.17-7.10 (m, 2H), 7.05-7.01 (m, 1H), 3.98 (p, J = 6.8 Hz, 1H), 1.25 (d, J = 7.0 Hz, 6H). |
| 70 | [benzyl] | [isopropyl] | H | CH | $^1$H NMR (500 MHz, DMSO-d$_6$) δ 8.34 (dd, J = 9.0, 2.0 Hz, 1H), 7.36-7.23 (m, 5H), 7.16-7.14 (m, 1H), 6.79 (dd, J = 7.5, 5.5 Hz, 1H), 4.90 (s, 2H), 4.55 (p, J = 7.0 Hz, 1H), 1.25 (d, J = 7.0 Hz, 6H). |
| 71 | [2-pyridyl] | [isopropyl] | H | CH | $^1$H NMR (500 MHz, DMSO-d$_6$) δ 8.38 (dd, J = 9.0, 2.0 Hz, 1H), 8.19 (dd, J = 5.0, 1.0 Hz, 1H), 7.57-7.3 (m, 1H), 7.34-7.24 (m, 2H), 6.73 (dd, J = 8.0, 1.0 Hz, 1H), 6.67-6.61 (m, 1H), 3.92-3.84 (m, 1H), 1.25 (d, J = 7.0 Hz, 6H). |

TABLE 1-continued

Structures and $^1$H NMR data of compounds

| No. | R$_1$ | R$_2$ | X | Y | $^1$HNMR |
|---|---|---|---|---|---|
| 72 | furan-2-ylmethyl | isopropyl | H | CH | $^1$H NMR (500 MHz, DMSO-d$_6$) δ 8.37 (dd, J = 9.0, 2.0 Hz, 1H), 7.54 (dd, J = 7.5, 1.5 Hz, 1H), 7.29-7.25 (m, 1H), 6.79 (dd, J = 7.5, 5.5 Hz, 1H), 6.38 (t, J = 7.5 Hz, 1H), 6.25 (dd, J = 7.5, 1.5 Hz, 1H), 4.56-4.48 (m, 1H), 4.17 (s, 2H), 1.25 (d, J = 7.0 Hz, 6H). |
| 73 | (1-methyl-1H-pyrazol-3-yl)methyl | isopropyl | H | CH | $^1$H NMR (500 MHz, DMSO-d$_6$) δ 8.42-8.36 (m, 1H), 7.38 (d, J = 7.5 Hz, 1H), 7.30 (dd, J = 7.5, 1.5 Hz, 2H), 6.00 (d, J = 7.5 Hz, 1H), 4.04 (p, J = 7.0 Hz, 1H), 3.91 (s, 3H), 1.25 (d, J = 7.0 Hz, 6H). |
| 74 | (tetrahydrofuran-3-yl)methyl | isopropyl | H | CH | $^1$H NMR (500 MHz, DMSO-d$_6$) δ 8.33 (dd, J = 9.0, 2.0 Hz, 1H), 7.27-7.23 (m, 1H), 6.79 (dd, J = 7.5, 5.5 Hz, 1H), 4.54-4.46 (m, 1H), 4.30 (t, J = 7.5 Hz, 1H), 4.04-3.95 (m, 2H), 3.83-3.73 (m, 2H), 2.47-2.40 (m, 1H), 2.02-1.91 (m, 1H), 1.25 (dd, J = 25.0, 6.5 Hz, 6H). |
| 75 | H | isopropyl | H | N | $^1$H NMR (500 MHz, DMSO-d$_6$) δ 8.34-8.25 (m, 1H), 7.83-7.78 (m, 1H), 4.67 (p, J = 7.0 Hz, 1H), 1.43 (d, J = 7.0 Hz, 6H). |
| 76 | H | allyl | H | N | $^1$H NMR (500 MHz, DMSO-d$_6$) δ 8.58 (s, 1H), 8.48 (dd, J = 8.0, 1.5 Hz, 1H), 8.15 (dd, J = 8.0, 1.0 Hz, 1H), 5.87-5.85 (m, 1H), 5.33-5.24 (m, 1H), 5.18-5.08 (m, 1H), 3.63 (dd, J = 6.0, 1.0 Hz, 2H). |
| 77 | H | but-3-yn-2-yl | H | N | $^1$H NMR (500 MHz, DMSO-d$_6$) δ 8.58 (s, 1H), 8.48 (dd, J = 8.0, 1.5 Hz, 1H), 8.12 (dd, J = 8.0, 1.0 Hz, 1H), 5.34-5.30 (m, 1H), 2.79 (d, J = 3.0 Hz, 1H), 1.27 (d, J = 7.0 Hz, 3H). |
| 78 | H | cyclohexyl | H | N | $^1$H NMR (500 MHz, DMSO-d$_6$) δ 8.65 (s, 1H), 8.46 (d, J = 8.0 Hz, 1H), 8.23 (d, J = 8.0 Hz, 1H), 4.01-3.99 (m, 1H), 2.40-2.35 (m, 2H), 2.04-1.95 (m, 2H), 1.85-1.69 (m, 3H), 1.69-1.56 (m, 1H), 1.44-1.36 (m, 2H). |
| 79 | H | cyclopentylmethyl | H | N | $^1$H NMR (500 MHz, DMSO-d$_6$) δ 8.59 (s, 1H), 8.48 (dd, J = 8.0, 1.5 Hz, 1H), 8.14 (dd, J = 8.0, 1.5 Hz, 1H), 2.88 (d, J = 7.0 Hz, 2H), 2.14 (h, J = 7.0 Hz, 1H), 1.68-1.46 (m, 6H), 1.29-1.17 (m, 2H). |

TABLE 1-continued

Structures and $^1$H NMR data of compounds

| No. | R$_1$ | R$_2$ | X | Y | $^1$HNMR |
|---|---|---|---|---|---|
| 80 | H | -CH$_2$-CH$_2$Cl | H | N | $^1$H NMR (500 MHz, DMSO-d$_6$) δ 8.65 (s, 1H), 8.49 (dd, J = 8.0, 1.0 Hz, 1H), 8.15 (dd, J = 8.0, 1.5 Hz, 1H), 5.05 (s, 2H). |
| 81 | H | -CH$_2$-CH$_2$CF$_3$ | H | N | $^1$H NMR (500 MHz, DMSO-d$_6$) δ 8.66 (s, 1H), 8.49 (dd, J = 8.0, 1.5 Hz, 1H), 8.14 (dd, J = 8.0, 1.5 Hz, 1H), 3.48 (q, J = 9.0 Hz, 2H). |
| 82 | H | -CH$_2$-CN | H | N | $^1$H NMR (500 MHz, DMSO-d$_6$) δ 8.80 (s, 1H), 8.50 (dd, J = 8.0, 1.5 Hz, 1H), 8.17 (dd, J = 8.0, 1.5 Hz, 1H). |
| 83 | H | -CH$_2$-OCH$_3$ | H | N | $^1$H NMR (500 MHz, DMSO-d$_6$) δ 8.61 (s, 1H), 8.49 (dd, J = 8.0, 1.5 Hz, 1H), 8.15 (dd, J = 8.0, 1.0 Hz, 1H), 3.69 (s, 3H). |
| 84 | H | -CH(CH$_3$)-OCH$_3$ | H | N | $^1$H NMR (500 MHz, DMSO-d$_6$) δ 8.59 (s, 1H), 8.48 (dd, J = 8.0, 1.5 Hz, 1H), 8.14 (dd, J = 8.0, 1.5 Hz, 1H), 6.02 (q, J = 7.0 Hz, 1H), 3.30 (s, 3H), 1.45 (d, J = 7.0 Hz, 3H). |
| 85 | H | -CH$_2$-SCH$_3$ | H | N | $^1$H NMR (500 MHz, DMSO-d$_6$) δ 8.48 (dd, J = 8.0, 1.0 Hz, 1H), 8.45 (s, 1H), 8.09 (dd, J = 8.0, 1.0 Hz, 1H), 2.00 (s, 3H). |
| 86 | H | -CH(CH$_3$)-SCH$_3$ | H | N | $^1$H NMR (500 MHz, DMSO-d$_6$) δ 8.61 (s, 1H), 8.48 (dd, J = 8.0, 1.5 Hz, 1H), 8.09 (dd, J = 8.0, 1.5 Hz, 1H), 5.52 (q, J = 7.0 Hz, 1H), 2.20 (s, 3H), 1.54 (d, J = 7.0 Hz, 3H). |
| 87 | H | -CH$_2$-NH$_2$ | H | N | $^1$H NMR (500 MHz, DMSO-d$_6$) δ 8.57 (s, 1H), 8.48 (dd, J = 8.0, 1.5 Hz, 1H), 8.14 (dd, J = 8.0, 1.0 Hz, 1H), 4.20 (s, 2H). |
| 88 | H | -CH$_2$-N(CH$_3$)$_2$ | H | N | $^1$H NMR (500 MHz, DMSO-d$_6$) δ 8.58 (s, 1H), 8.48 (dd, J = 8.0, 1.5 Hz, 1H), 8.14 (dd, J = 8.0, 1.5 Hz, 1H), 2.76 (s, 6H). |
| 89 | H | -CH$_2$-CH$_2$-N(CH$_3$)$_2$ | H | N | $^1$H NMR (500 MHz, DMSO-d$_6$) δ 8.55-8.46 (m, 2H), 8.12 (dd, J = 8.0, 1.0 Hz, 1H), 3.06 (t, J = 5.0 Hz, 2H), 2.53 (t, J = 5.0 Hz, 2H), 2.22 (s, 6H). |
| 90 | H | -CH$_2$-NH-C(O)CH$_3$ | H | N | $^1$H NMR (500 MHz, DMSO-d$_6$) δ 8.40 (dd, J = 8.0, 1.5 Hz, 1H), 7.72 (dd, J = 8.0, 1.0 Hz, 1H), 2.04 (s, 3H). |

TABLE 1-continued

Structures and ¹H NMR data of compounds

![Structure I: fused bicyclic with R1 on N, R2 on N, S(=O)(=O), X, Y positions, F substituent, carbonyl]

| No. | R₁ | R₂ | X | Y | ¹HNMR |
|---|---|---|---|---|---|
| 91 | H | -C(CH₃)₂-NH-C(=O)-NH₂ | H | N | ¹H NMR (500 MHz, DMSO-d₆) δ 11.20 (s, 1H), 10.60 (s, 1H), 8.40 (dd, J = 8.0, 1.5 Hz, 1H), 7.72 (dd, J = 8.0, 1.0 Hz, 1H), 6.22 (s, 2H). |
| 92 | H | -C(CH₃)₂-C(=O)-NH-CH₃ | H | N | ¹H NMR (500 MHz, DMSO-d₆) δ 8.83 (s, 1H), 8.49 (dd, J = 8.0, 1.5 Hz, 1H), 8.20 (dd, J = 8.0, 1.5 Hz, 1H), 6.71 (s, 1H), 2.70 (s, 3H). |
| 93 | H | -C(CH₃)₂-C(=O)-CH₃ | H | N | ¹H NMR (500 MHz, DMSO-d₆) δ 8.63 (s, 1H), 8.49 (dd, J = 8.0, 1.0 Hz, 1H), 8.15 (dd, J = 8.0, 1.5 Hz, 1H), 2.32 (s, 3H). |
| 94 | H | -C(CH₃)₂-C(=O)-O-CH₃ | H | N | ¹H NMR (500 MHz, DMSO-d₆) δ 8.49-8.47 (m, 2H), 8.18 (dd, J = 8.0, 1.5 Hz, 1H), 3.75 (s, 3H). |
| 95 | H | -CH(CH₃)-O-C(=O)-O-CH₂CH₃ | H | N | ¹H NMR (500 MHz, DMSO-d₆) δ 8.67 (s, 1H), 8.50 (dd, J = 8.0, 1.5 Hz, 1H), 8.16 (dd, J = 8.0, 1.5 Hz, 1H), 7.12 (q, J = 7.0 Hz, 1H), 4.92-4.85 (m, 1H), 4.28-4.25 (m, 1H), 1.64 (d, J = 7.0 Hz, 3H), 1.32 (t, J = 8.0 Hz, 3H). |
| 96 | H | -C(CH₃)₂-S(=O)₂-CH₃ | H | N | ¹H NMR (500 MHz, DMSO-d₆) δ 8.59 (s, 1H), 8.49 (dd, J = 8.0, 1.0 Hz, 1H), 8.11 (dd, J = 8.0, 1.0 Hz, 1H), 2.85 (s, 3H). |
| 97 | H | -CH(CH₃)-C₆H₅ | H | N | ¹H NMR (500 MHz, DMSO-d₆) δ 8.79 (s, 1H), 8.48 (dd, J = 8.0, 1.5 Hz, 1H), 8.28 (dd, J = 8.0, 1.0 Hz, 1H), 7.61-7.54 (m, 2H), 7.43 (t, J = 7.5 Hz, 2H), 7.23-7.19 (m, 1H). |
| 98 | H | -CH(CH₃)-(4-F-C₆H₄) | H | N | ¹H NMR (500 MHz, DMSO-d₆) δ 8.80 (s, 1H), 8.48 (dd, J = 8.0, 1.0 Hz, 1H), 8.27 (dd, J = 8.0, 1.5 Hz, 1H), 7.59-7.51 (m, 2H), 7.25-7.17 (m, 2H). |
| 99 | H | -CH(CH₃)-(2-Cl-C₆H₄) | H | N | ¹H NMR (500 MHz, DMSO-d₆) δ 8.78 (s, 1H), 8.48 (dd, J = 8.0, 1.5 Hz, 1H), 8.26 (dd, J = 8.0, 1.5 Hz, 1H), 7.63-7.61 (m, 2H), 7.33-7.25 (m, 2H). |

TABLE 1-continued

Structures and ¹H NMR data of compounds

I

| No. | R₁ | R₂ | X | Y | ¹HNMR |
|---|---|---|---|---|---|
| 100 | H | 4-methylphenyl | H | N | ¹H NMR (500 MHz, DMSO-d₆) δ 8.79 (s, 1H), 8.48 (dd, J = 8.0, 1.5 Hz, 1H), 8.28 (dd, J = 8.0, 1.5 Hz, 1H), 7.54-7.48 (m, 2H), 7.32-7.26 (m, 2H), 2.32 (d, J = 1.5 Hz, 3H). |
| 101 | H | 3-CF₃-phenyl | H | N | ¹H NMR (500 MHz, DMSO-d₆) δ 8.81 (s, 1H), 8.48 (dd, J = 8.0, 1.5 Hz, 1H), 8.27 (dd, J = 8.0, 1.5 Hz, 1H), 7.90-7.85 (m, 1H), 7.69-7.67 (m, 1H), 7.47 (t, J = 7.5 Hz, 1H), 7.38-7.36 (m, 1H). |
| 102 | H | 4-CN-phenyl | H | N | ¹H NMR (500 MHz, DMSO-d₆) δ 8.81 (s, 1H), 8.48 (dd, J = 8.0, 1.5 Hz, 1H), 8.27 (dd, J = 8.0, 1.0 Hz, 1H), 7.77-7.70 (m, 2H), 7.68-7.62 (m, 2H). |
| 103 | H | 4-OMe-phenyl | H | N | ¹H NMR (500 MHz, DMSO-d₆) δ 8.79 (s, 1H), 8.48 (dd, J = 8.0, 1.0 Hz, 1H), 8.28 (dd, J = 8.0, 1.5 Hz, 1H), 7.55-7.48 (m, 2H), 7.03-6.97 (m, 2H), 3.79 (s, 3H). |
| 104 | H | benzyl | H | N | ¹H NMR (500 MHz, DMSO-d₆) δ 8.71 (s, 1H), 8.46 (dd, J = 8.0, 1.5 Hz, 1H), 8.24 (dd, J = 8.0, 1.0 Hz, 1H), 7.73-7.67 (m, 2H), 7.36-7.23 (m, 3H), 4.22 (s, 2H). |
| 105 | H | 2-pyridyl | H | N | ¹H NMR (500 MHz, DMSO-d₆) δ 8.75 (s, 1H), 8.47-8.40 (m, 2H), 8.25 (dd, J = 8.0, 1.0 Hz, 1H), 7.80-7.70 (m, 2H), 7.23-7.21 (m, 1H). |
| 106 | H | 2-furyl | H | N | ¹H NMR (500 MHz, DMSO-d₆) δ 10.60 (s, 1H), 8.40 (dd, J = 8.0, 1.5 Hz, 1H), 7.88 (dd, J = 7.5, 1.5 Hz, 1H), 7.72 (dd, J = 8.0, 1.0 Hz, 1H), 7.00 (dd, J = 7.5, 1.5 Hz, 1H), 6.68 (t, J = 7.5 Hz, 1H). |
| 107 | H | 2-furylmethyl | H | N | ¹H NMR (500 MHz, DMSO-d₆) δ 8.64 (s, 1H), 8.49 (dd, J = 8.0, 1.5 Hz, 1H), 8.17 (dd, J = 8.0, 1.5 Hz, 1H), 7.54 (dd, J = 7.5, 1.5 Hz, 1H), 6.46 (dd, J = 7.5, 1.5 Hz, 1H), 6.38 (t, J = 7.5 Hz, 1H), 4.07 (s, 2H). |

TABLE 1-continued

Structures and ¹H NMR data of compounds

| No. | R₁ | R₂ | X | Y | ¹HNMR |
|-----|----|----|---|---|-------|
| 108 | H | 2-thienyl | H | N | ¹H NMR (500 MHz, DMSO-d₆) δ 10.60 (s, 1H), 8.40 (dd, J = 8.0, 1.5 Hz, 1H), 7.72 (dd, J = 8.0, 1.0 Hz, 1H), 7.36 (dd, J = 7.5, 2.0 Hz, 1H), 7.23-7.16 (m, 2H). |
| 109 | H | 2-thienylmethyl | H | N | ¹H NMR (500 MHz, DMSO-d₆) δ 8.65 (s, 1H), 8.49 (dd, J = 8.0, 1.5 Hz, 1H), 8.16 (dd, J = 8.0, 1.5 Hz, 1H), 7.42 (dd, J = 7.5, 1.5 Hz, 1H), 7.32 (dd, J = 7.5, 1.5 Hz, 1H), 6.94 (t, J = 7.5 Hz, 1H), 4.49 (s, 2H). |
| 110 | H | 1-methylimidazol-4-yl | H | N | ¹H NMR (500 MHz, DMSO-d₆) δ 8.70 (s, 1H), 8.49 (dd, J = 8.0, 1.0 Hz, 1H), 8.20 (dd, J = 8.0, 1.0 Hz, 1H), 7.87 (s, 1H), 6.93 (s, 1H), 3.70 (s, 3H). |
| 111 | H | 1-methylpyrazol-4-yl | H | N | ¹H NMR (500 MHz, DMSO-d₆) δ 8.64 (s, 1H), 8.49 (dd, J = 8.0, 1.0 Hz, 1H), 8.17 (dd, J = 8.0, 1.5 Hz, 1H), 7.87 (d, J = 1.5 Hz, 1H), 7.29 (d, J = 1.5 Hz, 1H), 3.93 (s, 3H). |
| 112 | H | 5-methyl-1,3,4-oxadiazol-2-yl | H | N | ¹H NMR (500 MHz, DMSO-d₆) δ 10.60 (s, 1H), 8.40 (dd, J = 8.0, 1.5 Hz, 1H), 7.72 (dd, J = 8.0, 1.0 Hz, 1H), 2.63 (s, 3H). |
| 113 | H | 1,3,4-thiadiazol-2-yl | H | N | ¹H NMR (500 MHz, DMSO-d₆) δ 10.60 (s, 1H), 9.16 (s, 1H), 8.40 (dd, J = 8.0, 1.5 Hz, 1H), 7.72 (dd, J = 8.0, 1.0 Hz, 1H). |
| 114 | H | 1-methyltetrazol-5-yl | H | N | ¹H NMR (500 MHz, DMSO-d₆) δ 10.60 (s, 1H), 8.40 (dd, J = 8.0 1.5 Hz, 1H), 7.72 (dd, J = 8.0, 1.0 Hz, 1H), 4.30 (s, 3H). |
| 115 | H | tetrahydro-2H-pyran-4-yl | H | N | ¹H NMR (500 MHz, DMSO-d₆) δ 8.67 (s, 1H), 8.47 (dd, J = 8.0, 1.0 Hz, 1H), 8.23 (dd, J = 8.0, 1.5 Hz, 1H), 4.26 (p, J = 7.0 Hz, 1H), 3.91-3.86 (m, 2H), 3.51-3.46 (m, 2H), 2.23-2.16 (m, 2H), 1.69-1.62 (m, 2H). |

TABLE 1-continued

Structures and ¹H NMR data of compounds

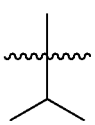 [SMILES: *C(C)C]

I

| No. | R₁ | R₂ | X | Y | ¹HNMR |
|---|---|---|---|---|---|
| 116 | CH₃ |  | H | N | ¹H NMR (500 MHz, DMSO-d₆) δ 8.47 (dd, J = 8.0, 1.5 Hz, 1H), 8.18 (dd, J = 8.0, 1.5 Hz, 1H), 4.00 (p, J = 7.0 Hz, 1H), 3.47 (s, 3H), 1.25 (d, J = 7.0 Hz, 6H). |
| 117 |  | 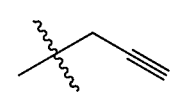 [SMILES: *CC#C] | H | N | ¹H NMR (500 MHz, DMSO-d₆) δ 8.50 (dd, J = 8.0, 1.5 Hz, 1H), 8.22 (dd, J = 8.0, 1.0 Hz, 1H), 6.42 (dd, J = 17.0, 10.0 Hz, 1H), 5.83 (dd, J = 14.0, 10.0 Hz, 1H), 4.72 (dd, J = 17.0, 14.0 Hz, 1H), 4.00 (p, J = 7.0 Hz, 1H), 1.25 (d, J = 7.0 Hz, 6H). |
| 118 | 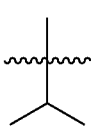 [SMILES: *C(C)C] | 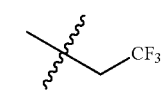 | H | N | ¹H NMR (500 MHz, DMSO-d₆) δ 8.50 (dd, J = 8.0, 1.5 Hz, 1H), 8.18 (dd, J = 8.0, 1.5 Hz, 1H), 3.96 (p, J = 7.0 Hz, 1H), 3.80 (d, J = 3.0 Hz, 2H), 3.06 (t, J = 3.0 Hz, 1H), 1.25 (d, J = 7.0 Hz, 6H) |
| 119 | 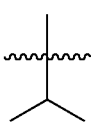 [SMILES: *C(C)C] | 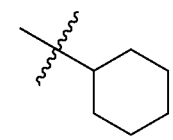 [SMILES: *C1CCCCC1] | H | N | ¹H NMR (500 MHz, DMSO-d₆) δ 8.49 (dd, J = 8.0, 1.0 Hz, 1H), 8.19 (dd, J = 8.0, 1.5 Hz, 1H), 4.54 (q, J = 9.0 Hz, 2H), 3.96-3.89 (m, 1H), 1.25 (d, J = 7.0 Hz, 6H). |
| 120 | 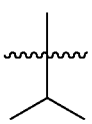 [SMILES: *C(C)C] | 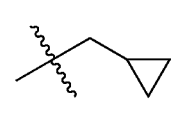 [SMILES: *CC1CC1] | H | N | ¹H NMR (500 MHz, DMSO-d₆) δ 8.46 (d, J = 8.0 Hz, 1H), 8.25 (d, J = 8.0 Hz, 1H), 4.34 (p, J = 7.0 Hz, 1H), 3.88 (p, J = 7.0 Hz, 1H), 2.02-1.97 (m, 2H), 1.73-1.44 (m, 7H), 1.39-1.27 (m, 1H), 1.25 (s, 6H). |
| 121 |  | 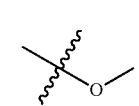 | H | N | ¹H NMR (500 MHz, DMSO-d₆) δ 8.45 (dd, J = 8.0, 1.0 Hz, 1H), 8.26 (dd, J = 8.0, 1.5 Hz, 1H), 4.52 (p, J = 7.0 Hz, 1H), 2.98 (d, J = 7.0 Hz, 2H), 1.32-1.24 (m, 7H), 0.50-0.45 (m, 2H), 0.26-0.22 (m, 2H). |
| 122 | 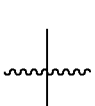 | 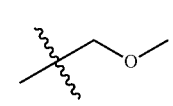 [SMILES: *COC] | H | N | ¹H NMR (500 MHz, DMSO-d₆) δ 8.55 (dd, J = 8.0, 1.0 Hz, 1H), 8.19 (dd, J = 8.0, 1.5 Hz, 1H), 3.96 (p, J = 7.0 Hz, 1H), 3.49 (s, 3H), 1.25 (d, J = 7.0 Hz, 6H). |
| 123 |  | 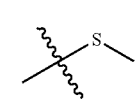 | H | N | ¹H NMR (500 MHz, DMSO-d₆) δ 8.47 (dd, J = 8.0, 1.5 Hz, 1H), 8.16 (dd, J = 8.0, 1.5 Hz, 1H), 5.18 (s, 2H), 4.00-3.92 (m, 1H), 3.28 (s, 3H), 1.25 (d, J = 7.0 Hz, 6H). |
| 124 |  |  | H | N | ¹H NMR (500 MHz, DMSO-d₆) δ 8.44 (dd, J = 8.0, 1.5 Hz, 1H), 8.14 (dd, J = 8.0, 1.0 Hz, 1H), 4.52 (p, J = 7.0 Hz, 1H), 2.00 (s, 3H), 1.25 (d, J = 7.0 Hz, 6H). |

TABLE 1-continued

Structures and ¹H NMR data of compounds

I

| No. | R₁ | R₂ | X | Y | ¹HNMR |
|-----|----|----|---|---|-------|
| 125 | CH(CH₃)SCH₃ | CH(CH₃)₂ | H | N | ¹H NMR (500 MHz, DMSO-d₆) δ 8.48 (dd, J = 8.0, 1.5 Hz, 1H), 8.13 (dd, J = 8.0, 1.0 Hz, 1H), 5.01 (q, J = 7.0 Hz, 1H), 4.45-4.38 (m, 1H), 2.14 (s, 3H), 1.51 (d, J = 7.0 Hz, 3H), 1.25 (dd, J = 25, 7.0 Hz, 6H). |
| 126 | CH₂NH₂ | CH(CH₃)₂ | H | N | ¹H NMR (500 MHz, DMSO-d6) δ 8.44 (dd, J = 8.0, 1.0 Hz, 1H), 8.17 (dd, J = 8.0, 1.0 Hz, 1H), 4.55-4.47 (m, 1H), 4.19 (s, 2H), 1.25 (d, J = 7.0 Hz, 6H) |
| 127 | CH₂N(CH₃)₂ | CH(CH₃)₂ | H | N | ¹H NMR (500 MHz, DMSO-d₆) δ 8.48 (dd, J = 8.0, 1.5 Hz, 1H), 8.16 (dd, J = 8.0, 1.0 Hz, 1H), 4.49 (p, J = 7.0 Hz, 1H), 4.13 (s, 2H), 2.24 (s, 6H), 1.25 (d, J = 7.0 Hz, 6H). |
| 128 | CH(CH₃)CN | CH(CH₃)₂ | H | N | ¹H NMR (500 MHz, DMSO-d₆) δ 8.53 (dd, J = 8.0, 1.0 Hz, 1H), 8.21 (dd, J = 8.0, 1.5 Hz, 1H), 3.99 (p, J = 7.0 Hz, 1H), 1.25 (d, J = 7.0 Hz, 6H). |
| 129 | C(=O)CH₃ | CH(CH₃)₂ | H | N | ¹H NMR (500 MHz, DMSO-d₆) δ 8.72 (dd, J = 8.0, 1.5 Hz, 1H), 8.24 (dd, J = 8.0, 1.5 Hz, 1H), 4.51 (p, J = 7.0 Hz, 1H), 2.10 (s, 3H), 1.25 (d, J = 7.0 Hz, 6H). |
| 130 | C(CH₃)₂C(=O)OCH(CH₃)₂ | CH(CH₃)₂ | H | N | ¹H NMR (500 MHz, DMSO-d₆) δ 8.60 (dd, J = 8.0, 1.0 Hz, 1H), 8.17 (dd, J = 8.0, 1.5 Hz, 1H), 5.06 (p, J = 7.0 Hz, 1H), 3.92 (p, J = 7.0 Hz, 1H), 1.25 (d, J = 7.0 Hz, 6H), 1.19 (d, J = 7.0 Hz, 6H). |
| 131 | CH(CH₃)OC(=O)OEt | CH(CH₃)₂ | H | N | ¹H NMR (500 MHz, DMSO-d₆) δ 8.50 (dd, J = 8.0, 1.5 Hz, 1H), 8.20 (dd, J = 8.0, 1.5 Hz, 1H), 7.28 (q, J = 7.0 Hz, 1H), 5.10-5.02 (m, 1H), 4.58-4.50 (m, 1H), 3.95 (p, J = 7.0 Hz, 1H), 1.49 (d, J = 7.0 Hz, 3H), 1.33-1.21 (m, 6H), 1.23 (d, J = 7.0 Hz, 3H). |
| 132 | CH₂NHC(=O)CH₃ | CH(CH₃)₂ | H | N | ¹H NMR (500 MHz, DMSO-d₆) δ 8.80 (s, 1H), 8.40 (dd, J = 8.0, 1.5 Hz, 1H), 7.72 (dd, J = 8.0, 1.0 Hz, 1H), 3.80 (p, J = 7.0 Hz, 1H), 2.04 (s, 3H), 1.25 (d, J = 7.0 Hz, 6H). |

TABLE 1-continued

Structures and ¹H NMR data of compounds

| No. | R₁ | R₂ | X | Y | ¹HNMR |
|---|---|---|---|---|---|
| 133 | -NH-C(O)-NH₂ (isopropyl-linked) | isopropyl | H | N | ¹H NMR (500 MHz, DMSO-d₆) δ 8.40 (dd, J = 8.0, 1.5 Hz, 1H), 7.80 (s, 1H), 7.72 (dd, J = 8.0, 1.0 Hz, 1H), 6.22 (s, 2H), 3.80 (p, J = 7.0 Hz, 1H), 1.25 (d, J = 7.0 Hz, 6H). |
| 134 | -C(O)-NH-CH₃ (isopropyl-linked) | isopropyl | H | N | ¹H NMR (500 MHz, DMSO-d₆) δ 8.59 (dd, J = 8.0, 1.5 Hz, 1H), 8.06 (dd, J = 8.0, 1.5 Hz, 1H), 6.71 (s, 1H), 3.98-3.91 (m, 1H), 2.73 (s, 3H), 1.25 (d, J = 7.0 Hz, 6H) |
| 135 | -S(O)₂-CH₃ (isopropyl-linked) | isopropyl | H | N | ¹H NMR (500 MHz, DMSO-d₆) δ 8.54 (dd, J = 8.0, 1.5 Hz, 1H), 8.24 (dd, J = 8.0, 1.5 Hz, 1H), 4.55-4.47 (m, 1H), 3.61 (s, 3H), 1.25 (d, J = 7.0 Hz, 6H). |
| 136 | phenyl | isopropyl | H | N | ¹H NMR (500 MHz, DMSO-d₆) δ 8.42 (dd, J = 8.0, 1.5 Hz, 1H), 8.29 (dd, J = 8.0, 1.0 Hz, 1H), 7.38-7.30 (m, 2H), 7.17-7.11 (m, 2H), 7.05-7.01 (m, 1H), 4.01 (p, J = 7.0 Hz, 1H), 1.25 (d, J = 7.0 Hz, 6H). |
| 137 | benzyl | isopropyl | H | N | ¹H NMR (500 MHz, DMSO-d₆) δ 8.50 (dd, J = 8.0, 1.5 Hz, 1H), 8.25 (dd, J = 8.0, 1.5 Hz, 1H), 7.56-7.54 (m, 2H), 7.36-7.28 (m, 2H), 7.31-7.23 (m, 1H), 4.90 (s, 2H), 4.51 (p, J = 7.0 Hz, 1H), 1.25 (d, J = 7.0 Hz, 6H). |
| 138 | pyridin-2-yl | isopropyl | H | N | ¹H NMR (500 MHz, DMSO-d₆) δ 8.47 (dd, J = 5.0, 1.0 Hz, 1H), 8.42 (dd, J = 8.0, 1.5 Hz, 1H), 8.25 (dd, J = 8.0, 1.5 Hz, 1H), 7.65-7.61 (m, 1H), 7.58 (dd, J = 8.0, 1.0 Hz, 1H), 7.26-7.24 (m, 1H), 4.52 (p, J = 7.0 Hz, 1H), 1.25 (d, J = 7.0 Hz, 6H). |
| 139 | furan-2-ylmethyl | isopropyl | H | N | ¹H NMR (500 MHz, DMSO-d₆) δ 8.50 (dd, J = 8.0, 1.0 Hz, 1H), 8.19 (dd, J = 8.0, 1.0 Hz, 1H), 7.54 (dd, J = 7.5, 1.5 Hz, 1H), 6.38 (t, J = 7.5 Hz, 1H), 6.30 (dd, J = 7.5, 1.5 Hz, 1H), 4.50 (p, J = 7.0 Hz, 1H), 4.17 (s, 2H), 1.25 (d, J = 7.0 Hz, 6H). |
| 140 | 1-methyl-1H-pyrazol-3-yl | isopropyl | H | N | ¹H NMR (500 MHz, DMSO-d₆) δ 8.56 (dd, J = 8.0, 1.5 Hz, 1H), 8.16 (dd, J = 8.0, 1.5 Hz, 1H), 7.39 (d, J = 7.5 Hz, 1H), 6.00 (d, J = 7.5 Hz, 1H), 4.51-4.43 (m, 1H), 3.85 (s, 3H), 1.25 (d, J = 7.0 Hz, 6H). |

TABLE 1-continued

Structures and ¹H NMR data of compounds

I

| No. | R₁ | R₂ | X | Y | ¹HNMR |
|---|---|---|---|---|---|
| 141 | (3-tetrahydrofuranyl with methyl) | isopropyl | H | N | ¹H NMR (500 MHz, DMSO-d6) δ 8.49 (dd, J = 8.0, 1.5 Hz, 1H), 8.12 (dd, J = 8.0, 1.0 Hz, 1H), 4.60 (p, J = 7.0 Hz, 1H), 4.16 (dd, J = 8.0, 7.0 Hz, 1H), 3.93 (p, J = 7.0 Hz, 1H), 3.90-3.79 (m, 2H), 3.79-3.71 (m, 1H), 2.45-2.38 (m, 1H), 1.97-1.90 (m, 1H), 1.28 (dd, J = 25.0, 7.0 Hz, 6H). |
| 142 | H | isopropyl | H | C—F | ¹H NMR (500 MHz, DMSO-d₆) δ 7.70-7.66 (m, 1H), 7.58-7.56 (m, 1H), 4.81 (p, J = 7.0 Hz, 1H), 1.46 (d, J = 7.0 Hz, 6H). |
| 143 | H | isopropyl | H | C—Br | ¹H NMR (500 MHz, DMSO-d₆) δ 7.80 (dd, J = 8.0, 3.0 Hz, 1H), 7.63 (dd, J = 9.0, 3.0 Hz, 1H), 4.74 (p, J = 7.0 Hz, 1H), 1.44 (d, J = 7.0 Hz, 6H). |
| 144 | H | isopropyl | H | C—Cl | ¹H NMR (500 MHz, DMSO-d₆) δ 7.80-7.78 (m, 1H), 7.62-7.60 (m, 1H), 4.74-4.69 (m, 1H), 1.41 (d, J = 7.0 Hz, 6H) |
| 145 | H | isopropyl | H | C—I | ¹H NMR (500 MHz, DMSO-d₆) δ 7.79-7.77 (m, 1H), 7.62-7.60 (m, 1H), 4.74-4.69 (m, 1H), 1.41 (d, J = 7.0 Hz, 6H) |
| 146 | H | isopropyl | F | CH | ¹H NMR (500 MHz, DMSO-d₆) δ 7.93 (dd, J = 11.0, 8.5 Hz, 1H), 7.18 (dd, J = 11.0, 8.5 Hz, 1H), 4.83 (p, J = 7.0 Hz, 1H), 1.46 (d, J = 7.0 Hz, 6H). |
| 147 | H | isopropyl | Cl | CH | ¹H NMR (500 MHz, DMSO-d₆) δ 7.87 (d, J = 9.5 Hz, 1H), 7.34 (d, J = 6.0 Hz, 1H), 4.82 (p, J = 7.0 Hz, 1H), 1.46 (d, J = 7.0 Hz, 6H). |
| 148 | H | isopropyl | Br | CH | ¹H NMR (500 MHz, DMSO-d₆) δ 8.67 (s, 1H), 8.29 (d, J = 9.0 Hz, 1H), 6.95 (d, J = 5.5 Hz, 1H), 3.96 (p, J = 7.0 Hz, 1H), 1.25 (d, J = 7.0 Hz, 6H). |
| 149 | H | isopropyl | F | N | ¹H NMR (500 MHz, DMSO-d₆) δ 8.67 (s, 1H), 8.35 (dd, J = 8.0, 5.0 Hz, 1H), 4.04-3.95 (m, 1H), 1.25 (d, J = 7.0 Hz, 6H). |

TABLE 1-continued

Structures and ¹H NMR data of compounds

| No. | R₁ | R₂ | X | Y | ¹HNMR |
|---|---|---|---|---|---|
| 150 | acetyl (C(=O)CH(CH₃)₂ type – isopropyl ketone-like, shown as C(=O)-C(CH₃)... actually methyl ketone with branch) | isopropyl | H | C—F | ¹H NMR (500 MHz, DMSO-d₆) δ 7.67-7.63 (m, 1H), 7.56-7.54 (m, 1H), 4.81 (p, J = 7.0 Hz, 1H), 1.91 (s, 3H), 1.46 (d, J = 7.0 Hz, 6H). |
| 151 | —CH(CH₃)OC(=O)OCH₂CH₃ | isopropyl | H | C—F | ¹H NMR (500 MHz, DMSO-d₆) δ 8.03-8.01 (m, 1H), 7.79-7.73 (m, 1H), 6.48 (q, J = 7.0 Hz, 1H), 4.88 (p, J = 7.0 Hz, 1H), 4.09 (q, J = 7.0 Hz, 2H), 1.59 (d, J = 7.0 Hz, 3H), 1.49 (d, J = 7.0 Hz, 6H), 1.44 (t, J = 7.0 Hz, 3H). |
| 152 | acetyl | isopropyl | H | C—Cl | ¹H NMR (500 MHz, DMSO-d₆) δ 7.86 (dd, J = 8.0, 3.0 Hz, 1H), 7.72 (dd, J = 9.0, 3.0 Hz, 1H), 4.81 (p, J = 7.0 Hz, 1H), 1.91 (s, 3H), 1.47 (d, J = 7.0 Hz, 6H). |
| 153 | —CH(CH₃)OC(=O)OCH₂CH₃ | isopropyl | H | C—Cl | ¹H NMR (500 MHz, DMSO-d₆) δ 8.14-8.10 (m, 1H), 7.84-7.79 (m, 1H), 6.01 (q, J = 6.5 Hz, 1H), 4.89 (p, J = 7.0 Hz, 1H), 3.99 (q, J = 7.0 Hz, 2H), 1.88 (d, J = 6.5 Hz, 3H), 1.48 (d, J = 7.0 Hz, 6H), 1.10 (t, J = 7.0 Hz, 3H). |
| 154 | acetyl | isopropyl | H | C—Br | ¹H NMR (500 MHz, DMSO-d₆) δ 7.79-7.77 (m, 1H), 7.62-7.60 (m, 1H), 4.74-4.69 (m, 1H), 1.89 (s, 3H), 1.41 (d, J = 7.0 Hz, 6H) |
| 155 | —CH(CH₃)OC(=O)OCH₂CH₃ | isopropyl | H | C—Br | ¹H NMR (500 MHz, DMSO-d₆) δ 8.23 (dd, J = 8.0, 3.0 Hz, 1H), 7.82 (dd, J = 8.0, 3.0 Hz, 1H), 5.99 (q, J = 6.5 Hz, 1H), 4.89 (p, J = 7.0 Hz, 1H), 3.98 (q, J = 7.0 Hz, 2H), 1.93 (d, J = 6.5 Hz, 3H), 1.49 (d, J = 7.0 Hz, 6H), 1.10 (q, J = 6.5 Hz, 3H). |
| 156 | H | H | H | CH | ¹H NMR (500 MHz, DMSO-d₆) δ 7.67 (dd, J = 8.5, 3.0 Hz, 1H), 7.57-7.53 (m, 1H), 7.16-7.14 (m, 1H). |
| 157 | H | ethyl | H | CH | ¹H NMR (500 MHz, DMSO-d₆) δ 7.67 (dd, J = 9.0, 3.0 Hz, 1H), 7.59-7.40 (m, 1H), 7.15-7.12 (m, 1H), 3.85 (q, J = 7.0 Hz, 2H), 1.21 (t, J = 7.0 Hz, 3H). |
| 158 | H | n-propyl | H | CH | ¹H NMR (500 MHz, DMSO-d₆) δ 7.72 (dd, J = 9.0, 3.0 Hz, 1H), 7.58-7.55 (m, 1H), 7.21 (dd, J = 9.0, 4.5 Hz, 1H), 3.80 (t, J = 7.5 Hz, 2H), 1.71-1.64 (m, 2H), 0.91 (t, J = 7.0 Hz, 3H). |
| 159 | H | n-butyl | H | CH | ¹H NMR (500 MHz, DMSO-d₆) δ 7.67 (dd, J = 9.0, 3.0 Hz, 1H), 7.51-7.47 (m, 1H), 7.15-7.12 (m, 1H), 3.81 (t, J = 7.5 Hz, 2H), 1.66-1.60 (m, 2H), 1.32-1.23 (m, 2H), 0.90 (t, J = 7.5 Hz, 3H). |

TABLE 1-continued

Structures and ¹H NMR data of compounds

I

| No. | R₁ | R₂ | X | Y | ¹HNMR |
|---|---|---|---|---|---|
| 160 | H | isobutyl | H | CH | ¹H NMR (500 MHz, DMSO-d₆) δ 7.65 (dd, J = 9.0, 3.0 Hz, 1H), 7.48-7.44 (m, 1H), 7.10 (dd, J = 9.0, 4.5 Hz, 1H), 3.63 (d, J = 7.0 Hz, 2H), 2.10-2.02 (m, 1H), 0.89 (d, J = 7.0 Hz, 6H). |
| 161 | H | sec-butyl | H | CH | ¹H NMR (500 MHz, DMSO-d₆) δ 7.75 (dd, J = 9.0, 3.0 Hz, 1H), 7.61-7.58 (m, 1H), 7.26-7.23 (m, 1H), 4.62-4.61 (m, 1H), 1.49 (d, J = 7.0 Hz, 3H), 1.10 (q, J = 7.0 Hz, 2H), 0.88 (t, J = 7.0 Hz, 3H). |
| 162 | H | tert-butyl | H | CH | ¹H NMR (500 MHz, DMSO-d₆) δ 7.72 (dd, J = 9.0, 3.0 Hz, 1H), 7.58-7.54 (m, 1H), 7.21-7.19 (m, 1H), 1.29 (s, 9H). |
| 163 | H | hexan-2-yl | H | CH | ¹H NMR (500 MHz, DMSO-d₆) δ 7.71 (dd, J = 9.0, 3.0 Hz, 1H), 7.56-7.52 (m, 1H), 7.20 (dd, J = 9.0, 4.5 Hz, 1H), 4.70-4.68 (m, 1H), 2.05-1.96 (m, 1H), 1.71-1.59 (m, 1H), 1.45 (d, J = 7.0 Hz, 3H), 1.31-1.23 (m, 2H), 0.86 (t, J = 7.0 Hz, 3H). |
| 164 | H | 3-methylbutan-2-yl | H | CH | ¹H NMR (500 MHz, DMSO-d₆) δ 7.74 (dd, J = 9.0, 3.0 Hz, 1H), 7.59-7.56 (m, 1H), 7.24 (dd, J = 9.0, 4.5 Hz, 1H), 3.06-3.02 (m, 1H), 1.77-1.71 (m, 1H), 1.48 (d, J = 7.0 Hz, 3H), 1.01 (d, J = 7.0 Hz, 3H), 0.97 (d, J = 7.0 Hz, 3H). |
| 165 | H | pentan-3-yl | H | CH | ¹H NMR (500 MHz, DMSO-d₆) δ 7.73 (dd, J = 9.0, 3.0 Hz, 1H), 7.59-7.57 (m, 1H), 7.25-7.23 (m, 1H), 4.40-4.38 (m, 1H), 1.47-1.44 (m, 2H), 0.88-0.86 (m, 6H). |
| 166 | H | allyl | H | CH | ¹H NMR (500 MHz, DMSO-d₆) δ 7.72 (dd, J = 9.0, 3.0 Hz, 1H), 7.58-7.54 (m, 1H), 7.21-7.19 (m, 1H), 5.90-5.82 (m, 1H), 5.31-5.22 (m, 1H), 5.18-5.07 (m, 1H), 3.90-3.84 (m, 2H). |
| 167 | H | cyclobutyl | H | CH | ¹H NMR (500 MHz, DMSO-d₆) δ 7.72 (dd, J = 9.0, 3.0 Hz, 1H), 7.58-3.55 (m, 1H), 7.38-7.13 (m, 1H), 4.96-4.84 (m, 1H), 2.78-2.69 (m, 1H), 2.31-2.26 (m, 1H), 2.0-2.02 (m, 1H), 2.00-1.65 (m, 2H), 1.59-1.52 (m, 1H). |
| 168 | H | cyclopentyl | H | CH | ¹H NMR (500 MHz, DMSO-d₆) δ 7.72 (dd, J = 9.0, 3.0 Hz, 1H), 7.58-7.55 (m, 1H), 7.23 (dd, J = 9.0, 4.5 Hz, 1H), 4.90-4.83 (m, 1H), 2.09-2.02 (m, 2H), 1.94-1.87 (m, 2H), 1.62-1.52 (m, 2H), 1.48-1.41 (m, 2H). |

TABLE 1-continued

Structures and ¹H NMR data of compounds

I

| No. | R₁ | R₂ | X | Y | ¹HNMR |
|-----|----|----|---|---|-------|
| 169 | H | cyclohexylmethyl | H | CH | ¹H NMR (500 MHz, DMSO-d₆) δ 7.72 (dd, J = 9.0, 3.0 Hz, 1H), 7.59-7.56 (m, 1H), 7.21 (dd, J = 9.0, 4.5 Hz, 1H), 4.49-4.44 (m, 1H), 2.20-2.12 (m, 2H), 1.67-1.61 (m, 3H), 1.41-0.99 (m, 5H). |
| 170 | H | CHF₂-CH₂- (2,2-difluoroethyl branch) | H | CH | ¹H NMR (500 MHz, DMSO-d₆) δ 7.73 (dd, J = 9.0, 3.0 Hz, 1H), 7.58-7.55 (m, 1H), 7.20 (dd, J = 9.0, 4.5 Hz, 1H), 6.26 (tt, J = 55.0, 4.0 Hz, 1H), 4.26-4.24 (m, 2H). |
| 171 | H | CH₂CF₃ branch | H | CH | ¹H NMR (500 MHz, DMSO-d₆) δ 7.78-7.64 (m, 1H), 7.56-7.53 (m, 2H), 3.79-3.73 (m, 2H). |
| 172 | H | CH₂CH₂OCH₃ | H | CH | ¹H NMR (500 MHz, DMSO-d₆) δ 7.75 (dd, J = 9.0, 3.0 Hz, 1H), 7.56-7.52 (m, 1H), 7.25 (dd, J = 9.0, 4.5 Hz, 1H), 4.01 (t, J = 6.0 Hz, 2H), 3.57 (t, J = 6.0 Hz, 2H), 3.26 (s, 3H). |
| 173 | H | CH(CH₃)CH₂OCH₃ | H | CH | ¹H NMR (500 MHz, DMSO-d₆) δ 7.74 (dd, J = 9.0, 3.0 Hz, 1H), 7.60-7.57 (m, 1H), 7.23 (dd, J = 9.0, 4.5 Hz, 1H), 4.86-4.84 (m, 1H), 3.85-3.83 (m, 1H), 3.60-3.50 (m, 1H), 3.24 (s, 3H), 1.42 (d, J = 7.0 Hz, 3H). |
| 174 | H | 4-fluorophenyl | H | CH | ¹H NMR (500 MHz, DMSO-d₆) δ 7.72 (dd, J = 9.0, 3.0 Hz, 1H), 7.61-7.57 (m, 1H), 7.45-7.41 (m, 2H), 7.40-7.35 (m, 2H), 7.25 (dd, J = 9.0, 4.5 Hz, 1H). |
| 175 | H | pyridin-3-yl | H | CH | ¹H NMR (500 MHz, DMSO-d₆) δ 8.71-8.68 (m, 2H), 8.05-8.03 (m, 1H), 7.74-7.72 (m, 1H), 7.69-7.58 (m, 1H), 7.47-7.38 (m, 1H), 7.07-7.01 (m, 1H). |
| 176 | ethyl | isopropyl | H | CH | ¹H NMR (500 MHz, DMSO-d₆) δ 7.80 (dd, J = 9.0, 3.0 Hz, 1H), 7.72-7.69 (m, 2H), 4.90 (p, J = 7.0 Hz, 1H), 3.91 (q, J = 7.0 Hz, 2H), 1.48 (d, J = 7.0 Hz, 6H), 1.07 (t, J = 7.0 Hz, 3H). |
| 177 | isopropyl | isopropyl | H | CH | ¹H NMR (500 MHz, DMSO-d₆) δ 7.80 (dd, J = 9.0, 3.0 Hz, 1H), 7.68-7.62 (m, 2H), 4.88 (p, J = 7.0 Hz, 1H), 4.38 (p, J = 7.0 Hz, 1H), 1.47 (d, J = 7.0 Hz, 6H), 1.18 (d, J = 7.0 Hz, 6H). |
| 178 | allyl | isopropyl | H | CH | ¹H NMR (500 MHz, DMSO-d₆) δ 7.81 (dd, J = 9.0, 3.0 Hz, 1H), 7.75-7.65 (m, 2H), 5.86-5.78 (m, 1H), 5.31-5.17 (m, 2H), 4.94-4.88 (m, 1H), 4.50 (d, J = 6.0 Hz, 2H), 1.49 (d, J = 7.0 Hz, 6H). |

TABLE 1-continued

Structures and ¹H NMR data of compounds

| No. | R₁ | R₂ | X | Y | ¹HNMR |
|---|---|---|---|---|---|
| 179 | (ethyl ketone) | (isopropyl) | H | CH | ¹H NMR (500 MHz, DMSO-d₆) δ 7.73 (dd, J = 9.0, 3.0 Hz, 1H), 7.59-7.56 (m, 1H), 7.22 (dd, J = 9.0, 4.5 Hz, 1H), 4.86 (p, J = 7.0 Hz, 1H), 2.21 (q, J = 7.5 Hz, 2H), 1.48 (d, J = 7.0 Hz, 6H), 0.99 (t, J = 7.5 Hz, 3H). |
| 180 | (isopropyl ketone) | (isopropyl) | H | CH | ¹H NMR (500 MHz, DMSO-d₆) δ 7.72 (dd, J = 9.0, 3.0 Hz, 1H), 7.58-7.54 (m, 1H), 7.21-7.19 (m, 1H), 4.84 (p, J = 7.0 Hz, 1H), 3.45 (p, J = 7.0 Hz, 1H), 1.46 (d, J = 7.0 Hz, 6H), 1.15 (d, J = 7.0 Hz, 6H). |
| 181 | (n-butyl ketone) | (isopropyl) | H | CH | ¹H NMR (500 MHz, DMSO-d₆) δ 7.72 (dd, J = 9.0, 3.0 Hz, 1H), 7.58-7.54 (m, 1H), 7.21-7.19 (m, 1H), 4.84 (p, J = 7.0 Hz, 1H), 2.37 (t, J = 8.0 Hz, 2H), 1.64-1.58 (m, 2H), 1.46 (d, J = 7.0 Hz, 6H), 1.41-1.34 (m, 2H), 0.93 (t, J = 8.0 Hz, 3H). |
| 182 | (tert-butyl ketone) | (isopropyl) | H | CH | ¹H NMR (500 MHz, DMSO-d₆) δ 7.80 (dd, J = 9.0, 3.0 Hz, 1H), 7.76-7.69 (m, 2H), 4.90 (p, J = 7.0 Hz, 1H), 1.48 (d, J = 7.0 Hz, 6H), 1.17 (s, 9H) |
| 183 | (vinyl ketone) | (isopropyl) | H | CH | ¹H NMR (500 MHz, DMSO-d₆) δ 7.80 (dd, J = 9.0, 3.0 Hz, 1H), 7.77-7.67 (m, 2H), 6.34-6.23 (m, 1H), 6.18-6.05 (m, 1H), 5.96-5.86 (m, 1H), 4.90 (p, J = 7.0 Hz, 1H), 1.49 (d, J = 7.0 Hz, 6H). |
| 184 | (cyclopropyl ketone) | (isopropyl) | H | CH | ¹H NMR (500 MHz, DMSO-d₆) δ 7.72 (dd, J = 9.0, 3.0 Hz, 1H), 7.58-7.54 (m, 1H), 7.21-7.19 (m, 1H), 4.84 (p, J = 7.0 Hz, 1H), 2.02-2.97 (m, 1H), 1.46 (d, J = 7.0 Hz, 6H), 1.17-1.05 (m, 2H), 1.08-0.96 (m, 2H). |
| 185 | (methoxymethyl ketone) | (isopropyl) | H | CH | ¹H NMR (500 MHz, DMSO-d₆) δ 7.80 (dd, J = 9.0, 3.0 Hz, 1H), 7.77-7.67 (m, 2H), 4.90 (p, J = 7.0 Hz, 1H), 4.35 (s, 2H), 4.09 (s, 3H), 1.48 (d, J = 7.0 Hz, 6H). |

TABLE 1-continued

Structures and ¹H NMR data of compounds

| No. | R₁ | R₂ | X | Y | ¹HNMR |
|---|---|---|---|---|---|
| 186 | (ethyl ester of 2-methyl group) | isopropyl | H | CH | ¹H NMR (500 MHz, DMSO-d₆) δ 7.81-7.78 (m, 1H), 7.70-7.68 (m, 2H), 4.89 (p, J = 7.0 Hz, 1H), 3.81 (t, J = 7.5 Hz, 2H), 1.58-1.51 (m, 2H), 1.47 (d, J = 7.0 Hz, 6H), 0.82 (t, J = 7.0 Hz, 3H). |
| 187 | (tert-butyl ester of 2-methyl group) | isopropyl | H | CH | ¹H NMR (500 MHz, DMSO-d₆) δ 7.72-7.67 (m, 2H), 7.61-7.57 (m, 1H), 4.80 (p, J = 7.0 Hz, 1H), 1.47 (d, J = 7.0 Hz, 6H), 1.37 (s, 9H). |
| 188 | (3-chloropropyl ester of 2-methyl group) | isopropyl | H | CH | ¹H NMR (500 MHz, DMSO-d₆) δ 7.86-7.80 (m, 1H), 7.76-7.70 (m, 2H), 4.94 (p, J = 7.0 Hz, 1H), 4.22 (t, J = 6.5 Hz, 2H), 3.25-3.21 (m, 2H), 2.08 (t, J = 6.5 Hz, 2H), 1.51 (d, J = 7.0 Hz, 6H). |
| 189 | (octylthio ester of 2-methyl group) | isopropyl | H | CH | ¹H NMR (500 MHz, DMSO-d₆) δ 7.80 (dd, J = 9.0, 3.0 Hz, 1H), 7.77-7.67 (m, 2H), 4.97 (p, J = 7.0 Hz, 1H), 2.95 (t, J = 7.0 Hz, 2H), 1.46 (d, J = 7.0 Hz, 6H), 1.31-1.15 (m, 12H), 0.85 (t, J = 7.0 Hz, 3H). |
| 190 | (N,N-dimethyl amide of 2-methyl group) | isopropyl | H | CH | ¹H NMR (500 MHz, DMSO-d₆) δ 7.86 (dd, J = 9.0, 3.0 Hz, 1H), 7.71-7.67 (m, 1H), 7.57 (dd, J = 9.0, 4.5 Hz, 1H), 4.89 (p, J = 7.0 Hz, 1H), 3.31 (s, 3H), 3.01 (s, 3H), 1.43 (d, J = 7.0 Hz, 6H). |
| 191 | (methyl ester of 3-methylbutanoate) | isopropyl | H | CH | ¹H NMR (500 MHz, DMSO-d₆) δ 7.78 (dd, J = 9.0, 3.0 Hz, 1H), 7.73-7.67 (m, 2H), 4.97-4.79 (m, 3H), 3.61 (s, 3H), 1.45 (d, J = 7.0 Hz, 6H). |

TABLE 1-continued

Structures and ¹H NMR data of compounds

I

| No. | R₁ | R₂ | X | Y | ¹HNMR |
|-----|----|----|---|---|-------|
| 192 | methyl 2-methylpropanoate group (wavy bond at α-carbon bearing methyl) | isopropyl (wavy bond to CH of isopropyl) | H | CH | ¹H NMR (500 MHz, DMSO-d₆) δ 7.80 (dd, J = 9.0, 3.0 Hz, 1H), 7.69-7.65 (m, 1H), 7.59 (dd, J = 9.0, 4.5 Hz, 1H), 5.13 (q, J = 7.0 Hz, 1H), 4.87 (p, J = 7.0 Hz, 1H), 3.65 (s, 3H), 1.50-1.41 (m, 9H). |
| 193 | 1-((isopropoxycarbonyl)oxy)ethyl group | isopropyl | H | CH | ¹H NMR (500 MHz, DMSO-d₆) δ 7.82 (dd, J = 9.0, 3.0Hz, 1H), 7.75-7.69 (m, 2H), 6.47 (q, J = 6.0 Hz, 1H), 4.87 (p, J = 7.0 Hz, 1H), 4.73 (p, J = 6.5 Hz, 1H), 1.55 (d, J = 6.5 Hz, 3H), 1.47 (d, J = 7.0 Hz, 3H), 1.42 (d, J = 7.0 Hz, 3H), 1.17 (d, J = 7.0 Hz, 6H). |
| 194 | 1-((cyclohexyloxycarbonyl)oxy)ethyl group | isopropyl | H | CH | ¹H NMR (500 MHz, DMSO-d₆) δ 7.83-7.81 (m, 1H), 7.75-7.69 (m, 2H), 6.47 (q, J = 6.0 Hz, 1H), 4.88 (p, J = 7.0 Hz, 1H), 4.51-4.47 (m, 1H), 1.80-1.71 (m, 2H), 1.64-1.58 (m, 2H), 1.57 (d, J = 7.0 Hz, 3H), 1.47-1.42 (m, 7H), 1.39-1.22 (m, 4H), 1.19-1.15 (m, 1H). |
| 195 | ethylsulfonyl group | isopropyl | H | CH | ¹H NMR (500 MHz, DMSO-d₆) δ 7.78-7.72 (m, 1H), 7.62-7.58 (m, 1H), 7.27-7.24 (m, 1H), 4.86 (p, J = 7.0 Hz, 1H), 2.51 (q, J = 7.0 Hz, 2H), 1.48 (d, J = 7.0 Hz, 6H), 1.09 (t, J = 7.0 Hz, 3H). |
| 196 | propylsulfonyl group | isopropyl | H | CH | ¹H NMR (500 MHz, DMSO-d₆) δ 7.87 (dd, J = 8.5, 3.0 Hz, 1H), 7.80-7.69 (m, 2H), 4.93 (p, J = 7.0 Hz, 1H), 4.08-3.93 (m, 2H), 1.98-1.90 (m, 2H), 1.49 (d, J = 7.0 Hz, 6H), 1.08 (t, J = 7.0 Hz, 3H). |
| 197 | 1-(4-methoxyphenyl)ethyl group | isopropyl | H | CH | ¹H NMR (500 MHz, DMSO-d₆) δ 7.71 (dd, J = 9.0, 3.0 Hz, 1H), 7.68-7.65 (m, 2H), 7.06-6.99 (m, 2H), 6.87-6.79 (m, 2H), 5.01 (s, 2H), 4.74 (p, J = 7.0 Hz, 1H), 3.69 (s, 3H), 1.36 (d, J = 7.0 Hz, 6H). |
| 198 | H | H | H | C—Br | ¹H NMR (500 MHz, DMSO-d₆) δ 7.80 (dd, J = 8.0, 3.0 Hz, 1H), 7.63 (dd, J = 9.0, 3.0 Hz, 1H). |

TABLE 1-continued

Structures and $^1$H NMR data of compounds

I

![Structure I: bicyclic ring system with R1, R2, X, Y, F substituents; SO2 group and carbonyl]

| No. | R$_1$ | R$_2$ | X | Y | $^1$HNMR |
|---|---|---|---|---|---|
| 199 | (1-oxo-cyclopropyl-methyl, with methyl branch) | isopropyl | H | C—Br | $^1$H NMR (500 MHz, DMSO-d$_6$) δ 7.71-7.69 (m, 1H), 7.59-7.44 (m, 1H), 4.68 (p, J = 7.0 Hz, 1H), 3.45-3.43 (m, 1H), 1.42 (d, J = 7.0 Hz, 6H), 1.22-1.20 (m, 2H), 1.07-1.05 (m, 2H). |
| 200 | tert-butyl ester (OC(O) with t-Bu) | isopropyl | H | C—Br | $^1$H NMR (500 MHz, DMSO-d$_6$) δ 8.14 (dd, J = 8.0, 3.0 Hz, 1H), 7.79 (dd, J = 8.0, 3.0 Hz, 1H), 4.71 (p, J = 7.0 Hz, 1H), 1.50 (d, J = 7.0 Hz, 6H), 1.43 (s, 9H). |
| 201 | (4-methoxyphenyl)methyl with methyl branch | isopropyl | H | C—Br | $^1$H NMR (500 MHz, DMSO-d$_6$) δ 8.24 (dd, J = 8.0, 3.0 Hz, 1H), 7.73 (dd, J = 8.5, 3.0 Hz, 1H), 6.90-6.84 (m, 2H), 6.82-6.74 (m, 2H), 4.59 (p, J = 7.0 Hz, 1H), 3.68 (s, 3H), 1.29 (d, J = 7.0 Hz, 6H). |
| 202 | H | 1-fluoromethyl-ethyl with methyl | H | C—F | $^1$H NMR (500 MHz, DMSO-d$_6$) δ 7.70-7.66 (m, 1H), 7.58-7.56 (m, 1H), 5.08-4.92 (m, 1H), 4.44-4.24 (m, 2H), 1.30 (d, J = 7.0 Hz, 3H). |
| 203 | H | 1-(difluoromethyl)ethyl | H | C—F | $^1$H NMR (500 MHz, DMSO-d$_6$) δ 7.70-7.66 (m, 1H), 7.58-7.56 (m, 1H), 5.68 (td, J = 57.0, 7.0 Hz, 1H), 5.15-5.01 (m, 1H), 1.30 (d, J = 7.0 Hz, 3H). |
| 204 | H | 1-hydroxymethyl-ethyl | H | C—F | $^1$H NMR (500 MHz, DMSO-d$_6$) δ 7.59-7.43 (m, 2H), 4.55-4.54 (m, 1H), 3.72-3.69 (m, 2H), 1.40 (d, J = 7.0 Hz, 3H). |
| 205 | H | 1-(hydroxymethyl)-2-chloroethyl with methyl | H | C—F | $^1$H NMR (500 MHz, DMSO-d$_6$) δ 7.70-7.66 (m, 1H), 7.58-7.56 (m, 1H), 4.62 (p, J = 7.0 Hz, 1H), 4.54 (t, J = 5.5 Hz, 1H), 4.30-4.26 (m, 1H), 3.78-3.72 (m, 1H), 3.57-3.52 (m, 1H), 3.50-3.46 (m, 1H). |
| 206 | H | 1-formyl-ethyl with methyl | H | C—F | $^1$H NMR (500 MHz, DMSO-d$_6$) δ 9.72 (s, 1H), 7.70-7.66 (m, 1H), 7.58-7.56 (m, 1H), 4.67 (p, J = 7.0 Hz, 1H), 1.37 (d, J = 7.0 Hz, 3H). |

TABLE 1-continued

Structures and ¹H NMR data of compounds

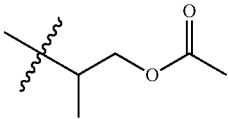 [SMILES: *C(C)COC(C)=O]

| No. | R₁ | R₂ | X | Y | ¹HNMR |
|---|---|---|---|---|---|
| 207 | H | 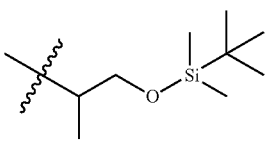 [SMILES: *C(C)CO[Si](C)(C)C(C)(C)C] | H | C—F | ¹H NMR (500 MHz, DMSO-d₆) δ 7.31-7.20 (m, 2H), 4.69-4.67 (m, 1H), 4.36 (d, J = 7.0 Hz, 2H), 1.96 (s, 3H), 1.40 (d, J = 7.0 Hz, 3H). |
| 208 | H | 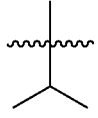 [SMILES: *C(C)C] | H | C—F | ¹H NMR (500 MHz, DMSO-d₆) δ 7.29-7.18 (m, 2H), 4.07-3.97 (m, 2H), 3.78-3.76 (m, 1H), 1.40 (d, J = 7.0 Hz, 3H), 0.86 (s, 9H), 0.84 (s, 6H). |
| 209 | CH₃ |  | H | C—F | ¹H NMR (500 MHz, DMSO-d₆) δ 7.95-7.91 (m, 1H), 7.73-7.70 (m, 1H), 4.90 (p, J = 7.0 Hz, 1H), 3.21 (s, 3H), 1.48 (d, J = 7.0 Hz, 6H). |
| 210 | 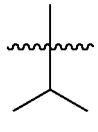 [SMILES: *C(C)C] | 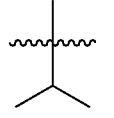 | H | C—F | ¹H NMR (500 MHz, DMSO-d₆) δ 7.95-7.91 (m, 1H), 7.73-7.70 (m, 1H), 4.90 (p, J = 7.0 Hz, 1H), 3.74 (q, J = 7.0 Hz, 2H), 1.49 (d, J = 7.0 Hz, 6H), 1.12 (t, J = 7.0 Hz, 3H). |
| 211 | 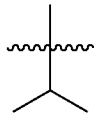 [SMILES: *C(C)C] | 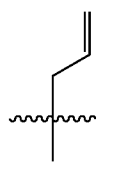 | H | C—F | ¹H NMR (500 MHz, DMSO-d₆) δ 7.98-7.95 (m, 1H), 7.75-7.71 (m, 1H), 4.90 (p, J = 7.0 Hz, 1H), 4.22 (p, J = 7.0 Hz, 1H), 1.50 (d, J = 7.0 Hz, 6H), 1.29-1.24 (m, 6H). |
| 212 | 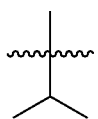 [SMILES: *C(C)C] | 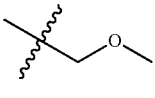 | H | C—F | ¹H NMR (500 MHz, DMSO-d₆) δ 7.96-7.91 (m, 1H), 7.72-7.69 (m, 1H), 5.86-5.71 (m, 1H), 5.30-5.16 (m, 2H), 4.92-4.83 (m, 1H), 4.29 (d, J = 7.0 Hz, 2H), 1.47 (d, J = 7.0 Hz, 6H). |
| 213 | 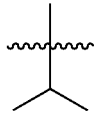 [SMILES: *C(C)C] | 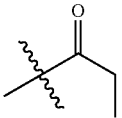 [SMILES: *C(=O)CC] | H | C—F | ¹H NMR (500 MHz, DMSO-d₆) δ 7.99-7.95 (m, 1H), 7.77-7.70 (m, 1H), 5.08 (s, 2H), 4.90 (p, J = 7.0 Hz, 1H), 3.20 (s, 3H), 1.47 (d, J = 7.0 Hz, 6H). |
| 214 | 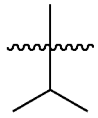 [SMILES: *C(C)C] | 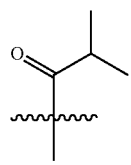 | H | C—F | ¹H NMR (500 MHz, DMSO-d₆) δ 7.70-7.66 (m, 1H), 7.58-7.56 (m, 1H), 4.81 (p, J = 7.0 Hz, 1H), 2.28 (q, J = 8.0 Hz, 2H), 1.46 (d, J = 7.0 Hz, 6H), 1.13 (t, J = 8.0 Hz, 3H). |
| 215 | 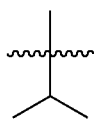 [SMILES: *C(C)C] | 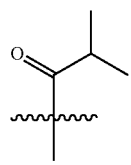 | H | C—F | ¹H NMR (500 MHz, DMSO-d₆) δ 7.77-7.68 (m, 1H), 7.64-7.57 (m, 1H), 4.85 (p, J = 7.0 Hz, 1H), 2.44 (p, J = 7.0 Hz, 1H), 1.49 (d, J = 7.0 Hz, 6H), 1.08 (d, J = 7.0 Hz, 6H). |

TABLE 1-continued

Structures and ¹H NMR data of compounds

I

| No. | R₁ | R₂ | X | Y | ¹HNMR |
|---|---|---|---|---|---|
| 216 | (1-methyl-allyl ketone group) | (isobutyl) | H | C—F | ¹H NMR (500 MHz, DMSO-d₆) δ 7.72-7.62 (m, 1H), 7.61-7.54 (m, 1H), 6.31-6.23 (m, 1H), 6.11-6.09 (m, 1H), 5.91-5.90 (m, 1H), 4.83 (p, J = 7.0 Hz, 1H), 1.48 (d, J = 7.0 Hz, 6H). |
| 217 | (cyclopropyl ketone with methyl) | (isobutyl) | H | C—F | ¹H NMR (500 MHz, DMSO-d₆) δ 7.73-7.65 (m, 1H), 7.59-7.57 (m, 1H), 4.83 (p, J = 7.0 Hz, 1H), 1.54-1.50 (m, 1H), 1.49 (d, J = 7.0 Hz, 6H), 0.84-0.77 (m, 4H). |
| 218 | (propyl ester with methyl) | (isobutyl) | H | C—F | ¹H NMR (500 MHz, DMSO-d₆) δ 8.05-8.02 (m, 1H), 7.82-7.80 (m, 1H), 5.02 (p, J = 7.0 Hz, 1H), 4.29 (t, J = 6.5 Hz, 2H), 1.66-1.64 (m, 2H), 1.50 (d, J = 7.0 Hz, 6H), 0.90 (t, J = 7.0 Hz, 3H). |
| 219 | (isopropyl ester with methyl) | (isobutyl) | H | C—F | ¹H NMR (500 MHz, DMSO-d₆) δ 8.05-8.02 (m, 1H), 7.83-7.80 (m, 1H), 5.07-5.05 (m, 1H), 4.93 (p, J = 7.0 Hz, 1H), 1.50 (d, J = 7.0 Hz, 6H), 1.30 (d, J = 7.0 Hz, 6H). |
| 220 | (butyl ester with methyl) | (isobutyl) | H | C—F | ¹H NMR (500 MHz, DMSO-d₆) δ 8.05-8.02 (m, 1H), 7.81-7.79 (m, 1H), 5.01 (p, J = 7.0 Hz, 1H), 4.33 (t, J = 6.5 Hz, 2H), 1.69-1.57 (m, 2H), 1.50 (d, J = 7.0 Hz, 6H), 1.36-1.34 (m, 2H), 0.91 (t, J = 7.0 Hz, 3H). |
| 221 | (3-chloropropyl ester with methyl) | (isobutyl) | H | C—F | ¹H NMR (500 MHz, DMSO-d₆) δ 8.06-8.02 (m, 1H), 7.84-7.78 (m, 1H), 5.02 (p, J = 7.0 Hz, 1H), 4.45 (t, J = 6.0 Hz, 2H), 3.71 (d, J = 6.5 Hz, 2H), 2.13-2.09 (m, 2H), 1.50 (d, J = 7.0 Hz, 6H). |
| 222 | (octyl thioester with methyl) | (isobutyl) | H | C—F | ¹H NMR (500 MHz, DMSO-d₆) δ 8.10-8.07 (m, 1H), 7.87-7.86 (m, 1H), 5.00 (p, J = 7.0 Hz, 1H), 3.02 (t, J = 6.5 Hz, 2H), 1.59-1.54 (m, 2H), 1.49 (d, J = 7.0 Hz, 6H), 1.35-1.28 (m, 10H), 0.87 (t, J = 6.5, Hz, 3H). |

TABLE 1-continued

Structures and ¹H NMR data of compounds

I

| No. | R₁ | R₂ | X | Y | ¹HNMR |
|---|---|---|---|---|---|
| 223 | N,N-dimethylamide with isopropyl linker | isopropyl | H | C—F | ¹H NMR (500 MHz, DMSO-d₆) δ 7.70-7.66 (m, 1H), 7.58-7.56 (m, 1H), 4.81 (p, J = 7.0 Hz, 1H), 3.22 (s, 6H), 1.46 (d, J = 7.0 Hz, 6H). |
| 224 | methyl ester -CH₂-C(O)OCH₃ | isopropyl | H | C—F | ¹H NMR (500 MHz, DMSO-d₆) δ 7.93-7.91 (m, 1H), 7.72-7.70 (m, 1H), 4.87 (p, J = 7.0 Hz, 1H), 4.67 (s, 2H), 3.62 (s, 3H), 1.44 (d, J = 7.0 Hz, 6H). |
| 225 | methyl 2-methylpropanoate | isopropyl | H | C—F | ¹H NMR (500 MHz, DMSO-d₆) δ 7.98-7.96 (m, 1H), 7.77-7.71 (m, 1H), 4.97 (q, J = 7.0 Hz, 1H), 4.88 (p, J = 7.0 Hz, 1H), 3.69 (s, 3H), 1.49-1.47 (m, 9H). |
| 226 | isopropyl sec-butyl carbonate | isopropyl | H | C—F | ¹H NMR (500 MHz, DMSO-d₆) δ 8.02-7.98 (m, 1H), 7.79-7.72 (m, 1H), 6.50 (q, J = 7.0 Hz, 1H), 4.89 (p, J = 7.0 Hz, 1H), 4.70 (p, J = 7.0 Hz, 1H), 1.61 (d, J = 7.0 Hz, 3H), 1.50 (d, J = 7.0 Hz,, 6H), 1.18 (d, J = 7.0 Hz, 3H), 1.12 (d, J = 7.0 Hz, 3H). |
| 227 | cyclohexyl sec-butyl carbonate | isopropyl | H | C—F | ¹H NMR (500 MHz, DMSO-d₆) δ 8.03-7.98 (m, 1H), 7.75 (dd, J = 8.0, 3.0 Hz, 1H), 6.41 (q, J = 7.0 Hz, 1H), 4.93-4.86 (m, 1H), 4.47-4.42 (m, 1H), 1.81-1.66 (m, 2H), 1.61 (d, 6H), 1.50 (d, J = 7.0 Hz, 6H), 1.45 (d, J = 7.0 Hz, 3H), 1.36-1.25 (m, 2H). |
| 228 | ethylsulfonyl ethyl | isopropyl | H | C—F | ¹H NMR (500 MHz, DMSO-d₆) δ 7.75-7.72 (m, 1H), 7.61-7.58 (m, 1H), 4.83 (p, J = 7.0 Hz, 1H), 2.49-2.47 (m, 2H), 1.45 (d, J = 7.0 Hz, 6H), 1.07 (t, J = 7.0 Hz, 3H). |

TABLE 1-continued

Structures and ¹H NMR data of compounds

I

| No. | R₁ | R₂ | X | Y | ¹HNMR |
|-----|----|----|---|---|-------|
| 229 | (ethylsulfonyl-methyl group) | isopropyl | H | C—F | ¹H NMR (500 MHz, DMSO-d₆) δ 7.98-7.95 (m, 1H), 7.73-7.71 (m, 1H), 4.90 (p, J = 7.0 Hz, 1H), 2.49-2.47 (m, 2H), 1.59-1.57 (m, 2H), 1.45 (d, J = 7.0 Hz, 6H), 0.94 (t, J = 7.0 Hz, 3H). |
| 230 | (4-fluorophenyl-ethyl group) | isopropyl | H | C—F | ¹H NMR (500 MHz, DMSO-d₆) δ 8.21 (dd, J = 9.0, 2.0 Hz, 1H), 7.14-7.10 (m, 3H), 7.07-6.98 (m, 2H), 4.81 (p, J = 7.0 Hz, 1H), 1.46 (d, J = 7.0 Hz, 6H). |

The method for preparing the compound of the invention will be explained in detail in the following program and embodiment. The material is commercial available or prepared through known method reported in the literature or shown in the route. Those skilled in the art should understand that the compound of the invention can also be synthesized by other synthetic route. Although the detailed material and reaction condition in the synthetic route have been explicated in the following text, it is still easy to be replaced by other similar material and condition. Isomer of the compound, for example, that produced with the variation of the preparation method of the present invention is included in the scope of the present invention. In addition, the following preparation method can be further modified according to the disclosures of the present invention by using common chemical method known to those skilled in the art, for example, protection of suitable group in the process of the reaction, etc.

The following method of application can be used to improve further understanding of the preparation method of the present invention. The specific material, class and condition have been determined to be further explication of the present invention, not to be any limit of the reasonable scope thereof.

Examples of representative compounds are as follows, the synthesis methods of other compounds are similar, and will not be described in detail here.

1. Synthesis of Compounds 2

Compound TEA (24 g, 236 mmol), Compound b (5.25 g, 88.7 mmol) and anhydrous 1,2-dichloroethane (200 mL) were added to a 500 mL single-neck flask and cooled to 0° C. in an ice water bath. Chlorosulfonic acid (6.9 g, 59 mmol) was slowly added dropwise at 0-10° C. and stirred at 10° C. for 10 min, and Compound a (5 g, 28 mmol) was added to the reaction flask. The reaction solution was heated to 35° C. and stirred for 30 min. Phosphorus oxychloride (6.8 g, 8.87 mmol) was added dropwise at 35° C., and the reaction solution was heated to 55° C. and stirred overnight. After substantial completion of reaction of the starting materials according to LC-MS detection, the reaction solution was cooled to room temperature. The reaction solution was washed with saturated sodium bicarbonate solution (100 mL×2), and the organic phase was dried, concentrated, and purified by column chromatography to obtain Compound 2-1 (8 g, with a yield of 93%), as a yellow oil.

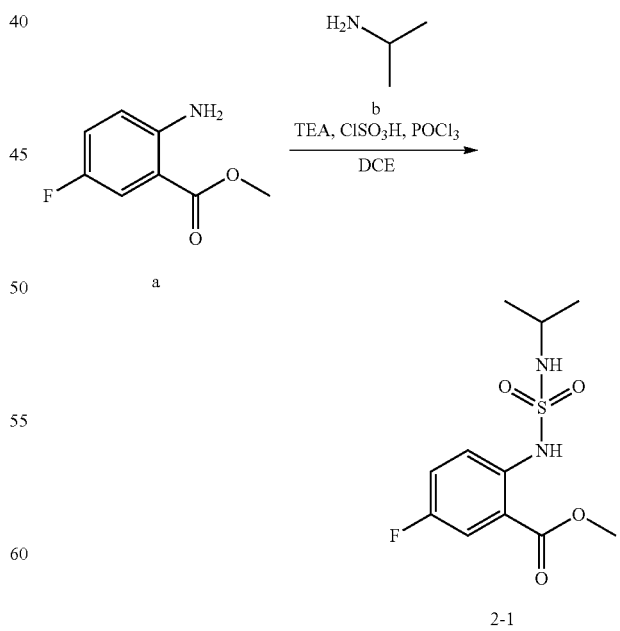

Compound 2-1 (8 g, 27.6 mmol) was dissolved in anhydrous methanol (100 mL), sodium methoxide solution (30% methanol solution, 9.9 g, 55 mmol) was added dropwise at room temperature, and the reaction solution was heated to 65° C. to react overnight. After completion of reaction of the starting materials according to LC-MS detection, the reaction solution was concentrated to remove the methanol, and the crude product was dissolved in water (50 mL), adjusted to pH 5-6 with dilute hydrochloric acid (1M) and stirred for 30 min. A solid precipitated and the reaction mixture was filtered. The filter cake was washed with water (20 mL), dried and concentrated to obtain Compound 2 (5 g, with a yield of 70%), as a light yellow solid.

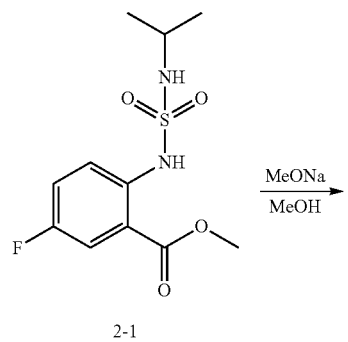

2. Synthesis of Compounds 5

Compound TEA (5.08 g, 50.25 mmol), Compound 5-1 (1.01 g, 17.74 mmol) and anhydrous 1,2-dichloroethane (20 mL) were added to a 100 mL single-neck flask and cooled to 0° C. in an ice water bath. Chlorosulfonic acid (1.38 g, 11.82 mmol) was slowly added dropwise at 0-10° C. and stirred at 10° C. for 10 min, and Compound a (1 g, 5.91 mmol) was added to the reaction flask. The reaction solution was heated to 35° C. and stirred for 30 min. Phosphorus oxychloride (1.36 g, 8.87 mmol) was added dropwise at 35° C., and the reaction solution was heated to 55° C. and stirred overnight. After substantial completion of reaction of the starting materials according to LC-MS detection, the reaction solution was cooled to room temperature. The reaction solution was washed with saturated sodium bicarbonate solution (100 mL×2), and the organic phase was dried and concentrated to obtain Compound 5-2 (1.40 g, 4.86 mmol, with a yield of 82.14%), as a yellow oil.

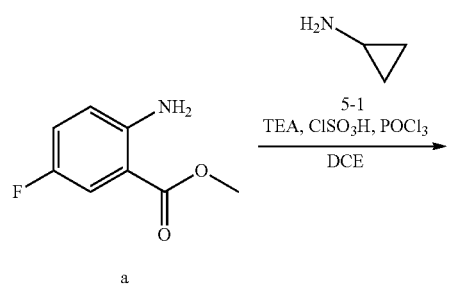

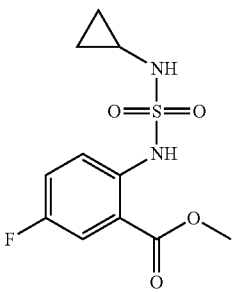

Compound 5-2 (1.40 g, 4.86 mmol) was dissolved in anhydrous methanol (20 mL), sodium methoxide solution (30% methanol solution, 1.75 g, 9.71 mmol) was added dropwise at room temperature, and the reaction solution was heated to 65° C. to react overnight. After completion of reaction of the starting materials according to LC-MS detection, the reaction solution was concentrated to remove the methanol, and the crude product was dissolved in water (50 mL), adjusted to pH 5-6 with dilute hydrochloric acid (1M) and stirred for 30 min. A solid precipitated and the reaction mixture was filtered. The filter cake was washed with water (20 mL), dried and concentrated to obtain Compound 5 (1.0 g, with a yield of 80.36%), as a yellow solid.

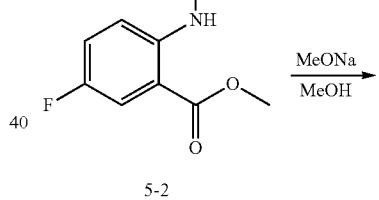

3. Synthesis of Compounds 10

Compound TEA (5.08 g, 50.25 mmol), Compound 10-1 (0.84 g, 17.74 mmol) and anhydrous 1,2-dichloroethane (20 mL) were added to a 100 mL single-neck flask and cooled to 0° C. in an ice water bath. Chlorosulfonic acid (1.38 g, 11.82 mmol) was slowly added dropwise at 0-10° C. and stirred at 10° C. for 10 min, and Compound a (1 g, 5.91 mmol) was added to the reaction flask. The reaction solution was heated to 35° C. and stirred for 30 min. Phosphorus oxychloride (1.36 g, 8.87 mmol) was added dropwise at 35° C., and the reaction solution was heated to 55° C. and stirred overnight. After substantial completion of reaction of the starting materials according to LC-MS detection, the reaction solution was cooled to room temperature. The reaction solution was washed with saturated sodium bicarbonate solution (100 mL×2), and the organic phase was dried and concentrated to obtain Compound 10-2 (1.6 g, 5.75 mmol, with a yield of 97.27%), as a light yellow solid.

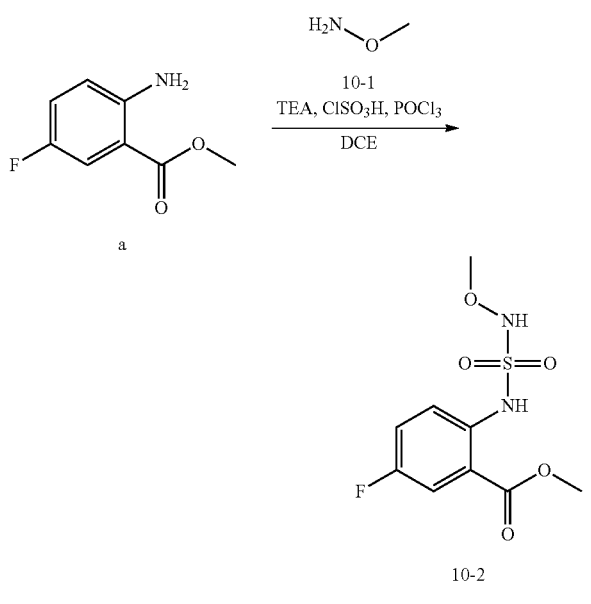

Compound 10-2 (1.6 g, 5.75 mmol) was dissolved in anhydrous methanol (20 mL), sodium methoxide solution (30% methanol solution, 2.07 g, 11.50 mmol) was added dropwise at room temperature, and the reaction solution was heated to 65° C. to react overnight. After completion of reaction of the starting materials according to LC-MS detection, the reaction solution was concentrated to remove the methanol, and the crude product was dissolved in water (50 mL), adjusted to pH 5-6 with dilute hydrochloric acid (1M) and stirred for 30 min. A solid precipitated and the reaction mixture was filtered. The filter cake was washed with water (20 mL), dried and concentrated to obtain Compound 10 (1.3 g, with a yield of 91.82%), as a light yellow solid.

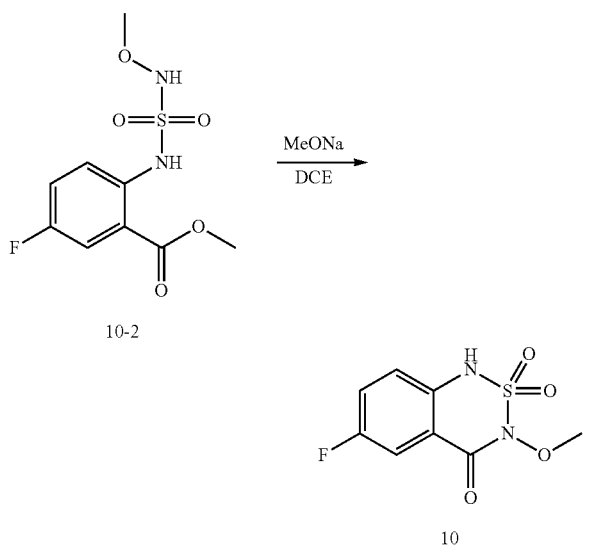

4. Synthesis of Compounds 28

Compound TEA (5.08 g, 50.25 mmol), Compound 28-1 (1.65 g, 17.74 mmol) and anhydrous 1,2-dichloroethane (20 mL) were added to a 100 mL single-neck flask and cooled to 0° C. in an ice water bath. Chlorosulfonic acid (1.38 g, 11.82 mmol) was slowly added dropwise at 0-10° C. and stirred at 10° C. for 10 min, and Compound a (1 g, 5.91 mmol) was added to the reaction flask. The reaction solution was heated to 35° C. and stirred for 30 min. Phosphorus oxychloride (1.36 g, 8.87 mmol) was added dropwise at 35° C., and the reaction solution was heated to 55° C. and stirred overnight. After substantial completion of reaction of the starting materials according to LC-MS detection, the reaction solution was cooled to room temperature. The reaction solution was washed with saturated sodium bicarbonate solution (100 mL×2), and the organic phase was dried and concentrated to obtain Compound 28-2 (1.40 g, 4.32 mmol, with a yield of 73.02%), as a yellow solid.

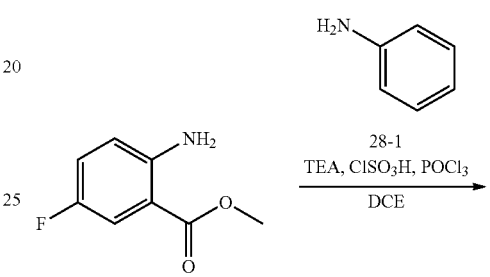

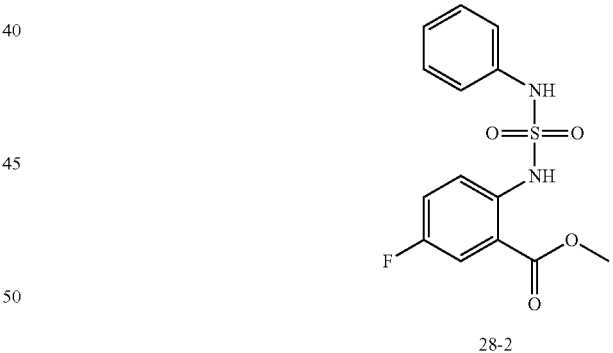

Compound 28-2 (1.40 g, 4.32 mmol) was dissolved in anhydrous methanol (20 mL), sodium methoxide solution (30% methanol solution, 1.55 g, 8.63 mmol) was added dropwise at room temperature, and the reaction solution was heated to 65° C. to react overnight. After completion of reaction of the starting materials according to LC-MS detection, the reaction solution was concentrated to remove the methanol, and the crude product was dissolved in water (50 mL), adjusted to pH 5-6 with dilute hydrochloric acid (1M) and stirred for 30 min. A solid precipitated and the reaction mixture was filtered. The filter cake was washed with water (20 mL), dried and concentrated to obtain Compound 28 (1.1 g, with a yield of 81.00%), as a yellow solid.

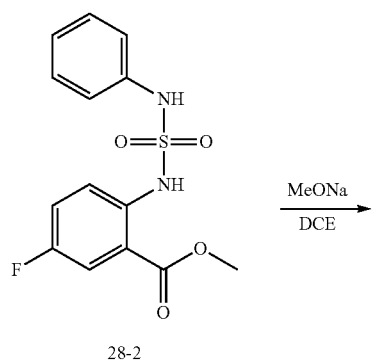

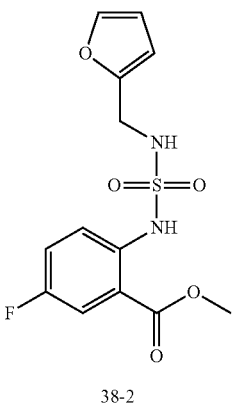

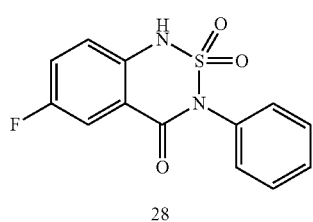

5. Synthesis of Compounds 38

Compound TEA (5.08 g, 50.25 mmol), Compound 38-1 (1.72 g, 17.74 mmol) and anhydrous 1,2-dichloroethane (20 mL) were added to a 100 mL single-neck flask and cooled to 0° C. in an ice water bath. Chlorosulfonic acid (1.38 g, 11.82 mmol) was slowly added dropwise at 0-10° C. and stirred at 10° C. for 10 min, and Compound a (1 g, 5.91 mmol) was added to the reaction flask. The reaction solution was heated to 35° C. and stirred for 30 min. Phosphorus oxychloride (1.36 g, 8.87 mmol) was added dropwise at 35° C., and the reaction solution was heated to 55° C. and stirred overnight. After substantial completion of reaction of the starting materials according to LC-MS detection, the reaction solution was cooled to room temperature. The reaction solution was washed with saturated sodium bicarbonate solution (100 mL×2), and the organic phase was dried and concentrated to obtain Compound 38-2 (1.5 g, 4.57 mmol, with a yield of 77.28%), as a yellow oil.

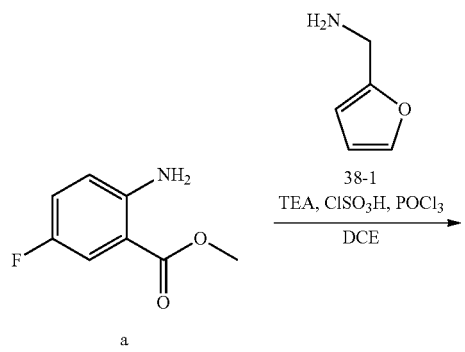

Compound 38-2 (1.5 g, 4.57 mmol) was dissolved in anhydrous methanol (20 mL), sodium methoxide solution (30% methanol solution, 1.65 g, 9.14 mmol) was added dropwise at room temperature, and the reaction solution was heated to 65° C. to react overnight. After completion of reaction of the starting materials according to LC-MS detection, the reaction solution was concentrated to remove the methanol, and the crude product was dissolved in water (50 mL), adjusted to pH 5-6 with dilute hydrochloric acid (1M) and stirred for 30 min. A solid precipitated and the reaction mixture was filtered. The filter cake was washed with water (20 mL), dried and concentrated to obtain Compound 38 (1.0 g, with a yield of 73.88%), as a light yellow solid.

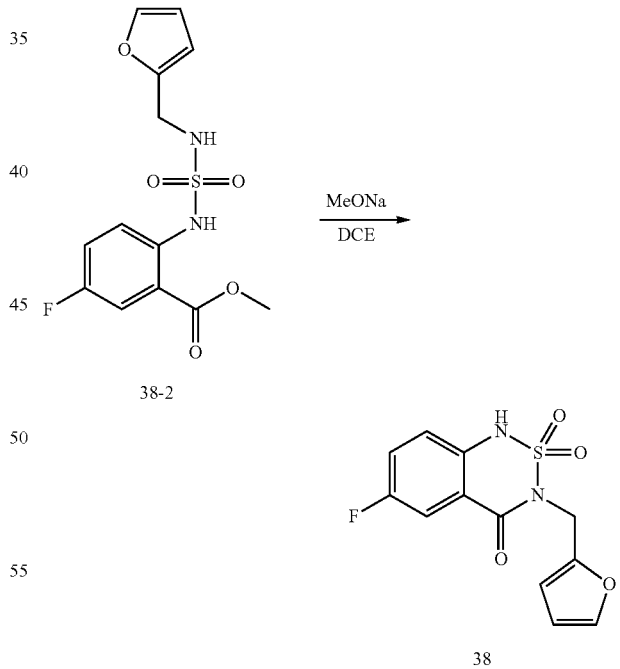

6. Synthesis of Compounds 49

Compound 2 (0.5 g, 1.94 mmol), potassium carbonate (535 mg, 3.87 mmol), methyl iodide (550 mg, 3.87 mmol), and acetonitrile (20 ml) were added to a 50 mL single-necked flask, heated to 80° C., and stirred for 6h. After substantial completion of reaction of the starting materials according to LC-MS detection, the reaction solution was concentrated, and purified by column chromatography to obtain Compound 49 (200 mg, with a yield of 38%), as a yellow oil.

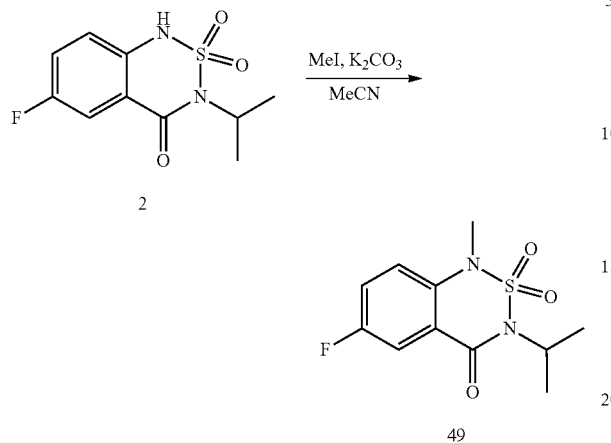

7. Synthesis of Compounds 62

Compound 1 (0.5 g, 1.94 mmol), triethylamine (391 mg, 3.87 mmol), and 1,2-dichloroethane (20 ml) were added to a 50 mL single-neck flask, cooled to 0-10° C., and Compound

(228 mg, 2.9 mmol) was slowly added dropwise. The reaction solution was heated to room temperature and stirred for 1 hours. After substantial completion of reaction of the starting materials according to LC-MS detection, the reaction solution was concentrated and purified by column chromatography to obtain Compound 62 (300 mg, with a yield of 510%), as a white solid.

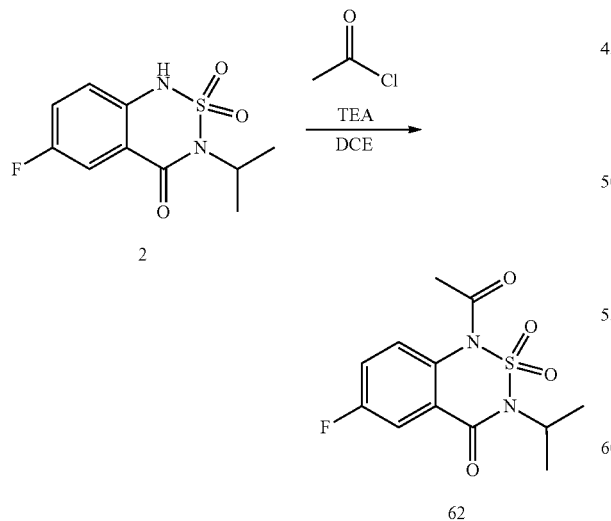

8. Synthesis of Compounds 64

Compound 2 (0.5 g, 1.94 mmol), potassium carbonate (535 mg, 3.87 mmol), Compound 64-1 (443 mg, 2.90 mmol), and acetonitrile (20 ml) were added to a 50 mL single-necked flask, heated to 80° C., and stirred for 6h. After substantial completion of reaction of the starting materials according to LC-MS detection, the reaction solution was concentrated, and purified by column chromatography to obtain Compound 64 (300 mg, with a yield of 41%), as a white solid.

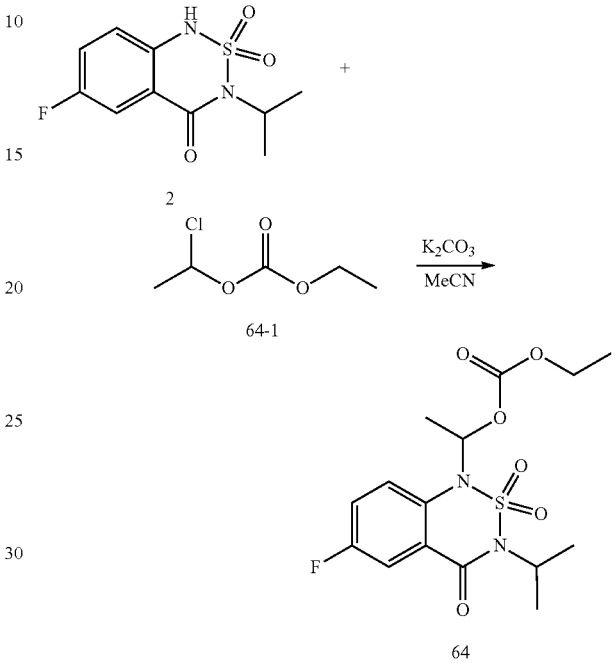

9. Synthesis of Compounds 75

Compound TEA (5.06 g, 49.96 mmol), Compound b (1.04 g, 17.63 mmol) and anhydrous 1,2-dichloroethane (20 mL) were added to a 100 mL single-neck flask and cooled to 0° C. in an ice water bath. Chlorosulfonic acid (1.37 g, 11.75 mmol) was slowly added dropwise at 0-10° C. and stirred at 10° C. for 10 min, and Compound c (1 g, 5.88 mmol) was added to the reaction flask. The reaction solution was heated to 35° C. and stirred for 30 min. Phosphorus oxychloride (1.35 g, 8.82 mmol) was added dropwise at 35° C., and the reaction solution was heated to 55° C. and stirred overnight. After substantial completion of reaction of the starting materials according to LC-MS detection, the reaction solution was cooled to room temperature. The reaction solution was washed with saturated sodium bicarbonate solution (100 mL×2), and the organic phase was dried, concentrated, and purified by column chromatography to obtain Compound 75-1 (1.5 g, 5.15 mmol, with a yield of 87%), as a yellow oil.

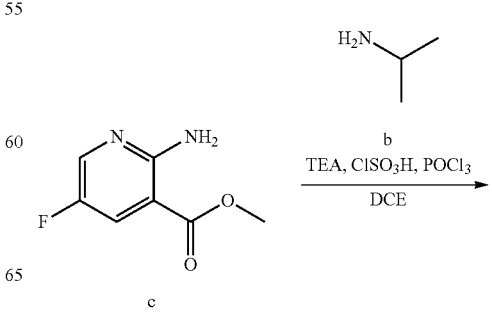

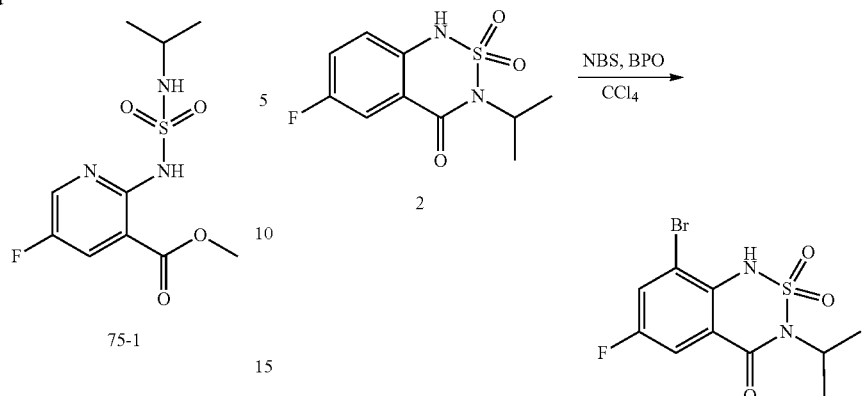

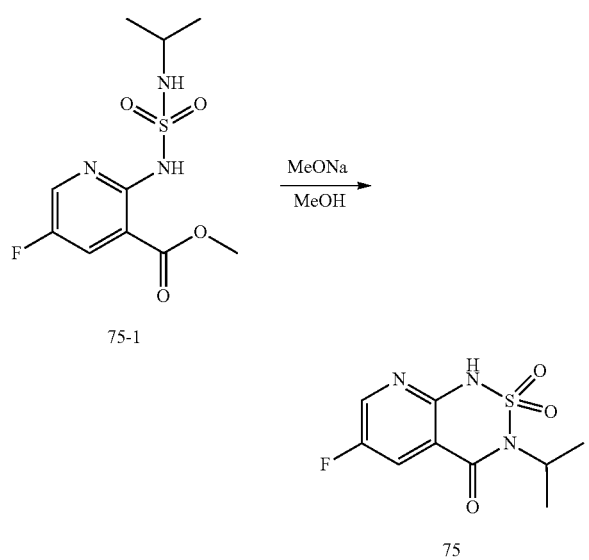

Compound 75-1 (1.5 g, 5.15 mmol) was dissolved in anhydrous methanol (20 mL), sodium methoxide solution (30% methanol solution, 1.85 g, 10.30 mmol) was added dropwise at room temperature, and the reaction solution was heated to 65° C. to react overnight. After completion of reaction of the starting materials according to LC-MS detection, the reaction solution was concentrated to remove the methanol, and the crude product was dissolved in water (50 mL), adjusted to pH 5-6 with dilute hydrochloric acid (1M) and stirred for 30 min. A solid precipitated and the reaction mixture was filtered. The filter cake was washed with water (20 mL), dried and concentrated to obtain Compound 75 (1 g, with a yield of 74.9%), as a light yellow solid.

10. Synthesis of Compounds 143

Compound 2 (0.5 g, 1.94 mmol), NBS (344 mg, 1.94 mmol), a catalytic amount of BPO (10 mg), and carbon tetrachloride (20 mL) were added to a 50 mL single-necked flask, and stirred at 80° C. for 12h. After substantial completion of reaction of the starting materials according to LC-MS detection, the reaction solution was cooled to room temperature, the organic phase was washed with an aqueous solution of sodium bicarbonate (50 mL×2) and then concentrated, dried, and purified by column chromatography to obtain Compound 143 (300 mg, with a yield of 46%), as a light yellow solid.

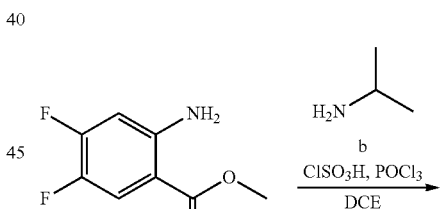

11. Synthesis of Compounds 146

Compound TEA (4.60 g, 45.42 mmol), Compound b (0.95 g, 16.03 mmol) and anhydrous 1,2-dichloroethane (20 mL) were added to a 100 mL single-neck flask and cooled to 0° C. in an ice water bath. Chlorosulfonic acid (1.25 g, 10.69 mmol) was slowly added dropwise at 0-10° C. and stirred at 10° C. for 10 min, and Compound d (1 g, 5.34 mmol) was added to the reaction flask. The reaction solution was heated to 35° C. and stirred for 30 min. Phosphorus oxychloride (1.23 g, 8.02 mmol) was added dropwise at 35° C., and the reaction solution was heated to 55° C. and stirred overnight. After substantial completion of reaction of the starting materials according to LC-MS detection, the reaction solution was cooled to room temperature. The reaction solution was washed with saturated sodium bicarbonate solution (100 mL×2), and the organic phase was dried, concentrated, and purified by column chromatography to obtain Compound 146-1 (1.52 g, 4.93 mmol, with a yield of 92.27%), as a yellow oil.

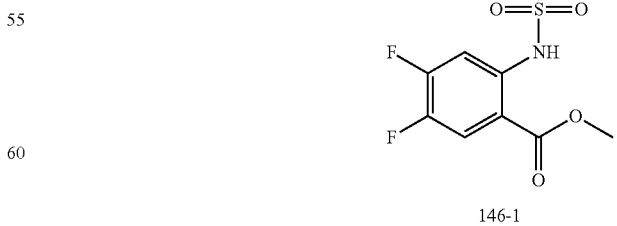

Compound 146-1 (1.52 g, 4.93 mmol) was dissolved in anhydrous methanol (20 mL), sodium methoxide solution (30% methanol solution, 1.78 g, 9.86 mmol) was added dropwise at room temperature, and the reaction solution was heated to 65° C. to react overnight. After completion of reaction of the starting materials according to LC-MS detection, the reaction solution was concentrated to remove the methanol, and the crude product was dissolved in water (50 mL), adjusted to pH 5-6 with dilute hydrochloric acid (1M) and stirred for 30 min. A solid precipitated and the reaction mixture was filtered. The filter cake was washed with water (20 mL), dried and concentrated to obtain Compound 146 (1.30 g, with a yield of 95.5%), as a light yellow solid.

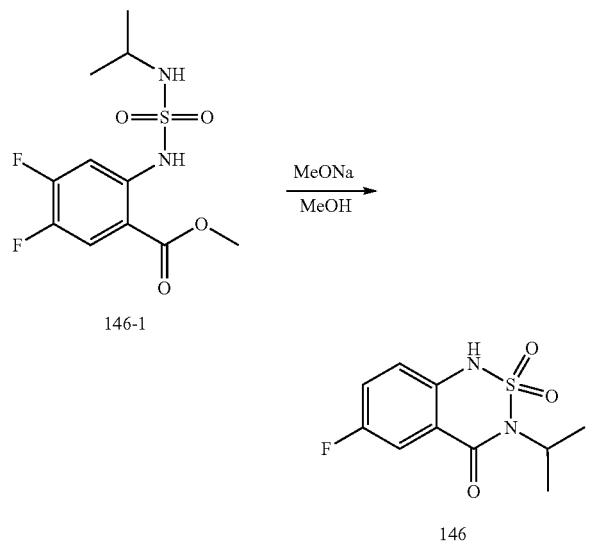

Biological Activity Evaluation:

The activity level criteria for plant damage (i.e., growth control rate) are as follows:

Level 5: growth control rate is above 85%;

Level 4: growth control rate is greater than or equal to 60% and less than 85%;

Level 3: growth control rate is greater than or equal to 40% and less than 60%;

Level 2: growth control rate is greater than or equal to 20% and less than 40%;

Level 1: growth control rate is greater than or equal to 500 and less than 200%;

Level 0: growth control rate is less than 5%.

The above growth control rates are fresh weight control rates.

(1) Experiment on weeding effect in post-emergence stage: monocotyledonous and dicotyledonous weed seeds and major crop seeds (wheat, corn, rice, soybean, cotton, oilseed rape, millet, sorghum) were placed in plastic pots filled with soil, then covered with 0.5-2 cm of soil, allowed to grow in a good greenhouse environment. After 2-3 weeks of sowing, the test plants were treated. The tested compounds of the present invention were respectively dissolved in acetone, then added with Tween 80, diluted with a certain amount of water to obtain a solution with a certain concentration, and sprayed with a spray tower onto the plants. After the application, the plants were cultured for 3 weeks in the greenhouse, and then the experimental results of the weeding were listed in Table 2.

TABLE 2

Results on weeding effect in post-emergence stage

| Compound No. | Amaranthus retroflexus | Echinochloa crus-galli | Digitaria sanguinalis | Setaria viridis | soybean | corn | rice |
|---|---|---|---|---|---|---|---|
| 2 | 5 | 4 | 3 | 4 | 1 | 1 | 0 |
| 49 | 5 | 3 | N | 3 | 0 | 0 | 0 |
| 50 | 5 | 3 | N | 3 | 0 | 0 | 0 |
| 51 | 5 | 3 | N | 3 | 0 | 0 | 0 |
| 56 | 3 | N | N | N | 0 | 0 | 0 |
| 62 | 5 | 3 | N | 3 | 0 | 0 | 0 |
| 63 | 5 | 4 | 3 | 3 | 0 | 0 | 0 |
| 64 | 5 | 4 | 3 | 3 | 0 | 0 | 0 |
| 75 | 4 | 3 | N | 3 | N | 1 | 1 |
| 142 | 5 | 5 | 5 | 5 | 1 | 1 | 1 |
| 143 | 5 | 4 | 5 | 5 | 1 | 1 | 0 |
| 144 | 5 | 5 | 5 | 5 | 1 | 1 | 0 |
| 145 | 4 | 4 | 4 | 5 | 0 | 1 | 0 |
| 146 | 5 | 5 | 4 | 5 | 1 | 1 | 0 |
| 147 | 3 | N | N | N | N | 0 | 0 |
| 150 | 5 | 5 | 5 | 5 | 1 | 1 | 1 |
| 151 | 5 | 5 | 5 | 5 | 1 | 1 | 1 |
| 152 | 5 | 5 | 5 | 5 | 1 | 0 | 0 |
| 153 | 5 | 5 | 5 | 5 | 1 | 0 | 0 |
| 154 | 5 | 5 | 5 | 5 | 1 | 0 | 0 |
| 155 | 5 | 5 | 5 | 5 | 1 | 0 | 0 |
| 157 | 3 | N | N | N | 0 | 0 | 0 |
| 161 | N | N | N | 3 | 0 | 0 | 1 |
| 163 | 3 | N | N | N | N | N | 0 |
| 176 | 5 | N | N | N | 0 | 0 | 0 |
| 179 | 5 | 5 | N | 3 | 1 | 0 | 1 |
| 181 | 5 | N | N | N | 0 | 0 | 0 |
| 182 | 3 | N | N | N | 0 | 0 | 0 |
| 183 | 3 | N | N | N | 0 | 0 | 0 |
| 184 | 5 | N | 3 | 3 | N | 1 | N |
| 185 | 3 | N | N | N | 0 | 0 | 0 |
| 186 | 4 | N | N | N | 0 | 0 | 0 |
| 189 | 4 | N | N | N | 0 | 0 | 0 |
| 190 | 3 | N | N | N | 0 | 0 | 0 |
| 193 | 4 | N | N | N | 0 | 0 | 0 |
| 194 | 4 | N | N | N | 0 | 0 | 0 |
| 195 | 3 | 3 | N | N | 0 | 0 | 0 |
| 196 | 5 | 5 | 3 | 5 | 0 | 0 | N |
| 197 | 3 | N | N | N | 0 | 0 | 0 |
| 199 | 5 | N | N | 5 | N | 0 | 1 |
| 213 | 3 | N | N | N | 0 | 0 | 1 |
| 214 | 5 | 4 | 5 | 5 | N | 0 | N |
| 215 | 5 | 5 | 5 | 5 | N | 1 | N |
| 216 | 4 | 3 | 3 | 4 | N | 0 | 0 |
| 217 | 5 | 5 | 5 | 5 | N | 1 | N |
| 218 | 5 | 4 | N | 5 | N | 0 | 1 |
| 219 | 5 | 5 | 3 | 5 | N | 1 | N |
| 220 | 4 | 5 | 3 | 5 | N | 1 | N |
| 221 | 5 | 4 | 5 | 5 | N | N | N |
| 222 | 5 | N | N | N | N | 0 | 0 |
| 223 | 5 | 3 | 5 | 5 | N | 0 | 0 |
| 226 | 5 | N | N | N | N | 1 | 0 |
| 227 | 3 | N | N | N | 1 | 0 | 1 |
| 228 | 5 | 3 | 3 | 5 | N | N | N |
| 229 | 3 | N | N | N | N | 1 | N |
| A | 1 | 1 | 1 | 2 | 0 | 0 | 0 |
| B | 1 | 0 | 0 | 0 | 0 | 0 | 0 |
| C | 0 | 0 | 0 | 0 | 0 | 0 | 0 |
| D | 2 | 1 | 1 | 2 | 1 | 0 | 0 |

TABLE 2-continued

Results on weeding effect in post-emergence stage

| Compound No. | Amaranthus retroflexus | Echinochloa crus-galli | Digitaria sanguinalis | Setaria viridis | soybean | corn | rice |
|---|---|---|---|---|---|---|---|
| E | 2 | 1 | 1 | 2 | 1 | 1 | 1 |
| F | 2 | 2 | 2 | 2 | 1 | 1 | 1 |
| G | 1 | 0 | 0 | 1 | 1 | 0 | 1 |
| fomesafen (300 g/ha) | 1 | 1 | 0 | 2 | 2 | 4 | 4 |

Note:
the application dose was active ingredient 600 g/ha, plus water 450 kg/ha. N represented no data The seeds of *Amaranthus retroflexus* were collected from Nenjiang of Heilongjiang Province. The tests indicated that the weeds were resistant to fomesafen.

Control compound A:

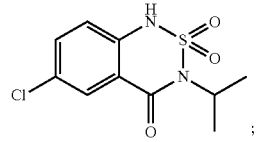 [SMILES: CC(C)N1C(=O)c2cc(Cl)ccc2NS1(=O)=O]

Control compound B:

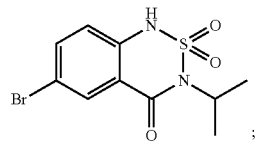 [SMILES: CC(C)N1C(=O)c2cc(Br)ccc2NS1(=O)=O]

Control compound C:

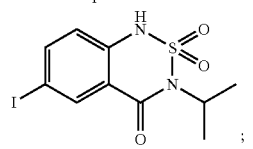

Control compound D:

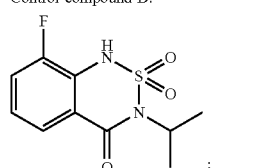

Control compound E:

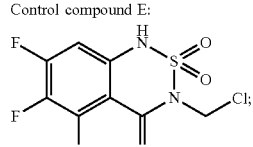

Control compound F:

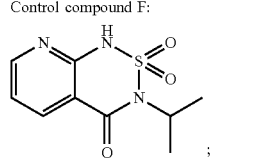

Control compound G:

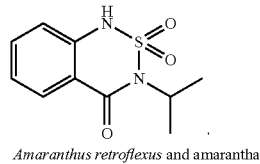

*Amaranthus retroflexus* and amaranthaceous weeds are important weeds in soybean fields, corn fields, and upland rice fields. In particular, in soybean fields, except the high-efficient PPO-based herbicides, the effects of mainstream herbicides such as bentazone, clomazone, cloransulam-methyl, imazethapyr, and imazamox are not good. In recent years, more and more fomesafen-resistant *Amaranthus retroflexus* has become widespread in Northeast China, and effective control methods are not available in the market. Compared with bentazone, the compound of the present invention has better herbicidal activity against gramineous weeds and broadleaf weeds, especially has excellent effect on the key weeds amaranthaceous weeds such as *Amaranthus retroflexus* with high selectivity, which will provide better solutions for weed control in fields of crops such as soybean, corn, rice or wheat.

Experiment on Weed Effect in Pre-Emergence Stage:

Seeds of monocotyledonous and dicotyledonous weeds and main crops (e.g. wheat, corn, rice, soybean, cotton, oilseed rape, millet and sorghum) were put into a plastic pot loaded with soil and covered with 0.5-2 cm soil. The test compounds of the present invention was dissolved with acetone, then added with tween 80, diluted by a certain amount of water to reach a certain concentration, and sprayed immediately after sowing. The obtained seeds were incubated for 4 weeks in the greenhouse after spraying and the test results were observed. It was observed that the herbicide mostly had excellent effect at the application rate of 250 g/ha, especially to weeds such as *Echinochloa crus-gali, Digitaria sanguinalis* and *Abutilon theophrasti*, etc. And many compounds had good selectivity for corn, wheat, rice, and soybean, etc.

It is indicated from the experiment of main weeds in wheat and rice fields that the compound of the present invention generally have good weed control efficacy. Above all, it is noted that the compound of the invention have extremely high activity to broad-leaved weeds and cyperaceae weeds, which are resistant to ALS inhibitor, like *Sagittaria trifolia, Scirpus juncoides, Cyperus difformis, Descurainia sophia, Capsella bursa-pastoris, Lithospermum arvense, Galium aparine* L., and *Cyperus rotundus* L., etc., and have excellent commercial value.

Transplanted Rice Safety Evaluation and Weed Control Effect Evaluation in Rice Field:

Rice field soil was loaded into a 1/1,000,000 ha pot. The seeds of *Echinochloa crus-galli, Scirpus juncoides*, and *Bidens tripartita* L. were sowed and gently covered with soil, then left to stand still in greenhouse in the state of 0.5-1 cm of water storage. The tuber of *Sagittaria trifolia* was planted in the next day or 2 days later. It was kept at 3-4 cm of water storage thereafter. The weeds were treated by dripping the WP or SC water diluents prepared according to the common preparation method of the compounds of the present invention with pipette homogeneously to achieve specified effective amount when *Echinochloa crus-galli, Scirpus juncoides*, and *Bidens tripartita* L. reached 0.5 leaf stage and *Sagittaria trifolia* reached the time point of primary leaf stage.

In addition, the rice field soil that loaded into the 1/1,000,000 ha pot was leveled to keep water storage at 3-4 cm depth. The 3 leaf stage rice (*japonica* rice) was transplanted at 3 cm of transplanting depth the next day. The compound of the present invention was treated by the same way after 5 days of transplantation.

The fertility condition of *Echinochloa crus-galli, Scirpus juncoides, Bidens tripartita* L., and *Sagittaria trifolia* 14 days after the treatment of the compound of the invention and the fertility condition of rice 21 days after the treatment of the compound of the invention respectively with the naked eye. Evaluate the weed control effect with the above activity standard level. Many compounds show excellent activity and selectivity.

Note: The seeds of *Echinochloa crus-gali, Scirpus juncoides, Sagittaria trifolia*, and *Bidens tripartita* L. were collected from Heilongjiang Province of China. The tests indicated that the weeds were resistant to the common doses of Pyrazosulfuron-ethyl.

At the same time, it is found after several tests that the compounds and compositions of the present invention have good selectivity to many gramineae grasses such as *zoysia japonica*, bermuda grass, tall fescue, bluegrass, ryegrass and seashore paspalumetc, and are able to control many important grass weeds and broad-leaved weeds. The compounds also show excellent selectivity and commercial value in the tests on sugarcane, soybean, cotton, oil sunflower, potato, orchards and vegetables in different herbicide application methods.

The invention claimed is:
1. A substituted thiadiazinone dioxide, as shown in formula I:

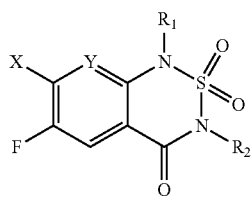

wherein,
R$_1$ and R$_2$ each independently represent hydrogen, alkyl optionally substituted by halogen, alkenyl optionally substituted by halogen, alkynyl optionally substituted by halogen, cycloalkyl optionally substituted by halogen, cycloalkylalkyl optionally substituted by halogen, formylalkyl optionally substituted by halogen, hydroxyalkyl optionally substituted by halogen, aryl, arylalkyl, heterocyclyl, heterocyclylalkyl, R$_3$—O-(alkyl)$_n$-, R$_3$—(CO)-(alkyl)$_n$-, R$_3$—(CO)—O-(alkyl)$_n$-, R$_3$—O-(alkyl)$_n$-(CO)—, R$_3$—S—(CO)-(alkyl)$_n$-, R$_3$—O—(CO)-(alkyl)-, R$_3$—O—(CO)—O-(alkyl)-, R$_3$—SO$_2$-(alkyl)$_n$-, R$_4$R$_5$N—(CO)—, R$_4$R$_5$N-(alkyl)$_n$-, R$_3$—(CO)—NR$_6$—, or R$_4$R$_5$N—(CO)—NR$_6$;

each R$_3$ independently represents alkyl, alkenyl, alkynyl, cycloalkyl or cycloalkylalkyl with or without halogen; aryl, arylalkyl, heterocyclyl or heterocyclylalkyl;

R$_4$, R$_5$ and R$_6$ each independently represent hydrogen; alkyl, alkenyl, alkynyl, cycloalkyl or cycloalkylalkyl with or without halogen; aryl, arylalkyl, heterocyclyl or heterocyclylalkyl;

n represents 0 or 1;

X represents hydrogen or halogen; Y represents C—Z or N; Z represents hydrogen or halogen; and when X represents halogen, Z represents hydrogen;

the "aryl" or "heterocyclyl" is unsubstituted or substituted by at least one of the following groups: halogen, nitro, cyano, thiocyanato, cyanoalkyl, mercapto, hydroxyl, hydroxyalkyl, carboxyl, formyl, azido, trialkylsilyl, dialkylphosphono, unsubstituted or substituted heterocyclyl, heterocyclylalkyl, aryl or arylalkyl; alkyl, alkenyl, alkynyl, cycloalkyl, cycloalkenyl, cycloalkylalkyl, cycloalkenylalkyl, cycloalkyl substituted by alkyl, OR", SR", -alkyl-OR", —O-alkyl-OR", -alkyl-SR", COR", -alkyl-COR", —O-alkyl-COR", COOR", -alkyl-COOR", —O-alkyl-COOR", COSR", SOR", SO$_2$R", —O—SO$_2$R", -alkyl-SO$_2$R", OCOR", -alkyl-OCOR" or SCOR" with or without halogen; amino, aminocarbonyl, aminocarbonylalkyl or aminosulfonyl which is unsubstituted or substituted by one or two groups selected from the group consisting of R", COR", COOR", SO$_2$R", -alkyl-SO$_2$R" or OR" with or without halogen; or any two adjacent carbon atoms in the ring are connected with —CH$_2$CH$_2$CH$_2$—, —OCH$_2$CH$_2$—, —OCH$_2$O—, —OCH$_2$CH$_2$O— or —CH=CH—CH=CH— groups to form a fused ring;

each R" independently represents alkyl, alkenyl, alkynyl, cycloalkyl, cycloalkylalkyl, cycloalkenyl, cycloalkenylalkyl, and unsubstituted or substituted heterocyclyl, heterocyclylalkyl, aryl or arylalkyl.

2. The substituted thiadiazinone dioxide according to claim 1, characterized in that:

R$_1$ and R$_2$ each independently represent hydrogen, C$_1$-C$_8$ alkyl optionally substituted by halogen, C$_2$-C$_8$ alkenyl optionally substituted by halogen, C$_2$-C$_8$ alkynyl optionally substituted by halogen, C$_3$-C$_8$ cycloalkyl optionally substituted by halogen, C$_3$-C$_8$ cycloalkyl C$_1$-C$_8$ alkyl optionally substituted by halogen, formyl C$_1$-C$_8$ alkyl optionally substituted by halogen, hydroxyl C$_1$-C$_8$ alkyl optionally substituted by halogen, aryl, aryl C$_1$-C$_8$ alkyl, heterocyclyl, heterocyclyl C$_1$-C$_8$ alkyl, R$_3$—O—(C$_1$-C$_8$ alkyl)$_n$-, R$_3$—(CO)—(C$_1$-C$_8$ alkyl)$_n$-, R$_3$—(CO)—O—(C$_1$-C$_8$ alkyl)$_n$-, R$_3$—O—(C$_1$-C$_8$ alkyl)$_n$-(CO)—, R$_3$—S—(CO)—(C$_1$-C$_8$ alkyl)$_n$-, R$_3$—O—(CO)—(C$_1$-C$_8$ alkyl)-, R$_3$—O—(CO)—O—(C$_1$-C$_8$ alkyl)-, R$_3$—SO$_2$—(C$_1$-C$_8$ alkyl)$_n$-, R$_4$R$_5$N—(CO)—, R$_4$R$_5$N—(C$_1$-C$_8$ alkyl)$_n$-, R$_3$—(CO)—NR$_6$—, or R$_4$R$_5$N—(CO)—NR$_6$;

each R$_3$ independently represents C$_1$-C$_8$ alkyl, C$_2$-C$_8$ alkenyl, C$_2$-C$_8$ alkynyl, C$_3$-C$_8$ cycloalkyl or C$_3$-C$_8$ cycloalkyl C$_1$-C$_8$ alkyl with or without halogen; aryl, aryl C$_1$-C$_8$ alkyl, heterocyclyl or heterocyclyl C$_1$-C$_8$alkyl;

R$_4$, R$_5$, R$_6$ each independently represent hydrogen; C$_1$-C$_8$alkyl, C$_2$-C$_8$ alkenyl, C$_2$-C$_8$ alkynyl, C$_3$-C$_8$ cycloalkyl or C$_3$-C$_8$ cycloalkyl C$_1$-C$_8$ alkyl with or without halogen; aryl, aryl C$_1$-C$_8$ alkyl, heterocyclyl or heterocyclyl C$_1$-C$_8$ alkyl;

n represents 0 or 1;

X represents hydrogen or halogen; Y represents C—Z or N; Z represents hydrogen or halogen; and when X represents halogen, Z represents hydrogen;

the "aryl" or "heterocyclyl" is unsubstituted or substituted by at least one of the following groups: halogen, nitro, cyano, thiocyanato, cyano C$_1$-C$_8$ alkyl, mercapto, hydroxyl, hydroxyl C$_1$-C$_8$ alkyl, carboxyl, formyl, azido, tri-C$_1$-C$_8$alkylsilyl, di-C$_1$-C$_8$ alkyl phosphono; heterocyclyl, heterocyclyl C$_1$-C$_8$ alkyl, aryl or aryl C$_1$-C$_8$ alkyl which is unsubstituted or substituted by 1-3 groups selected from the group consisting of halogen, C$_1$-C$_8$ alkyl, halo C$_1$-C$_8$ alkyl, C$_1$-C$_8$ alkoxy or amino; C$_1$-C$_8$ alkyl, C$_2$-C$_8$ alkenyl, C$_2$-C$_8$ alkynyl, C$_3$-C$_8$ cycloalkyl, C$_3$-C$_8$cycloalkenyl, C$_3$-C$_8$cycloalkyl C$_1$-C$_8$ alkyl, C$_3$-C$_8$cycloalkenyl C$_1$-C$_8$ alkyl, C$_3$-C$_8$ cycloalkyl substituted by C$_1$-C$_8$ alkyl, OR", SR", —(C$_1$-C$_8$) alkyl-OR", —O—(C$_1$-C$_8$)alkyl-OR", —(C$_1$-C$_8$)alkyl-SR", COR", —(C$_1$-C$_8$)alkyl-COR", —O—(C$_1$-C$_8$) alkyl-COR", COOR", —(C$_1$-C$_8$)alkyl-COOR", —O—(C$_1$-C$_8$)alkyl-COOR", COSR", SOR", SO$_2$R", —O—SO$_2$R", —(C$_1$-C$_8$)alkyl-SO$_2$R", OCOR", —(C$_1$-C$_8$)alkyl-OCOR" or SCOR" with or without halogen; amino, aminocarbonyl, amino carbonyl C$_1$-C$_8$ alkyl or aminosulfonyl which is unsubstituted or substituted by one or two groups selected from the group consisting of R", COR", COOR", SO$_2$R", —(C$_1$-C$_8$)alkyl-SO$_2$R" or OR" with or without halogen; or any two adjacent carbon atoms in the ring are connected with —CH$_2$CH$_2$CH$_2$—, —OCH$_2$CH$_2$—, —OCH$_2$O—, —OCH$_2$CH$_2$O— or —CH=CH—CH=CH— groups to form a fused ring;

each R" independently represents C$_1$-C$_8$ alkyl, C$_2$-C$_8$ alkenyl, C$_2$-C$_8$ alkynyl, C$_3$-C$_8$ cycloalkyl, C$_3$-C$_8$ cycloalkyl C$_1$-C$_8$ alkyl, C$_3$-C$_8$ cycloalkenyl, C$_3$-C$_8$ cycloalkenyl C$_1$-C$_8$ alkyl; and heterocyclyl, heterocyclyl C$_1$-C$_8$ alkyl, aryl or aryl C$_1$-C$_8$ alkyl which is unsubstituted or substituted by 1-3 groups selected from the group consisting of halogen, $C_1$-$C_8$ alkyl, halogenated $C_1$-$C_8$ alkyl, $C_1$-$C_8$ alkoxy or amino.

3. The substituted thiadiazinone dioxide according to claim 1, characterized in that:

$R_1$ and $R_2$ each independently represent hydrogen, $C_1$-$C_6$ alkyl optionally substituted by halogen, $C_2$-$C_6$ alkenyl optionally substituted by halogen, $C_2$-$C_6$ alkynyl optionally substituted by halogen, $C_3$-$C_6$ cycloalkyl optionally substituted by halogen, $C_3$-$C_6$ cycloalkyl $C_1$-$C_6$ alkyl optionally substituted by halogen, formyl $C_1$-$C_6$ alkyl optionally substituted by halogen, hydroxyl $C_1$-$C_6$ alkyl optionally substituted by halogen, aryl, aryl $C_1$-$C_6$ alkyl, heterocyclyl, heterocyclyl $C_1$-$C_6$ alkyl, $R_3$—O—($C_1$-$C_6$ alkyl)$_n$-, $R_3$—(CO)—($C_1$-$C_6$ alkyl)$_n$-, $R_3$—(CO)—O—($C_1$-$C_6$ alkyl)$_n$-, $R_3$—O—($C_1$-$C_6$ alkyl)$_n$-(CO)—, $R_3$—S—(CO)—($C_1$-$C_6$ alkyl)$_n$-, $R_3$—O—(CO)—($C_1$-$C_6$ alkyl)-, $R_3$—O—(CO)—O—($C_1$-$C_6$ alkyl)-, $R_3$—SO$_2$—($C_1$-$C_6$ alkyl)$_n$-, $R_4R_5N$—(CO)—, $R_4R_5N$—($C_1$-$C_6$ alkyl)$_n$-, $R_3$—(CO)—$NR_6$—, or $R_4R_5N$—(CO)—$NR_6$;

each $R_3$ independently represents $C_1$-$C_6$ alkyl, $C_2$-$C_6$ alkenyl, $C_2$-$C_6$ alkynyl, $C_5$-$C_6$ cycloalkyl or $C_5$-$C_6$ cycloalkyl $C_1$-$C_6$ alkyl with or without halogen; aryl, aryl $C_1$-$C_6$ alkyl, heterocyclyl or heterocyclyl $C_1$-$C_6$ alkyl;

$R_4$, $R_5$ and $R_6$ each independently represent hydrogen; $C_1$-$C_6$ alkyl, $C_2$-$C_6$ alkenyl, $C_2$-$C_6$ alkynyl, $C_3$-$C_6$ cycloalkyl or $C_5$-$C_6$ cycloalkyl $C_1$-$C_6$ alkyl with or without halogen; aryl, aryl $C_1$-$C_6$ alkyl, heterocyclyl or heterocyclyl $C_1$-$C_6$ alkyl;

n represents 0 or 1;

X represents hydrogen or halogen; Y represents C—Z or N; Z represents hydrogen or halogen; and when X represents halogen, Z represents hydrogen;

the "aryl" or "heterocyclyl" is unsubstituted or substituted by at least one of the following groups: halogen, nitro, cyano, thiocyanato, cyano $C_1$-$C_6$ alkyl, mercapto, hydroxyl, hydroxyl $C_1$-$C_6$ alkyl, carboxyl, formyl, azido, tri-$C_1$-$C_6$alkylsilyl, di-$C_1$-$C_6$ alkyl phosphono; heterocyclyl, heterocyclyl $C_1$-$C_6$ alkyl, aryl or aryl $C_1$-$C_6$ alkyl which is unsubstituted or substituted by 1-3 groups selected from the group consisting of halogen, $C_1$-$C_6$ alkyl, halo $C_1$-$C_6$ alkyl, $C_1$-$C_6$ alkoxy or amino; $C_1$-$C_6$ alkyl, $C_2$-$C_6$ alkenyl, $C_2$-$C_6$ alkynyl, $C_3$-$C_6$ cycloalkyl, $C_3$-$C_6$ cycloalkenyl, $C_3$-$C_6$ cycloalkyl $C_1$-$C_6$ alkyl, $C_3$-$C_6$ cycloalkenyl $C_1$-$C_6$ alkyl, $C_5$-$C_6$ cycloalkyl substituted by $C_1$-$C_6$ alkyl, OR", SR", —($C_1$-$C_6$)alkyl-OR", —O—($C_1$-$C_6$)alkyl-OR", —($C_1$-$C_6$)alkyl-SR", COR", —($C_1$-$C_6$)alkyl-COR", —O—($C_1$-$C_6$)alkyl-COR", COOR", —($C_1$-$C_6$)alkyl-COOR", —O—($C_1$-$C_6$)alkyl-COOR", COSR", SOR", SO$_2$R", —O—SO$_2$R", —($C_1$-$C_6$)alkyl-SO$_2$R", OCOR", —($C_1$-$C_6$)alkyl-OCOR" or SCOR" with or without halogen; amino, aminocarbonyl, amino carbonyl $C_1$-$C_6$ alkyl or aminosulfonyl which is unsubstituted or substituted by one or two groups selected from the group consisting of R", COR", COOR", SO$_2$R", —($C_1$-$C_6$)alkyl-SO$_2$R" or OR" with or without halogen; or any two adjacent carbon atoms in the ring are connected with —CH$_2$CH$_2$CH$_2$—, —OCH$_2$CH$_2$—, —OCH$_2$O—, —OCH$_2$CH$_2$O— or —CH=CH—CH=CH— groups to form a fused ring;

each R" independently represents $C_1$-$C_6$ alkyl, $C_2$-$C_6$ alkenyl, $C_2$-$C_6$ alkynyl, $C_3$-$C_6$ cycloalkyl, $C_3$-$C_6$ cycloalkyl $C_1$-$C_6$ alkyl, $C_3$-$C_6$ cycloalkenyl, $C_3$-$C_6$ cycloalkenyl $C_1$-$C_6$ alkyl; and heterocyclyl, heterocyclyl $C_1$-$C_6$ alkyl, aryl or aryl $C_1$-$C_6$ alkyl which is unsubstituted or substituted by 1-3 groups selected from the group consisting of halogen, $C_1$-$C_6$ alkyl, halo $C_1$-$C_6$ alkyl, $C_1$-$C_6$ alkoxy or amino.

4. The substituted thiadiazinone dioxide according to claim 1, characterized in that:

$R_1$ and $R_2$ each independently represent hydrogen, $C_1$-$C_6$ alkyl optionally substituted by halogen, $C_2$-$C_6$ alkenyl optionally substituted by halogen, $C_2$-$C_6$ alkynyl optionally substituted by halogen, $C_3$-$C_6$ cycloalkyl optionally substituted by halogen, $C_3$-$C_6$ cycloalkyl $C_1$-$C_3$ alkyl optionally substituted by halogen, formyl $C_1$-$C_3$ alkyl optionally substituted by halogen hydroxyl $C_1$-$C_3$ alkyl optionally substituted by halogen, aryl, aryl $C_1$-$C_3$ alkyl, heterocyclyl, heterocyclyl $C_1$-$C_3$ alkyl, $R_3$—O—($C_1$-$C_3$ alkyl)$_n$-, $R_3$—(CO)—($C_1$-$C_3$ alkyl)$_n$-, $R_3$—(CO)—O—($C_1$-$C_8$ alkyl)$_n$-, $R_3$—O—($C_1$-$C_3$ alkyl)$_n$-(CO)—, $R_3$—S—(CO)—($C_1$-$C_3$ alkyl)$_n$-, $R_3$—O—(CO)—($C_1$-$C_3$ alkyl)-, $R_3$—O—(CO)—O—($C_1$-$C_3$ alkyl)-, $R_3$—SO$_2$—($C_1$-$C_8$ alkyl)$_n$-, $R_4R_5N$—(CO)—, $R_4R_5N$—($C_1$-$C_3$ alkyl)$_n$-, $R_3$—(CO)—$NR_6$—, or $R_4R_5N$—(CO)—$NR_6$;

X represents hydrogen or fluorine; Y represents C—Z or N; Z represents hydrogen, fluorine, chlorine, bromine or iodine; and when X represents fluorine, Y represents C—Z, and Z represents hydrogen.

5. A method for preparing the substituted thiadiazinone dioxide according to claim 1, characterized in that:

when $R_2$ in the above formula I is hydrogen, the method comprises the following steps:

(1) subjecting the compound of the formula III and an electrophilic reagent

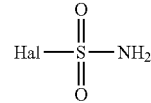

to substitution reaction to obtain the compound of the formula II-1;

(2) subjecting the compound of the formula II-1 to intramolecular cyclization reaction to obtain the compound of the formula I-1;

(3) subjecting the compound of the formula I-1 and $R_1$'-L to alkylation reaction to obtain the compound of the formula I-2;

when $R_2$ in the formula I is $R_2$', the method comprises the following steps:

(1') preparing the compound of the formula II-2 from the compound of the formula III in the presence of

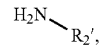

an electrophilic reagent

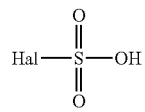

and a dehydrating agent;

(2') subjecting the compound of the formula II-2 to intramolecular cyclization reaction to obtain the compound of the formula I-3;
(3') subjecting the compound of the formula I-3 and $R_1'$-L to alkylation reaction to obtain the compound of the formula I-4;
wherein, Hal and L each independently represent halogen; $R_1'$ and $R_2'$ respectively represent the values for $R_1$ and $R_2$ according to claim 1 excluding hydrogen; X and Y are defined as claim 1;
the chemical reaction scheme is as follows:

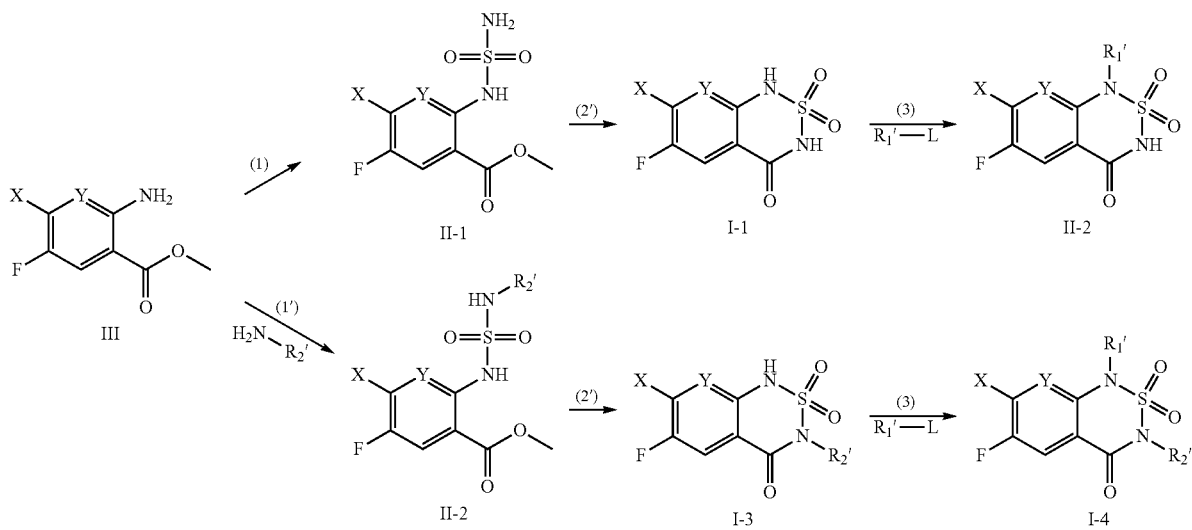

6. The method for preparing the substituted thiadiazinone dioxide according to claim 5, characterized in that the steps (1), (1'), (2), (2'), (3) and (3') are all carried out in the presence of bases and organic solvents; the bases are each independently selected from inorganic bases or organic bases; the organic solvents are each independently selected from methanol, ethanol, acetonitrile, dichloroethane, DMF, DMSO, dioxane, dichloromethane or ethyl acetate.

7. A herbicidal composition comprising a herbicidally effective dose of at least one of the substituted thiadiazinone dioxide according to claim 1.

8. A method for controlling a weed comprising applying a herbicidally effective dose of at least one of the substituted thiadiazinone dioxide according to claim 1 to a plant or a weed area.

9. The substituted thiadiazinone dioxide according to claim 1, which is selected from the following compounds of formula I:

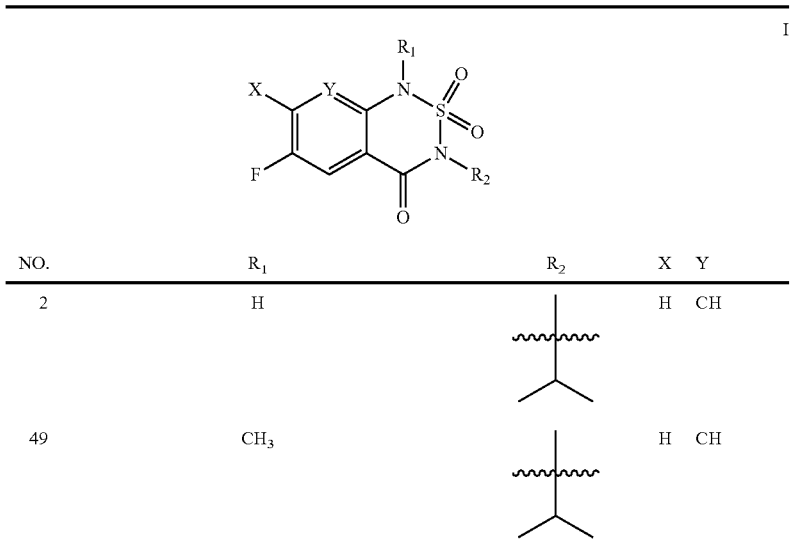

| NO. | $R_1$ | $R_2$ | X | Y |
|---|---|---|---|---|
| 2 | H | 〜〜⟨CH(CH₃)₂⟩ | H | CH |
| 49 | CH₃ | 〜〜⟨CH(CH₃)₂⟩ | H | CH |

-continued
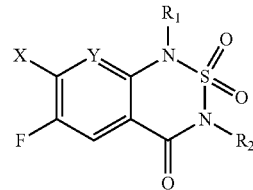
I
| NO. | R₁ | R₂ | X | Y |
|---|---|---|---|---|
| 50 | (1-methylallyl) | (isopropyl) | H | CH |
| 51 | (1-methylpropargyl) | (isopropyl) | H | CH |
| 56 | (methoxymethyl-methyl) | (isopropyl) | H | CH |
| 62 | (acetyl) | (isopropyl) | H | CH |
| 63 | (isopropoxycarbonyl-dimethyl) | (isopropyl) | H | CH |
| 64 | (ethoxycarbonyloxy-ethyl) | (isopropyl) | H | CH |
| 75 | H | (isopropyl) | H | N |
| 142 | H | (isopropyl) | H | C—F |
| 143 | H | (isopropyl) | H | C—Br |

-continued
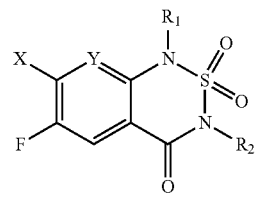
I
| NO. | R₁ | R₂ | X | Y |
|---|---|---|---|---|
| 144 | H | isobutyl | H | C—Cl |
| 145 | H | isobutyl | H | C—I |
| 146 | H | isobutyl | F | CH |
| 147 | H | isobutyl | Cl | CH |
| 150 | acetyl | isobutyl | H | C—F |
| 151 | 1-(ethoxycarbonyloxy)ethyl | isobutyl | H | C—F |
| 152 | acetyl | isobutyl | H | C—Cl |
| 153 | 1-(ethoxycarbonyloxy)ethyl | isobutyl | H | C—Cl |
| 154 | acetyl | isobutyl | H | C—Br |
| 155 | 1-(ethoxycarbonyloxy)ethyl | isobutyl | H | C—Br |

-continued
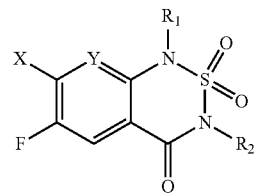
| NO. | R₁ | R₂ | X | Y |
|---|---|---|---|---|
| 157 | H |  | H | CH |
| 161 | H | 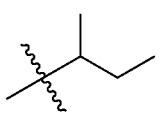 [SMILES: *C(C)CC] | H | CH |
| 163 | H | 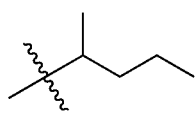 [SMILES: *C(C)CCC] | H | CH |
| 176 | 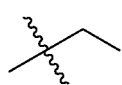 [SMILES: *CC] | 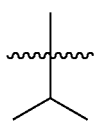 | H | CH |
| 179 | 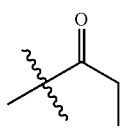 [SMILES: *C(=O)CC] | 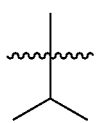 [SMILES: *C(C)C] | H | CH |
| 181 | 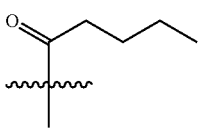 | 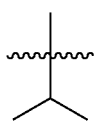 [SMILES: *C(C)C] | H | CH |
| 182 | 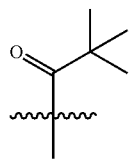 | 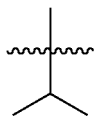 [SMILES: *C(C)C] | H | CH |
| 183 | 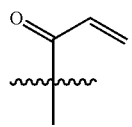 | 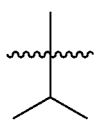 [SMILES: *C(C)C] | H | CH |
| 184 | 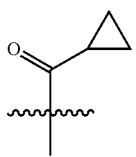 | 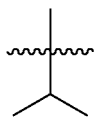 [SMILES: *C(C)C] | H | CH |

-continued

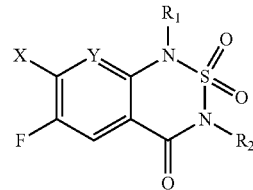

I

| NO. | R₁ | R₂ | X | Y |
|-----|----|----|---|---|
| 185 | (methoxyacetyl with methyl branch) | (isopropyl) | H | CH |
| 186 | (ethoxycarbonyl with methyl branch) | (isopropyl) | H | CH |
| 189 | (S-octyl thioester with methyl branch) | (isopropyl) | H | CH |
| 190 | (N,N-dimethylcarbamoyl with methyl branch) | (isopropyl) | H | CH |
| 193 | (isopropyl carbonate with methyl branch) | (isopropyl) | H | CH |
| 194 | (cyclohexyl carbonate with methyl branch) | (isopropyl) | H | CH |
| 195 | (ethylsulfonyl with methyl branch) | (isopropyl) | H | CH |

-continued
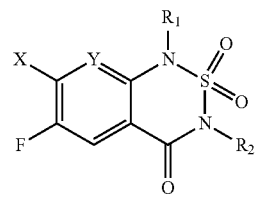
| NO. | R₁ | R₂ | X | Y |
|---|---|---|---|---|
| 196 | (propyl-SO₂-CH(CH₃)-) | isopropyl | H | CH |
| 197 | (4-methoxybenzyl-C(CH₃)-) | isopropyl | H | CH |
| 199 | (cyclopropyl-C(O)-C(CH₃)-) | isopropyl | H | C—Br |
| 213 | (CH₃OCH₂-C(CH₃)-) | isopropyl | H | C—F |
| 214 | (ethyl-C(O)-CH(CH₃)-) | isopropyl | H | C—F |
| 215 | (isopropyl-C(O)-CH(CH₃)-) | isopropyl | H | C—F |
| 216 | (vinyl-C(O)-C(CH₃)-) | isopropyl | H | C—F |
| 217 | (cyclopropyl-C(O)-C(CH₃)-) | isopropyl | H | C—F |

-continued
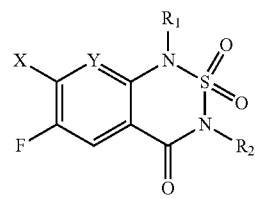
I
| NO. | R₁ | R₂ | X | Y |
|---|---|---|---|---|
| 218 | propyl ester with α-methyl | isopropyl | H | C—F |
| 219 | isopropyl ester with α-methyl | isopropyl | H | C—F |
| 220 | butyl ester with α-methyl | isopropyl | H | C—F |
| 221 | 3-chloropropyl ester with α-methyl | isopropyl | H | C—F |
| 222 | S-octyl thioester with α-methyl | isopropyl | H | C—F |
| 223 | N,N-dimethyl amide with α-methyl | isopropyl | H | C—F |

-continued

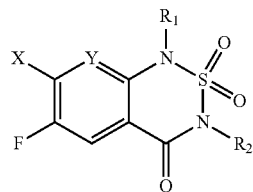

I

| NO. | R₁ | R₂ | X | Y |
|---|---|---|---|---|
| 226 | (isopropyl carbonate-oxy-isopropyl) | isobutyl | H | C—F |
| 227 | (cyclohexyl carbonate-oxy-isopropyl) | isobutyl | H | C—F |
| 228 | (ethylsulfonyl-methyl) | isobutyl | H | C—F |
| 229 | (ethylsulfonyl-ethyl) | isobutyl | H | C—F. |

10. The method for preparing the substituted thiadiazinone dioxide according to claim 5, wherein, the dehydrating agent in the step (1') is phosphorus oxychloride, concentrated sulfuric acid, phosphorus pentoxide or phosphorus pentachloride.

11. The herbicidal composition according to claim 7, which is characterized in that, the composition further comprising a preparation auxiliary.

12. A method for controlling a weed comprising applying a herbicidally effective dose of at least one of the herbicidal composition according to claim 7 to a plant or a weed area.

13. A method for preventing and/or controlling a weed in a useful crop comprising: applying at least one of the substituted thiadiazinone dioxide according to claim 1.

14. A method for preventing and/or controlling a weed in a useful crop comprising: applying at least one of the herbicidal composition according to claim 7.

* * * * *